(12) United States Patent
Tanaka

(10) Patent No.: US 8,457,404 B2
(45) Date of Patent: Jun. 4, 2013

(54) IMAGE PROCESSING APPARATUS, COMPUTER READABLE MEDIUM FOR IMAGE PROCESSING AND COMPUTER DATA SIGNAL FOR IMAGE PROCESSING

(75) Inventor: Eiichi Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 139 days.

(21) Appl. No.: 13/037,871

(22) Filed: Mar. 1, 2011

(65) Prior Publication Data

US 2012/0050295 A1 Mar. 1, 2012

(30) Foreign Application Priority Data

Aug. 24, 2010 (JP) ................................ 2010-187560

(51) Int. Cl.
*G06K 9/34* (2006.01)
(52) U.S. Cl.
USPC .......................................... 382/177; 382/195
(58) Field of Classification Search
USPC .................. 382/173, 177, 178, 190, 195, 280
See application file for complete search history.

(56) References Cited

U.S. PATENT DOCUMENTS

| | | | |
|---|---|---|---|
| 6,332,046 B1 | 12/2001 | Fujimoto et al. | |
| 6,577,763 B2 | 6/2003 | Fujimoto et al. | |
| 7,095,891 B1 * | 8/2006 | Takebe et al. | 382/177 |
| 2002/0031264 A1 | 3/2002 | Fujimoto et al. | |
| 2003/0123730 A1 * | 7/2003 | Kim et al. | 382/177 |

FOREIGN PATENT DOCUMENTS

| | | |
|---|---|---|
| JP | A-04-010089 | 1/1992 |
| JP | A-04-311283 | 11/1992 |
| JP | A-05-073718 | 3/1993 |
| JP | A-10-031716 | 2/1998 |
| JP | A-11-219407 | 8/1999 |
| JP | A-2000-090194 | 3/2000 |
| JP | A-2005-250816 | 9/2005 |
| JP | A-2008-217833 | 9/2008 |

\* cited by examiner

*Primary Examiner* — Phuoc Tran
(74) *Attorney, Agent, or Firm* — Oliff & Berridge, PLC

(57) ABSTRACT

An image processing apparatus includes:
a receiver that receives an image including at least a character image;
a path calculator that calculates separation paths, which are segments for separating the character images in the image received by the receiver;
a feature amount calculator that calculates feature amounts of the separation paths in a plurality of directions calculated by the path calculator;
a selector that determines a separation direction of the image and a state of the character image and selects a separation path among the separation paths in the plurality of directions;
a separator that separates the image into a plurality of partial images; and
a recursive processing determining unit that determines whether or not to perform recursive processing,
wherein the path calculator calculates the separation paths, which are the segments for separating the character image in the image separated by the separator.

5 Claims, 63 Drawing Sheets

2400

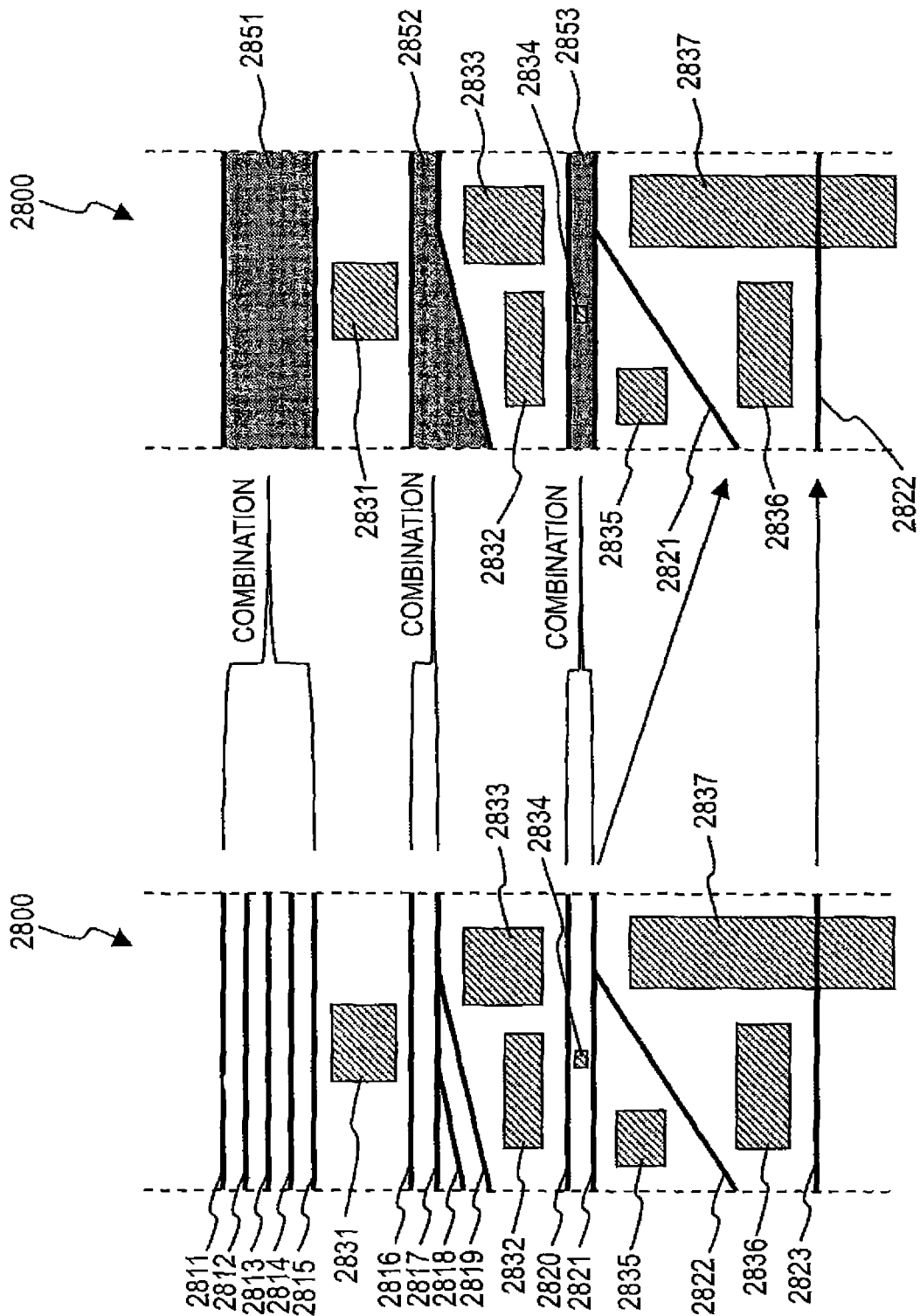

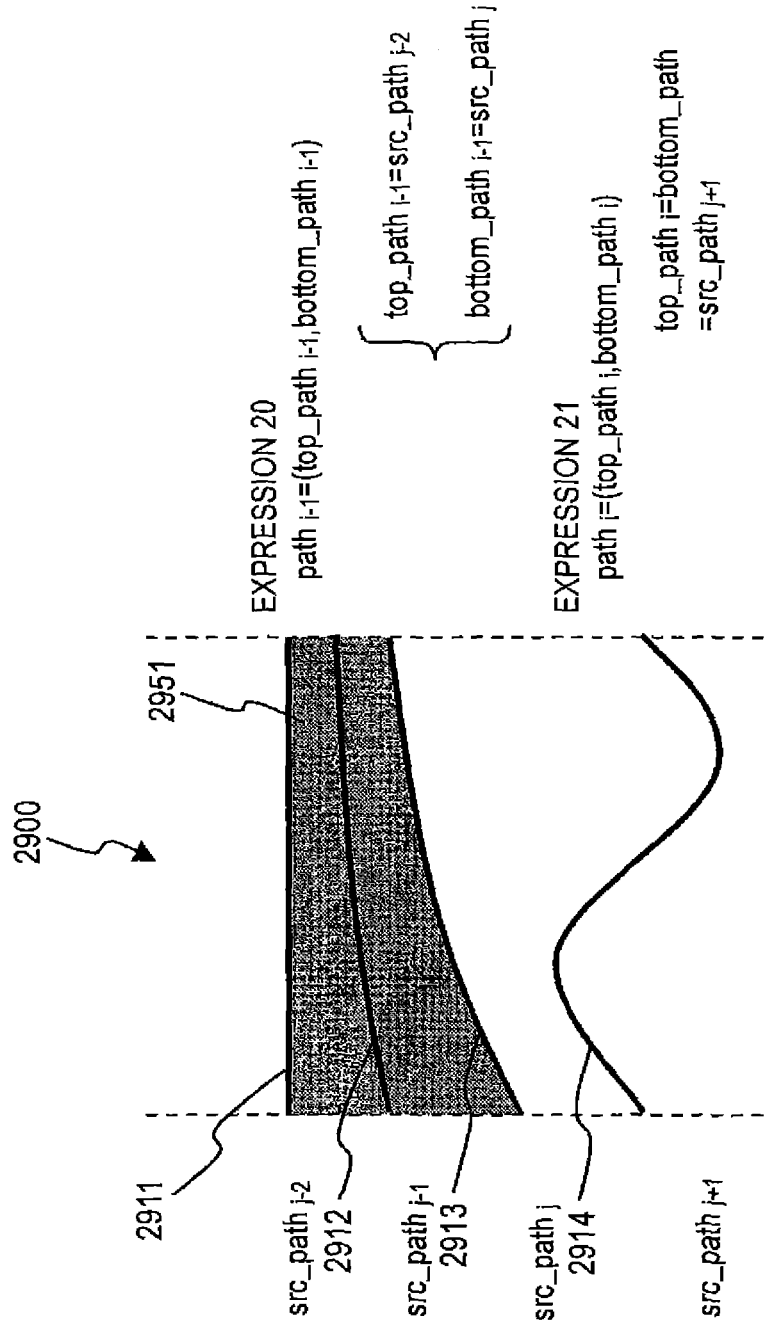

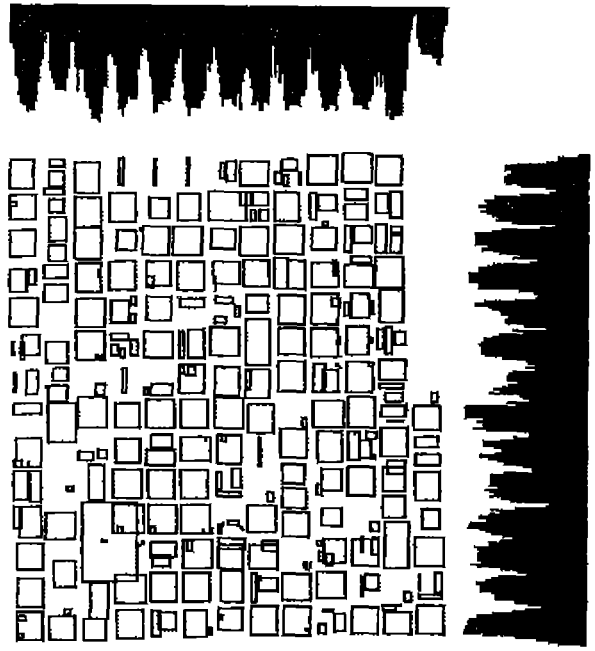
FIG.35A
FIG.35B

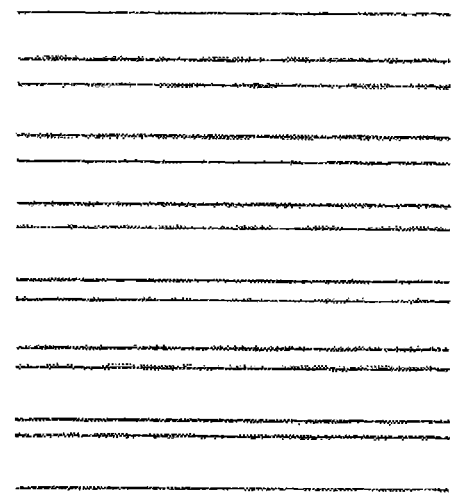
FIG.37C
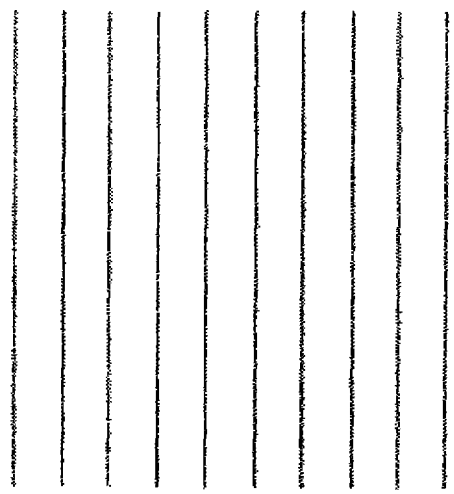
FIG.37B
FIG.37A
文字列切り出し
文字列切り出し
文字列切り出し
文字列切り出し
文字列切り出し

IMAGE PROCESSING APPARATUS, COMPUTER READABLE MEDIUM FOR IMAGE PROCESSING AND COMPUTER DATA SIGNAL FOR IMAGE PROCESSING

CROSS-REFERENCE TO RELATED APPLICATION

This application is based on and claims priority under 35 U.S.C. 119 from Japanese Patent Application No. 2010-187560 filed on Aug. 24, 2010.

BACKGROUND

Technical Field

The present invention relates to an image processing apparatus, a computer readable medium for image processing and a computer data signal for image processing.

SUMMARY

In order to achieve the object, according to an aspect of the invention, there is provided an image processing apparatus including:

a receiver that receives an image including at least a character image;

a path calculator that calculates separation paths, which are segments for separating the character images in the image received by the receiver;

a feature amount calculator that calculates feature amounts of the separation paths in a plurality of directions calculated by the path calculator;

a selector that determines a separation direction of the image and a state of the character image on the basis of the feature amounts calculated by the feature amount calculator and selects a separation path among the separation paths in the plurality of directions on the basis of determination result;

a separator that separates the image into a plurality of partial images using the separation path selected by the selector; and a recursive processing determining unit that determines whether or not to perform recursive processing on the basis of a state of the character image in the image separated by the separator, wherein the path calculator calculates the separation paths, which are the segments for separating the character image in the image separated by the separator, when the recursive processing determining unit determines to perform the recursive processing.

BRIEF DESCRIPTION OF THE DRAWINGS

Exemplary embodiments of the present invention will be described in detail based on the following figures, wherein:

FIG. 28 is a diagram illustrating an example of a process of combining the separation paths;

FIG. 29 is a diagram illustrating an example of the process of combining the separation paths;

FIGS. 35A and 35B are diagrams illustrating an example of a projection distribution;

FIGS. 37A to 37C are diagrams illustrating an example of separation paths in the horizontal and vertical directions;

FIGS. 38A to 38C are diagrams illustrating an example of separation paths in the horizontal and vertical directions;

FIG. 41 is a diagram illustrating an example of the process according to this exemplary embodiment;

FIGS. 61A and 61B are diagrams illustrating an example of the result of the process on a single paragraph although a target image is multiple paragraphs;

FIG. 62 is a diagram illustrating an example of the results of the processes according to the exemplary embodiments C-1 to C-5.

DETAILED DESCRIPTION

The description of the invention is divided into <A>, <B>, and <C>. A portion of the technique required to achieve the structure described in <B> is described in <A>. A portion of the technique required to achieve the structure described in <C> is described in <A> and <B>.

A structure for separating a character from a character string image is described in <A>, and a structure for separating a character string from the image of one paragraph is described in <B>. A structure for separating a character string from the image of plural paragraphs is described in <C>.

<A> Required Technique

First, an exemplary embodiment of <A> will be described in brief.

This exemplary embodiment relates to an image processing apparatus that separates (also referred to as, for example, cuts out or extracts) a region from an image. It is necessary to determine the outline of the region in order to separate the region. In this exemplary embodiment, the shortest path is used as the outline of the region. The shortest path is used to separate the region from the image.

Figure 1:
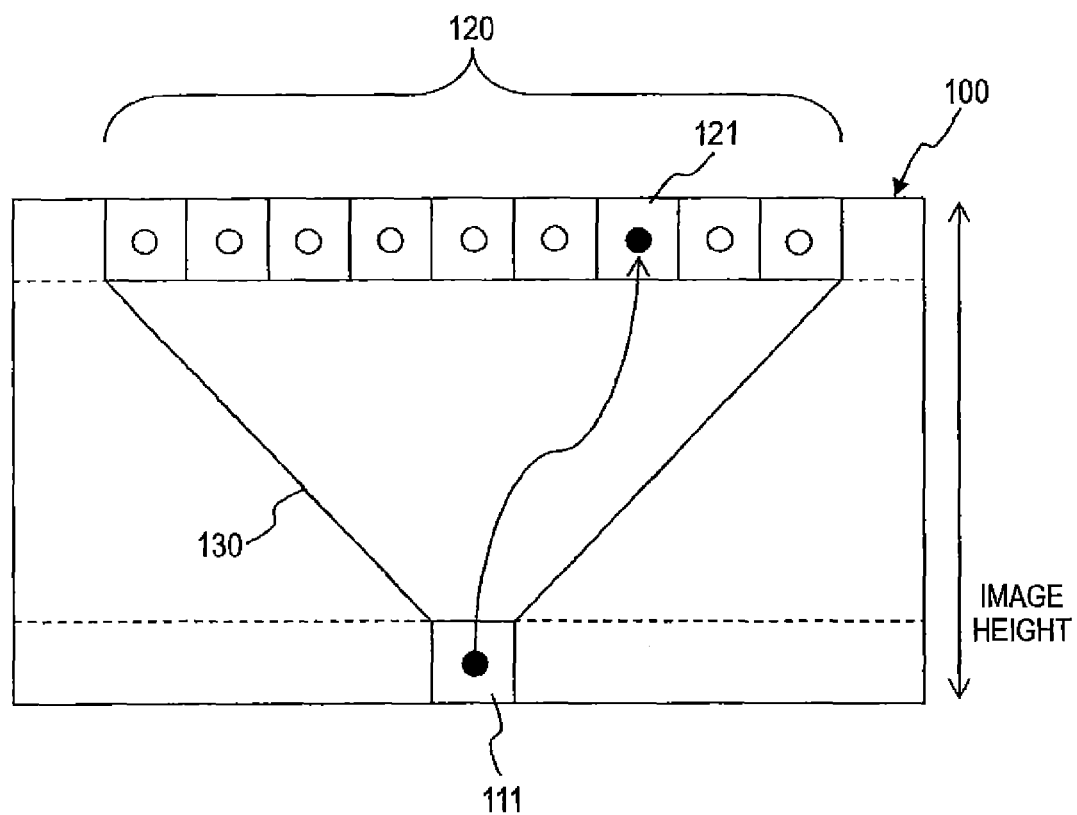
FIG. 1 is a diagram illustrating an example of paths that separate an image into regions.

The shortest path means a line pattern, which is a one-dimensional array of (the positions of) pixels on a target image. The cumulative value of the brightness values of the pixels on the path is used as a cost, and a path in which the cost is the minimum or the maximum is designated in a given range. In particular, in this exemplary embodiment, as shown in FIG. 1, the shortest path means a path in which a pixel at the lower end of an image 100 is used as a starting point 111 and a pixel having the minimum or maximum cumulative value of the brightness value on the path in a set of predetermined end point candidates among the pixels at the upper end of the image 100 is used as an end point 121 in the outline for dividing the image 100 into regions. In addition, when the starting point 111 and the end point candidate 120 are determined, a movement range 130 is determined.

The term "minimum or maximum cost" is used, but the cost is not necessarily the minimum or the maximum. The maximum cost or the minimum cost is determination conditions for extracting the path, and the cost of the path (the cumulative value of the brightness values of the pixels on the path) may be less or more than that of other paths. Therefore, when the shortest path is not particularly specified, in addition to the path with the minimum or maximum cost in a comparison range, a path with the second highest or lowest cost or plural paths with the highest or lowest cost and the second highest or lowest cost may be used as the shortest path under determination conditions for extracting paths that divide an image.

Next, the determination of a separation path using the convergence of the shortest paths will be described.

Figure 2:
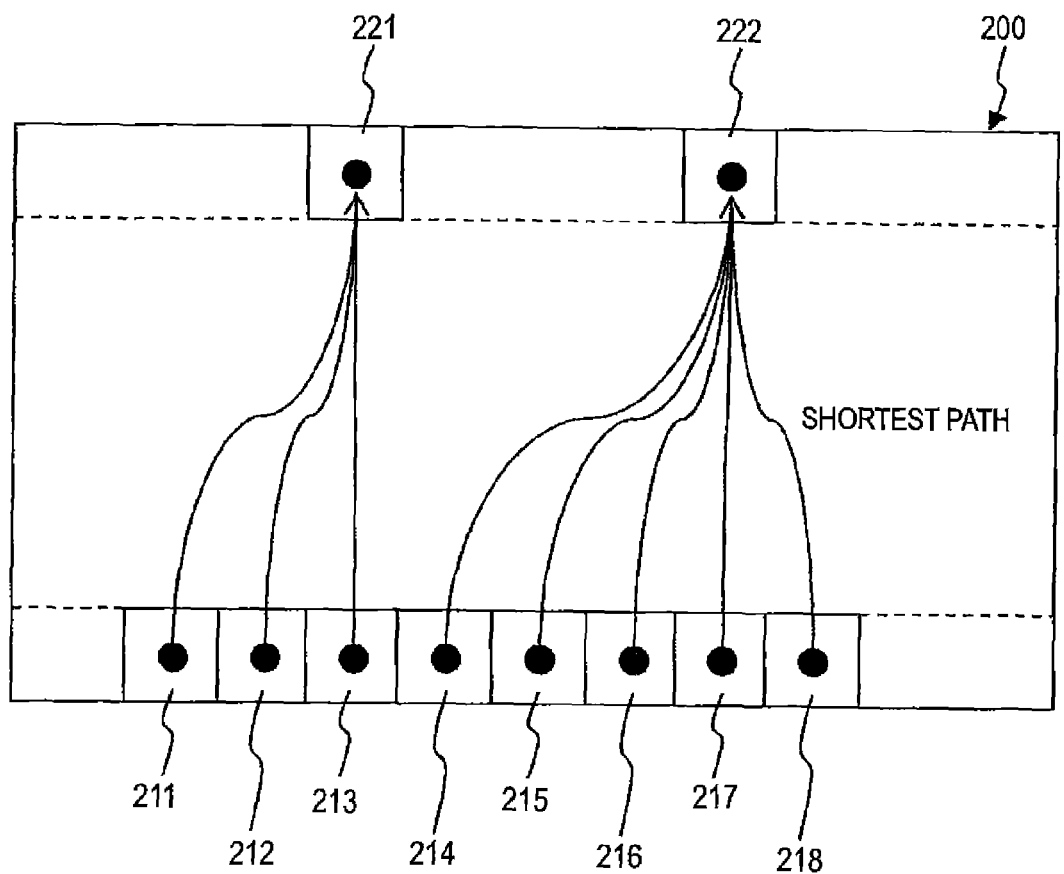
FIG. 2 is a diagram illustrating an example in which plural paths with different starting points have the same end point.

This exemplary embodiment uses an aspect in which plural paths having different starting points have the same end point (hereinafter, referred to as the convergence of paths) for the shortest path. This aspect is schematically shown in FIG. 2. FIG. 2 is a diagram illustrating an example in which plural paths having different starting points have the same end point. That is, in a target image 200, the shortest paths starting from three starting points 211 to 213 reach one end point 221 and the shortest paths starting from five starting points 214 to 218 reach one end point 222.

Next, an example of receiving a character string image including plural single characters and separating single characters will be mainly described.

This exemplary embodiment calculates paths for separating single characters in the character string image on the basis of the information of the shortest path. In the techniques disclosed in the related art documents, the process of extracting separation region candidates on the basis of projection information or a connection component corresponds to this process according to this exemplary embodiment.

Next, the determination of a separation path using the convergence of paths will be described with reference to FIGS. 3 to 10.

Figure 3:
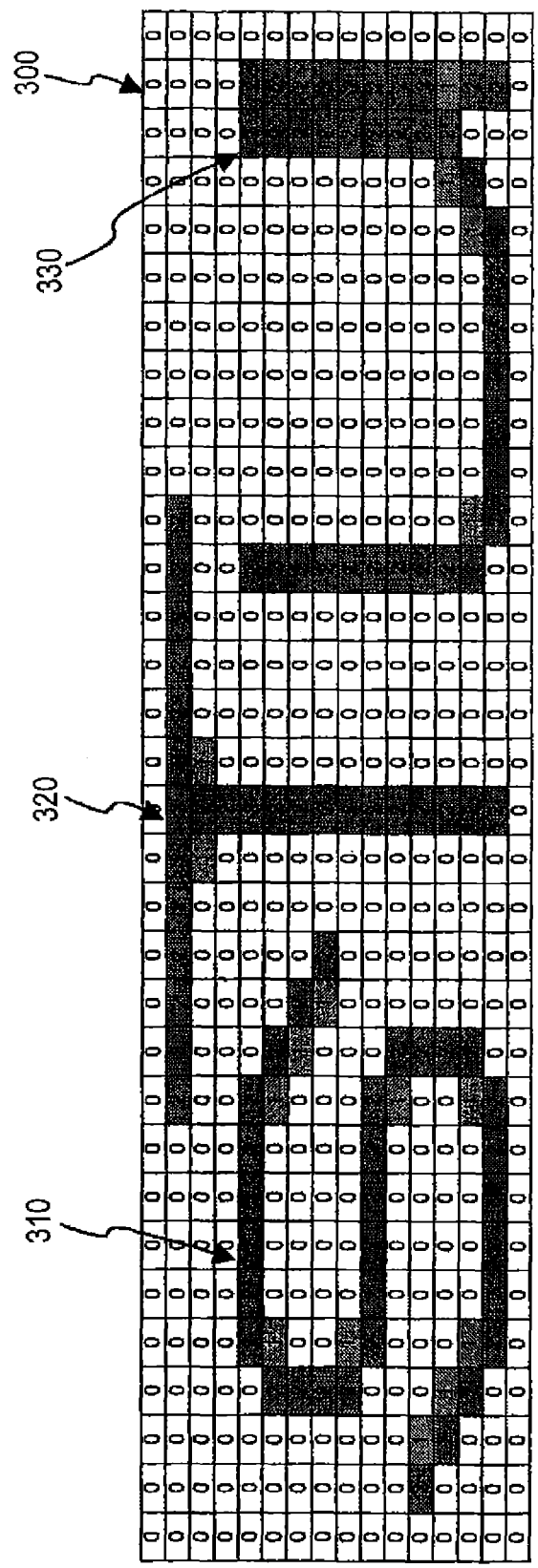
FIG. 3 is a diagram illustrating an example of a target image.
Figure 4:
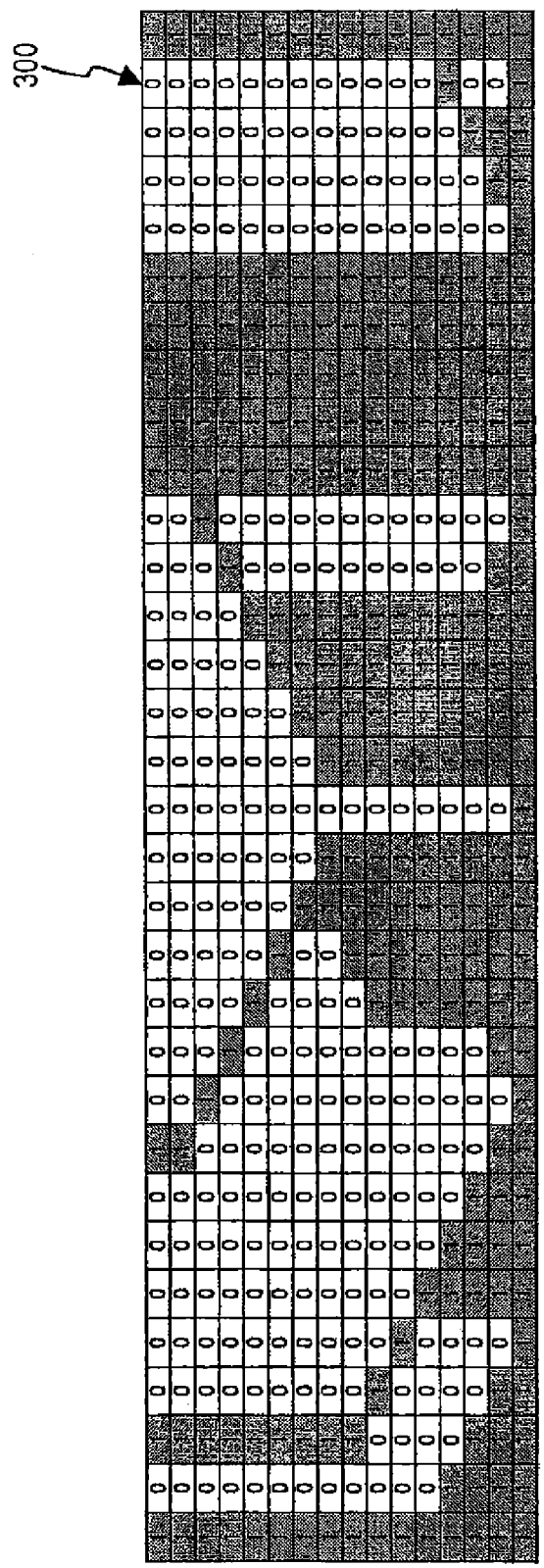
FIG. 4 is a diagram illustrating an example of the shortest path in the upward direction.
Figure 5:
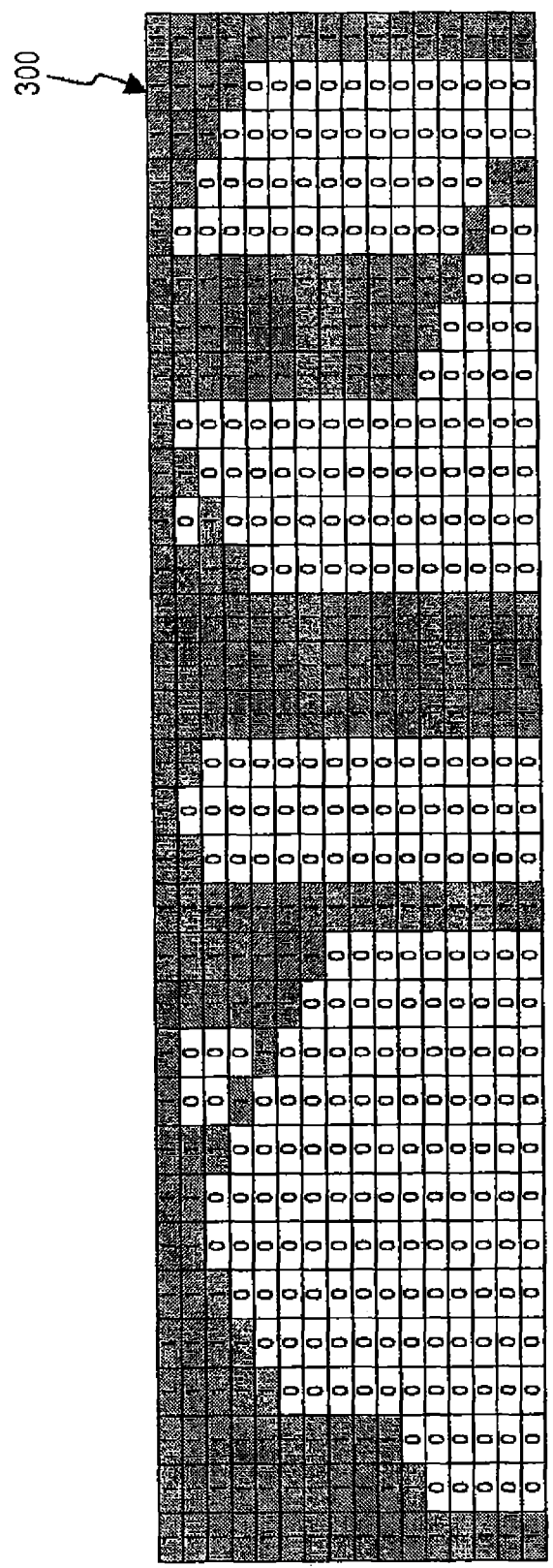
FIG. 5 is a diagram illustrating an example of the shortest path in the downward direction.

FIG. 3 is a diagram illustrating an example of a target image. An image 300 includes a character "S" image 310, a character "T" image 320, and a character "U" image 330, which are a pattern in which the character images are superimposed on each other by mapping. A cell indicates a pixel, and the value of the cell indicates the brightness value of the pixel. FIGS. 4 and 5 show the shortest paths calculated in the example of FIG. 3. For the value of the cell, 1 indicates that there is a path and 0 indicates that there is no path. FIG. 4 shows the shortest paths in the upward direction which have all the pixels at the lower end as the starting points and the pixels at the upper end as the end points. FIG. 5 shows the shortest paths in the downward direction which have all the pixels at the upper end as the starting points and the pixels at the lower end as the end points. As can be seen from FIGS. 4 and 5, the paths converge. That is, since the number of the starting points is more than that of the end points, plural paths with different starting points have the same end point.

Figure 6:
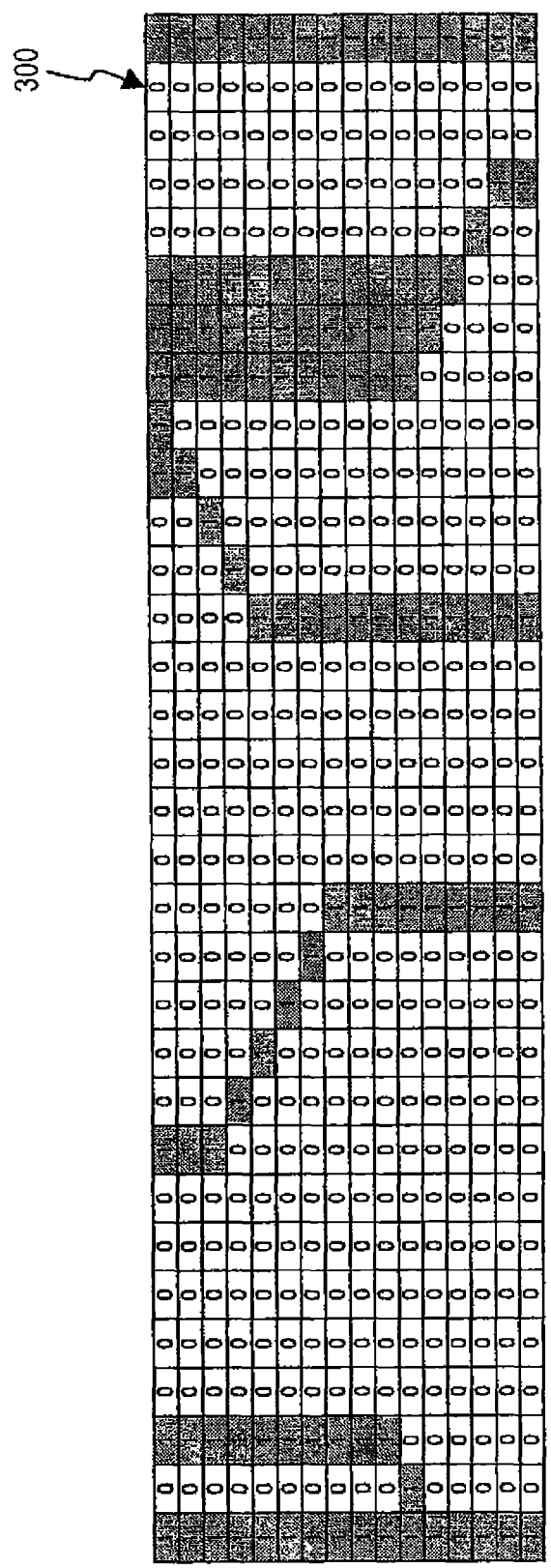
FIG. 6 is a diagram illustrating an example of the shortest paths obtained by one reciprocating operation.

When all of the end points are used as the starting points in the example of FIG. 4, a process of calculating the shortest paths in the downward direction is performed. The process result is shown in FIG. 6. As such, the paths are further converged by an operation (hereinafter, referred to as a reciprocating operation) of calculating the paths using the end points of all paths in one direction as the starting points in the other direction. That is, FIG. 6 is a diagram illustrating an example of the shortest paths obtained by one reciprocating operation (from the upward direction to the downward direction).

Figure 7:
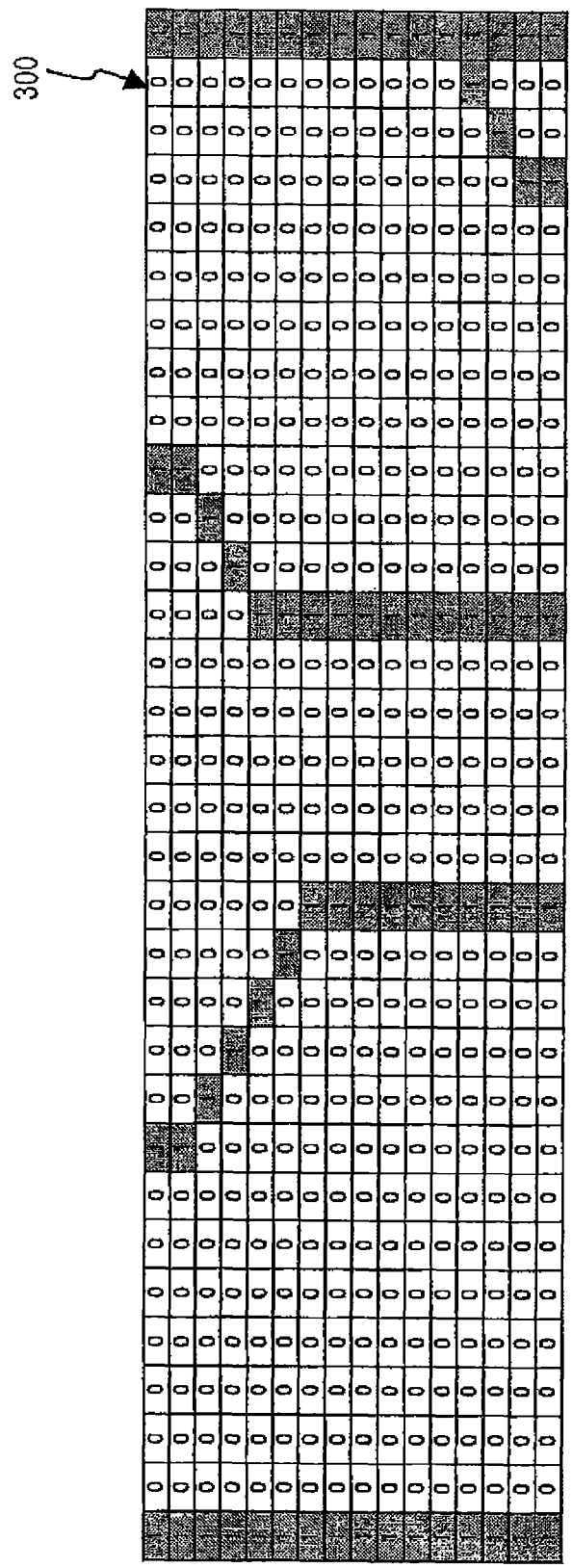
FIG. 7 is a diagram illustrating an example of the shortest paths obtained by two reciprocating operations.
Figure 8:
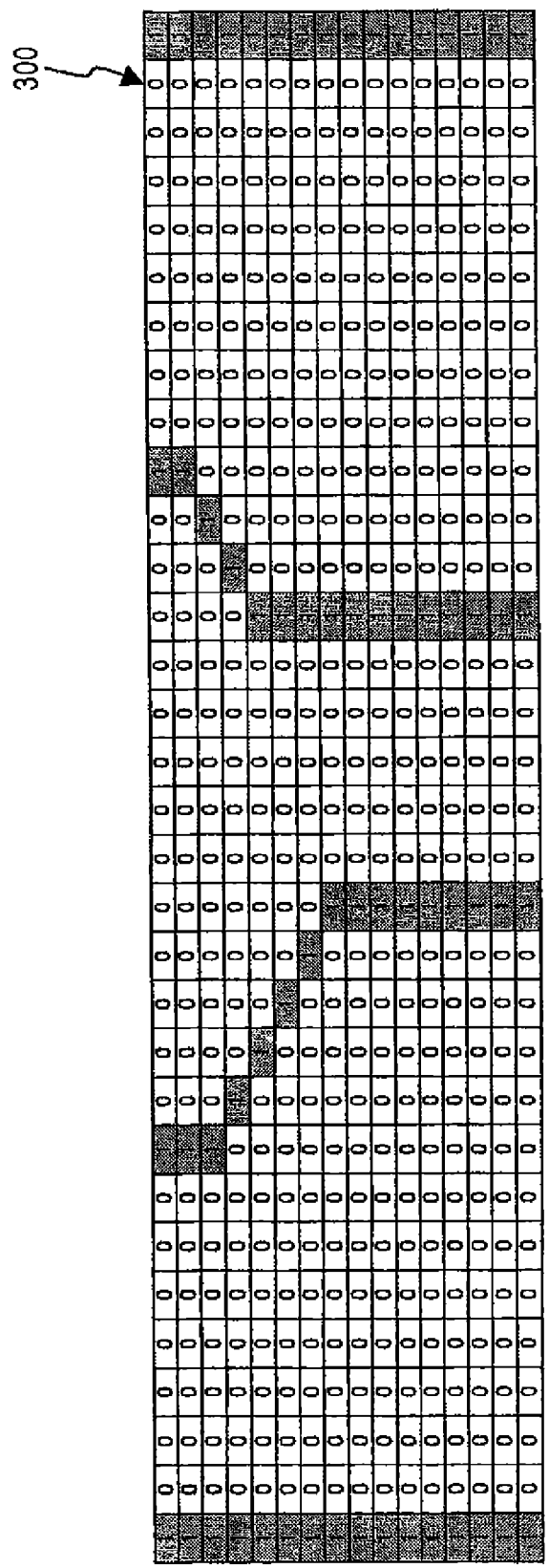
FIG. 8 is a diagram illustrating an example of the shortest paths obtained by three reciprocating operations.
Figure 9:
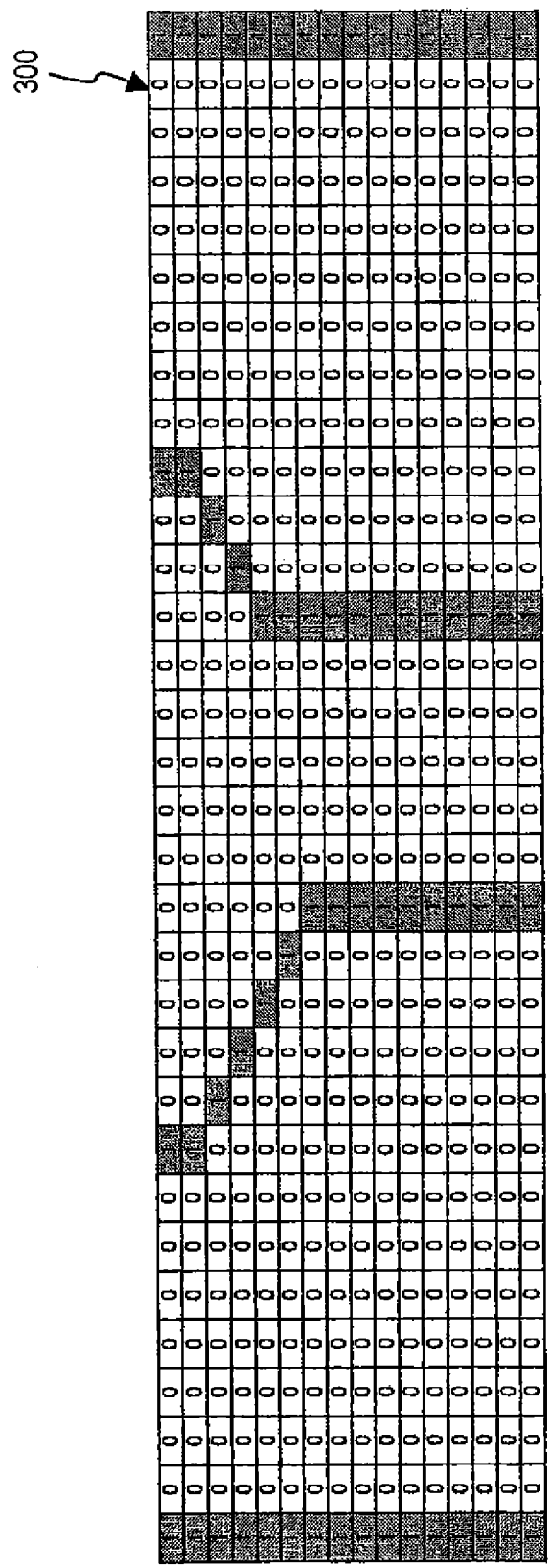
FIG. 9 is a diagram illustrating an example of the shortest path during convergence.

FIG. 7 shows an example of the shortest paths obtained by two reciprocating operations using the upward direction as a start direction. FIG. 8 shows an example of the shortest paths obtained by three reciprocating operations using the upward direction as the start direction. FIG. 9 shows an example of the shortest paths obtained by reciprocation in a state in which there is no change in the starting and end points of the paths. The state in which there is no change in the starting and end points of the paths means that the path in the upward direction is aligned with the path in the downward direction. The term "alignment" means the alignment between the paths, but does not necessarily mean the alignment between the directions. That is, the starting point in one direction is used as the end point in the other direction, and the end point in one direction is used as the starting point in the other direction.

Figure 10:
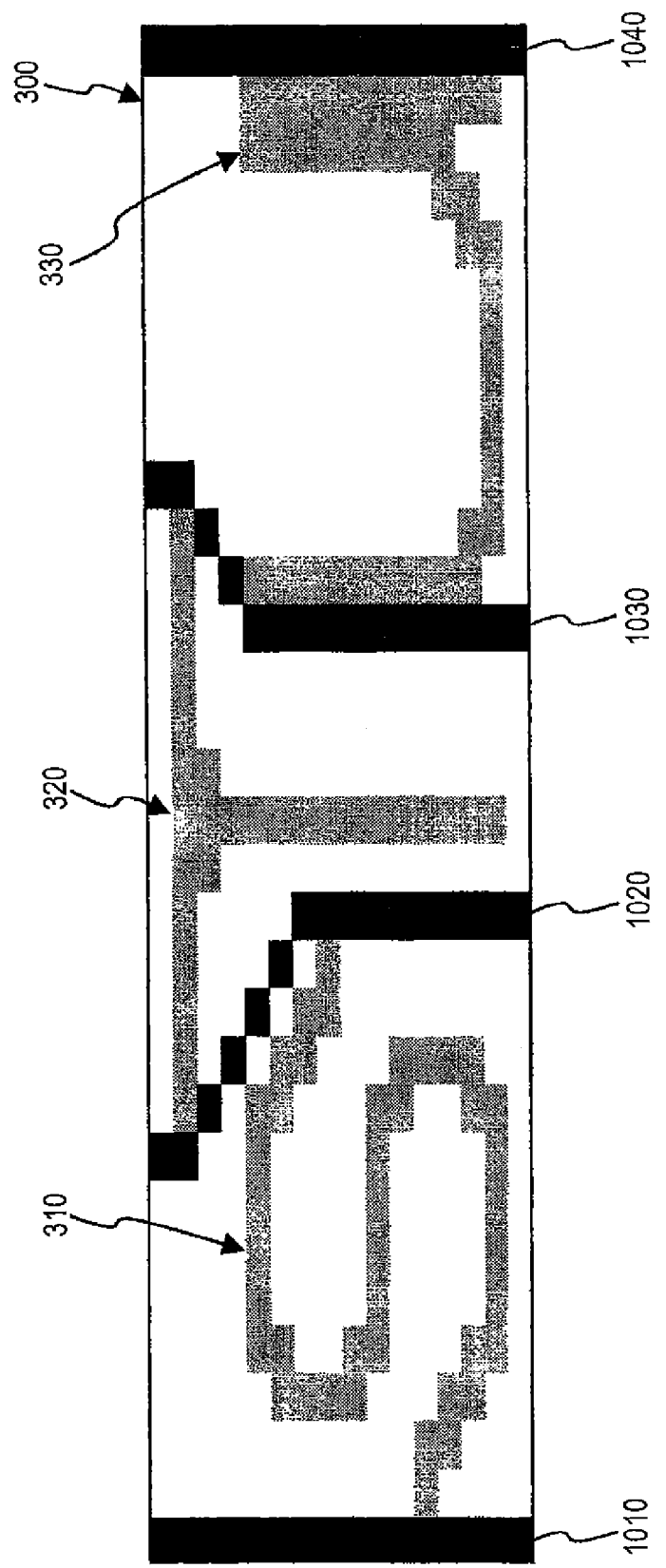
FIG. 10 is a diagram illustrating an example of separating an image into regions using the shortest paths.

FIG. 10 schematically shows an aspect in which the image shown in FIG. 3 is separated using the shortest paths shown in FIG. 9 as the separation paths. That is, as can be seen from FIG. 10, an image 300 is separated into the regions of a character image 310 (character "S"), a character image 320 (character "T"), and a character image 330 (character "U") by a separation path 1010, a separation path 1020, a separation path 1030, and a separation path 1040.

In this exemplary embodiment, as such, the separation paths are narrowed down on the basis of the convergence of the paths.

In this exemplary embodiment, the reciprocating process uses a set of pairs of the starting points and the end points of the paths. It is not necessary to store, for example, the positions of the pixels between the starting point and the end point of the path and the amount of data to be processed is reduced. As shown in FIG. 9, the completely converged paths can be calculated by using only the set of the pairs of the starting points and the end points of the paths without using the positions of the intermediate pixels.

In this exemplary embodiment, in the calculation of the path for designating the number of reciprocations (that is, calculation by which the path is not necessarily completely converged), the degree of separation may be adjusted according to requirements, using the fact that the number of separation paths is monotonically reduced with respect to the number of reciprocations.

Next, exemplary embodiments of the invention will be described with reference to the accompanying drawings.

<Example of Basic Structure According to this Exemplary Embodiment>

Figure 11:
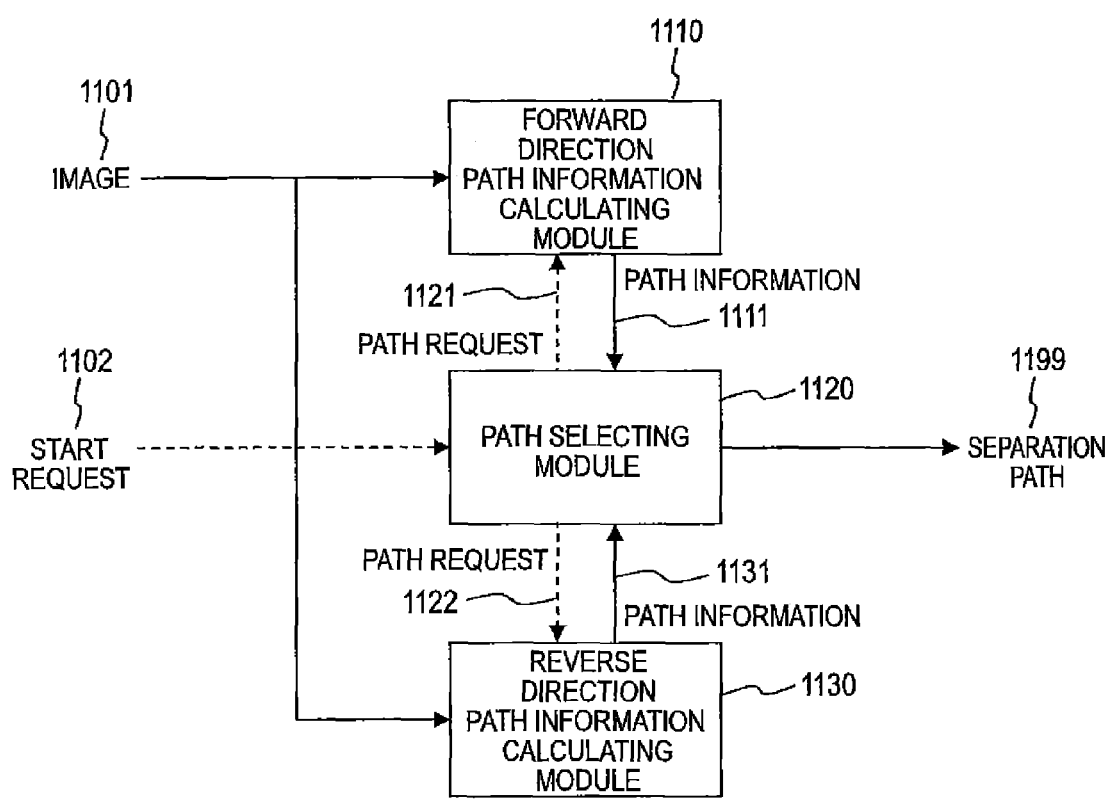
FIG. 11 is a conceptual module structure diagram illustrating an example of a basic structure according to exemplary embodiments of <A>.

First, FIG. 11 is a conceptual module structure diagram illustrating an example of the basic structure according to this exemplary embodiment (a path extracting device in an image processing apparatus). The example of the basic structure performs the following processes:

(1) A path information calculating process which receives a path request, analyzes a target image, and calculates path information, which includes the following two kinds of processes:

(i) A process of calculating path information in the forward direction (a process performed by a forward direction path information calculating module 1110); and (ii) A process of calculating path information in the reverse direction (a process performed by a reverse direction path information calculating module 1130); and (2) A path selecting process (a process performed by a path selecting module 1120) which selects a path on the basis of the convergence of the paths with reference to path information.

(1) The path information calculating process is performed by the forward direction path information calculating module 1110 and the reverse direction path information calculating module 1130. The forward direction path information calculating module 1110 and the reverse direction path information calculating module 1130 are connected to the path selecting module 1120 and perform a process of analyzing an image 1101 and calculating the information (path information items 1111 and 1131) of the shortest path. The forward direction is the direction of an output path, and the reverse direction is opposite to the forward direction. For example, in the paths shown in FIG. 9, the upward direction is the forward direction, and the downward direction is the reverse direction.

(2) The path selecting process is performed by the path selecting module 1120. The path selecting module 1120 is connected to the forward direction path information calculating module 1110 and the reverse direction path information calculating module 1130, and obtains path information (path information items 1111 and 1131) in the forward direction and the reverse direction output from the forward direction path information calculating module 1110 and the reverse direction path information calculating module 1130. In addition, the path selecting module 1120 selects a path using the conversion of the path on the basis of the obtained path information and outputs a separation path 1199.

In the example of FIG. 11, information (a start request 1102, a path request 1121, and a path request 1122) represented by a dashed line indicates an optional process. Specifically, the start request is information designating the number of reciprocations in the selection of the path, an initial direction, and an initial starting point. The path request is information designating the starting point of the path used by the forward direction path information calculating module 1110 and the reverse direction path information calculating module 1130 to calculate path information.

The module indicates a component that can be physically separated, such as software (computer program) or hardware. Therefore, in this exemplary embodiment, the module includes a module in a hardware structure as well as a module in a computer program. This exemplary embodiment includes a computer program, a system, and a method. However, for convenience of description, "store", "control a unit to store", and equivalent terms are used. However, when the exemplary embodiment relates to a computer program, the term "store" means storing information in a storage device or controlling a storage device to store. In addition, the modules may be in one-to-one correspondence with the functions. In implementation, one module may be configured by one program, plural modules may be configured by one program, or one module may be configured by plural programs. In addition, plural modules may be implemented by one computer, and one module may be implemented by plural computers in a dispersed or parallel environment. In addition, one module may include another module. The term "connection" includes physical connection and logical connection (for example, the reception of data, instruction, and the reference relationship between data).

The term "system" or "apparatus" includes a structure in which plural computers, hardware components, and apparatuses are connected to each other by a communication unit, such as a network (including communication connection in one-to-one correspondence) and a structure implemented by, for example, one computer, one hardware component, or one apparatus. The "system" and "apparatus" are used as a synonym. Of course, the "system" does not include a social "framework" (social system) that is artificially organized. The term "predetermined" means that something is set before target processing. The term "predetermined" includes not only before a process according to this exemplary embodiment starts but also before a target process is performed after the process according to this exemplary embodiment starts according to situations and state at that time or situations and state until that time.

Target information is read from a storage device whenever each module performs a process or whenever plural processes are performed in the module. Then, the process is performed and the process result is written to the storage device. Therefore, in some cases, a description of the reading of information from the storage device before the process and the writing of information to the storage device after the process is omitted. The term "storage device" may include, for example, a hard disk, a RAM (Random Access Memory), an external storage medium, a storage device through a communication line, and a register in a CPU (Central Processing Unit).

The image of plural horizontal characters in one row is mainly given as an example of a target image.

<Classification of Exemplary Embodiment>

The exemplary embodiment is classified into the following items:

(1) The number of reciprocations;
(2) Calculation timing of path information;
(3) Information to be narrowed down; and
(4) Adjustment of narrowing-down.

That is, the exemplary embodiment is classified as shown in Table 1.

TABLE 1

| Number of reciprocations | Calculation timing of path information | Information to be narrowed down | Adjustment of narrowing-down | Exemplary embodiment |
|---|---|---|---|---|
| One | — | — | — | Exemplary embodiment A-1 |
| Two or more | Collective calculation in advance | Path | Designate the number of reciprocations | Exemplary embodiment A-2 |
| | | | Complete convergence | Exemplary embodiment A-2 |
| | | Starting point | Designate the number of reciprocations | Exemplary embodiment A-3 |
| | | | Complete convergence | Exemplary embodiment A-3 |
| | Sequential calculation | Path | Designate the number of reciprocations | Exemplary embodiment A-4 |
| | | Starting point | Designate the number of reciprocations | Exemplary embodiment A-5 |

(1) The number of reciprocations is classification according to the number of times the reciprocating operation is performed. The number of separation paths is monotonically reduced with respect to the number of times the reciprocating operation is performed. The number of reciprocations is one (one reciprocation including the forward direction and the reverse direction) in the exemplary embodiment A-1, and the number of reciprocations is two or more in the other exemplary embodiments.

(2) The calculation timing of path information is classification according to whether all path information items are calculated in advance (hereinafter, referred to as collective calculation in advance) or whether necessary path information items are sequentially calculated (hereinafter, referred to as sequential calculation). The work memory relates to the trade-off of the processing time. In the exemplary embodiment A-2 and the exemplary embodiment A-3, the path information is collectively calculated in advance. In the exemplary embodiment A-4 and the exemplary embodiment A-5, the path information is sequentially calculated.

(3) The information to be narrowed down is classification according to whether a path (the positions of the pixels between the starting point and the end point in addition to the positions of the starting point and the end point) is referred to or whether the starting point (or a pair of the starting point and the end point) is referred to when the path is narrowed down using the convergence of the shortest paths. In implementation, the latter is mainly selected in terms of the work memory and the processing time. The exemplary embodiment A-2 and the exemplary embodiment A-4 refer to the path. The exemplary embodiment A-3 and the exemplary embodiment A-5 refer to the starting point.

(4) The adjustment of narrowing-down is for determining whether to use the result of narrowing-down based on a predetermined number of reciprocations as the separation path or whether to use the complete convergence result as the separation path. Both cases have different processes. When the path information is collectively calculated in advance (the exemplary embodiment A-2 and the exemplary embodiment A-3), the complete convergence result is used as the separation path. There is an exemplary embodiment in which the complete convergence result is obtained by the sequential calculation. However, in this exemplary embodiment, end conditions are set while the number of reciprocations is set to infinity, which is equivalent to the designation of the number of reciprocations. Therefore, the exemplary embodiment is not described.

<Exemplary Embodiment A-1>

Figure 12:
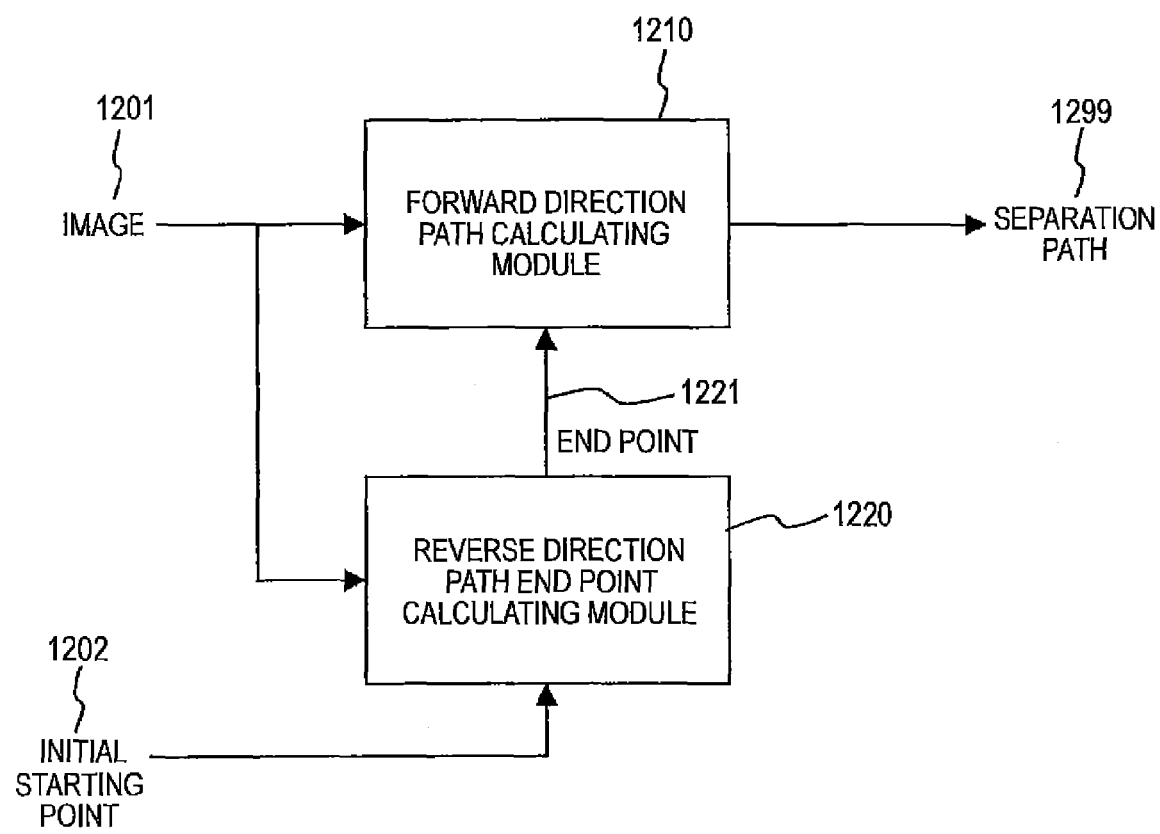
FIG. 12 is a conceptual module structure diagram illustrating an example of a structure according to an exemplary embodiment A-1.

FIG. 12 is a conceptual module structure diagram illustrating an example of a structure according to the exemplary embodiment A-1. The exemplary embodiment A-1 narrows down the paths by one reciprocating operation and includes a forward direction path calculating module 1210 and a reverse direction path end point calculating module 1220. The forward direction path calculating module 1210 and the reverse direction path end point calculating module 1220 are connected to each other.

The exemplary embodiment A-1 performs the following process.

<<Step 1>>

The reverse direction path end point calculating module 1220 receives an image 1201 and an initial starting point 1202, analyzes the image 1201 to calculate an end point 1221 of the shortest path corresponding to the initial starting point 1202, and outputs the end point to the forward direction path calculating module 1210.

<<Step 2>>

The forward direction path calculating module 1210 analyzes the image 1201 to calculate a separation path 1299 corresponding to the starting point, which is the received end point 1221, outputs the separation path, and ends the process.

The forward direction path calculating module 1210 also has the function of the path selecting module 1120 shown in FIG. 11.

<Exemplary Embodiment A-2>

In an exemplary embodiment A-2 or the subsequent exemplary embodiments, the path is narrowed down by plural reciprocating operations.

Figure 13:
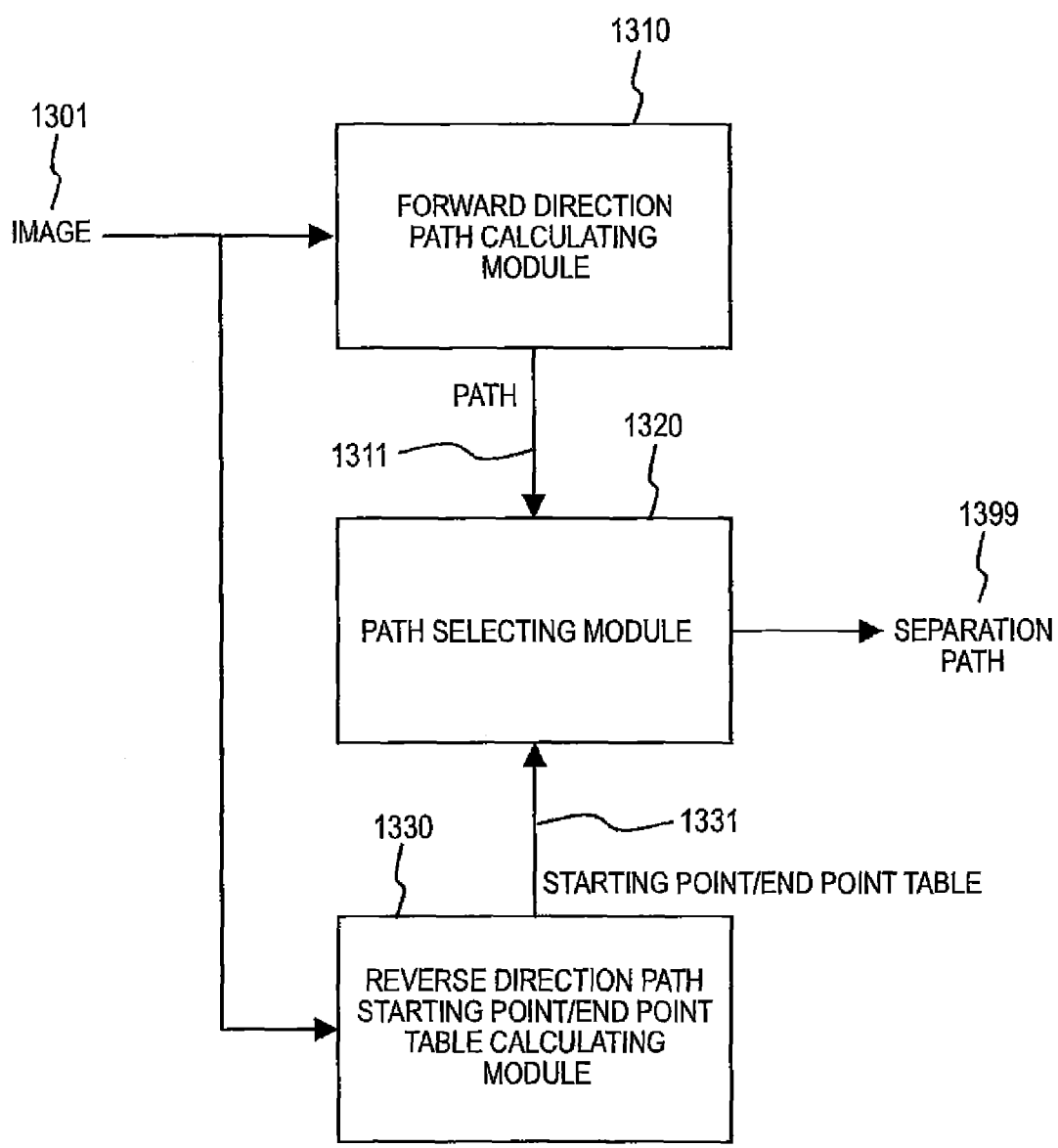
FIG. 13 is a conceptual module structure diagram illustrating an example of a structure according to an exemplary embodiment A-2.

FIG. 13 is a conceptual module structure diagram illustrating an example of a structure according to the exemplary embodiment A-2. The exemplary embodiment A-2 collectively calculates path information in advance and narrows down the path information. The exemplary embodiment A-2 includes a forward direction path calculating module 1310, a path selecting module 1320, and a reverse direction path starting point/end point table calculating module 1330. In particular, a case in which all path information items are collectively calculated in advance and the path information items are narrowed down will be described. All paths have all the pixels at the upper end or the lower end of a target image as the starting points.

In the exemplary embodiment A-2 and the exemplary embodiment A-3, the path information is calculated only once. Therefore, the exemplary embodiment A-2 and the exemplary embodiment A-3 are used to reduce the processing time.

The exemplary embodiment A-2 performs the following process.

<<Step 1>>

The reverse direction path starting point/end point table calculating module 1330 is connected to the path selecting module 1320, analyzes an image 1301 to calculate a starting point/end point table 1331, and outputs the calculated starting point/end point table to the path selecting module 1320.

The forward direction path calculating module 1310 is connected to the path selecting module 1320, analyzes the image 1301 to calculate paths 1311 with all starting points, and outputs the paths to the path selecting module 1320.

<<Step 2>>

The path selecting module 1320 is connected to the forward direction path calculating module 1310 and the reverse direction path starting point/end point table calculating module 1330, narrows the paths on the basis of the path 1311 in the forward direction and a reverse-direction starting point/end point table 1331, and outputs the path as a separation path 1399.

The starting point/end point table will be described below.

<Exemplary Embodiment A-3>

Figure 14:
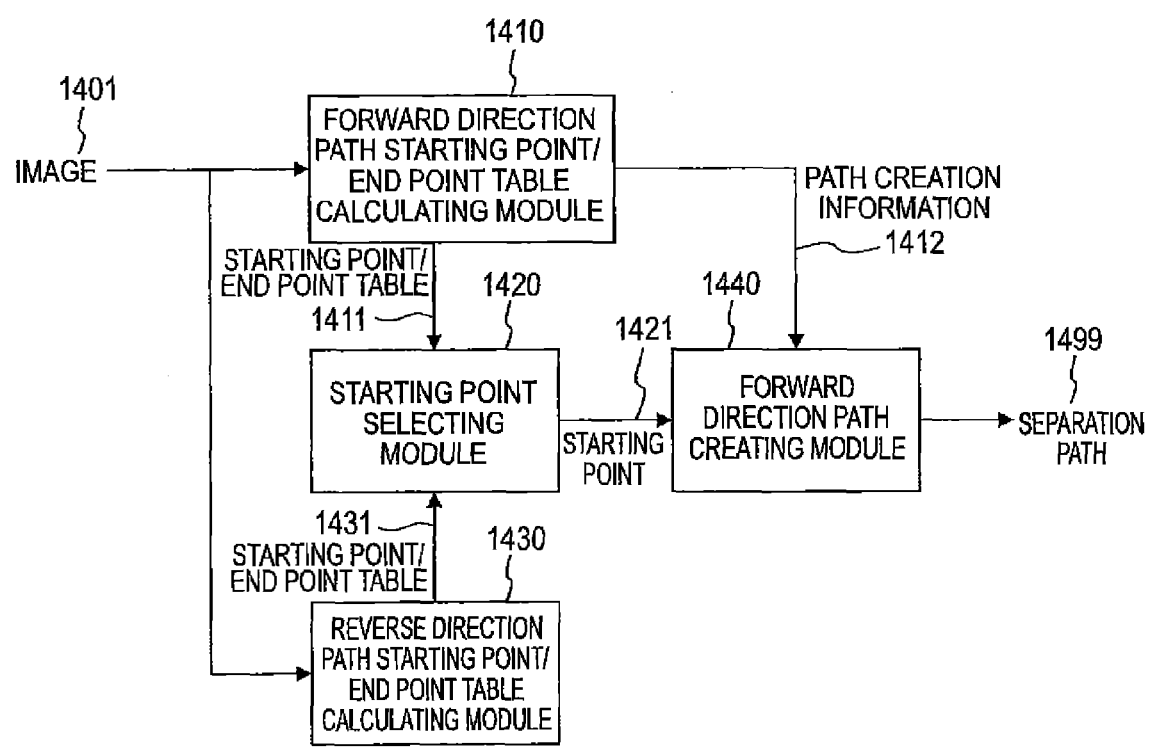
FIG. 14 is a conceptual module structure diagram illustrating an example of a structure according to an exemplary embodiment A-3.

FIG. 14 is a conceptual module structure diagram illustrating an example of a structure according to an exemplary embodiment A-3. The exemplary embodiment A-3 calculates only the starting point/end point table and path creation information, narrows down the starting points, and calculates a path. The exemplary embodiment A-3 includes a forward direction path starting point/end point table calculating module 1410, a starting point selecting module 1420, a reverse direction path starting point/end point table calculating module 1430, and a forward direction path creating module 1440.

The exemplary embodiment A-3 performs the following process.

<<Step 1>>

The reverse direction path starting point/end point table calculating module 1430 is connected to the starting point selecting module 1420, analyzes an image 1401 to calculate a starting point/end point table 1431, and outputs the starting point/end point table to the starting point selecting module 1420.

The forward direction path starting point/end point table calculating module 1410 is connected to the starting point selecting module 1420 and the forward direction path creating module 1440, analyzes the image 1401 to calculate a starting point/end point table 1411, and outputs the starting point/end point table to the starting point selecting module 1420. In addition, the forward direction path starting point/end point table calculating module 1410 calculates path creation information 1412 and outputs the path creation information to the forward direction path creating module 1440.

<<Step 2>>

The starting point selecting module 1420 is connected to the forward direction path starting point/end point table calculating module 1410, the reverse direction path starting point/end point table calculating module 1430, and the forward direction path creating module 1440, narrows down a starting point 1421 of the path on the basis of the starting point/end point table 1411 for the paths in the forward direction and the starting point/end point table 1431 for paths in the reverse direction, and outputs the result to the forward direction path creating module 1440.

<<Step 3>>

The forward direction path creating module 1440 is connected to the forward direction path starting point/end point table calculating module 1410 and the starting point selecting module 1420, creates the path of the starting point 1421 received from the starting point selecting module 1420 on the basis of the path creation information 1412 received from the forward direction path starting point/end point table calculating module 1410, and outputs the path as a separation path 1499.

Next, the starting point/end point table will be described.

The starting point/end point table is information storing pairs of the starting points and the endpoints of the paths. The process of narrowing down the paths in the exemplary embodiment A-2 (FIG. 13) and the exemplary embodiment A-3 (FIG. 14) uses the information of the pairs of the starting points and the end points of the paths. Next, this process will be described.

First, the starting point/end point table in the forward-direction is represented by the following Expression 1:

$$T=(e_0, e_1, \ldots, e_{w-1}).$$ [Expression 1]

The starting point/end point table in the reverse direction is represented by T'. The following Expression 2 indicates the position of the end point of a path having a position x as the starting point:

$$T(x)=e_x.$$ [Expression 2]

The starting point/end point table is an array of pairs of the starting points and the end points of the paths of all starting points. In Expression 1, w indicates the width of a target image in the horizontal direction (the width of the target image in the character string direction).

The path selecting module 1320 of the exemplary embodiment A-2 (FIG. 13) calculates T from the received path 1311 and then performs the same process as described above.

A path is represented by the following Expression 3:

$$p=(x_0, x_1, \ldots, x_{h-1}).$$ [Expression 3]

The position of the path at a height y is represented by the following Expression 4:

$$P(y)=x_y.$$ [Expression 4]

For example, the starting point of the path in the upward direction is represented by the following Expression 5 and the end point thereof is represented by the following Expression 6:

$$p(x)=x_0;$$ [Expression 5]

and $$p(h-1)=x_{h-1}$$ [Expression 6]

(where h indicates the width of a target image in the vertical direction (the width of the target image in a direction vertical to the character string direction)).

When the forward direction is the upward direction, a set of the paths 1311 received by the path selecting module 1320 is represented by the following Expression 7:

$$P=\{p_0, p_1, \ldots, p_{w-1}\}.$$ [Expression 7]

All the pixels represented by the following Expression 8 are substituted into the following Expression 9 to calculate T from the received paths:

$$p \in P;$$ [Expression 8]

and $$T(p(0)) \leftarrow p(h-1).$$ [Expression 9]

When the forward direction is the downward direction, the following Expression 10 is established:

$$T(p(h-1)) \leftarrow p(0).$$ [Expression 10]

The forward direction, which is the direction of an output path, and the direction of the starting point/end point table (referred to as an initial direction) which is referred to by the number of reciprocations at the beginning are determined. Specifically, when the number of reciprocations is an odd number, the initial direction is the reverse direction. When the number of reciprocations is an even number, the initial direction is the forward direction.

The process of narrowing down the paths is different in the narrowing-down of the path to designate the number of reciprocations and the narrowing-down of the path by complete convergence. Next, each of the narrowing-down processes will be described.

First, the process of narrowing down the paths (starting points) to designate the number of reciprocations is performed as in the following Expression 11:

[Expression 11]
Step 1
The number of reciprocations is R.
When R is an even number, $T_{tmp} \leftarrow T$, and
if not, $T_{tmp} \leftarrow T'$.
Step 2
A set of starting points is S.
$S_{tmp} \leftarrow \{T_{tmp}(x) | x \in S\}$, and
$S \leftarrow S_{tmp}$.
Step 3
When R=1, S is output and the process ends.
If not, R←R−1.
Step 4
When $T_{tmp}=T'$, $T_{tmp} \leftarrow T$, and
if not, $T_{tmp} \leftarrow T'$.
To Step 2.

Next, the process of narrowing down the paths (starting points) using complete convergence is performed as in the following Expression 12:

[Expression 12]
Step 1
A set of starting points is S.
For x=[0, w−1], S←{x|T(T'(x))=x}.
S is output and the process ends.

In this way, the set S of the starting points is obtained. After the process represented by Expression 12, the path selecting module 1320 according to the exemplary embodiment A-2 (FIG. 13) calculates P' using the following Expression 13 and outputs P':

$$P' \leftarrow \{p | p(y)=s, p \in P, s \in S\}.$$ [Expression 13]

When the forward direction is the upward direction, y=0 is established. When forward direction is the downward direction y=h−1 is established.

In Expression 12, the third row indicates that, when an end point (B) for a starting point (A) in a given direction is a starting point (B) in the reverse direction, the endpoint of the resultant path is (A).

<Exemplary Embodiment A-4>

Figure 15:
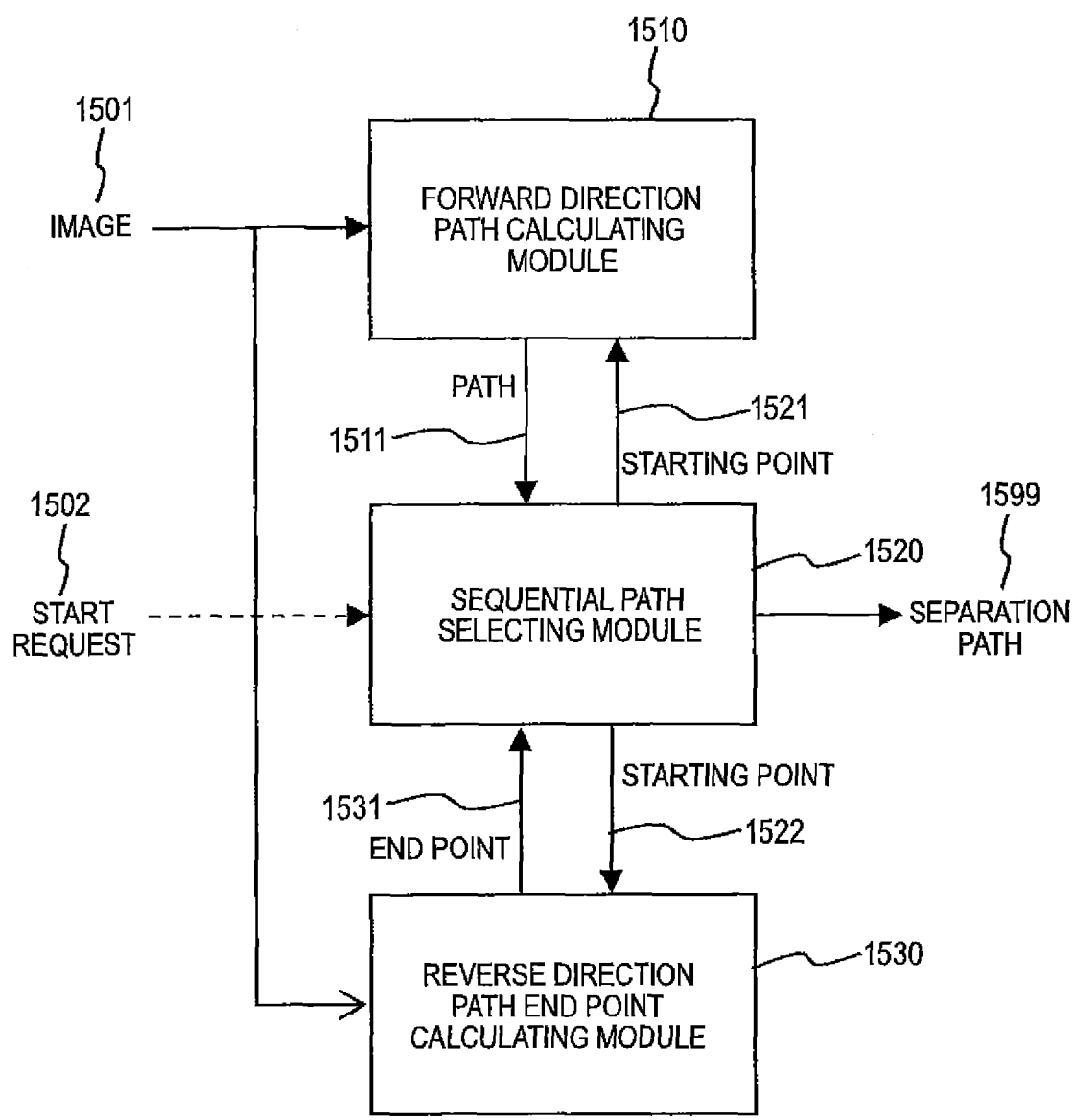
FIG. 15 is a conceptual module structure diagram illustrating an example of a structure according to an exemplary embodiment A-4.

An exemplary embodiment A-4 (FIG. 15) and an exemplary embodiment A-5 (FIG. 16) relate to a structure that sequentially calculates necessary path information among the structures that narrow down the paths using plural numbers of reciprocations. The exemplary embodiment A-4 relates to a structure that sequentially calculates the paths, and the exemplary embodiment A-5 relates to a structure that sequentially calculates the starting points and finally calculates the paths.

The structures according to the exemplary embodiment A-4 and the exemplary embodiment A-5 sequentially calculate necessary path information. Therefore, the structures are used to reduce the work memory.

The exemplary embodiment A-4 includes a forward direction path calculating module 1510, a sequential path selecting module 1520, and a reverse direction path end point calculating module 1530.

A start request (1502 in FIGS. 15 and 1602 in FIG. 16) is a set of initial starting points.

The exemplary embodiment A-4 performs the following process.

<<Step 1>>

The number of reciprocations is represented by R.

The sequential path selecting module 1520 is connected to the forward direction path calculating module 1510 and the reverse direction path end point calculating module 1530, and performs the following process.

When R is an even number, the sequential path selecting module 1520 outputs a starting point 1521 to the forward direction path calculating module 1510 and proceeds to Step 2.

If not, R←R−1 is performed, and the sequential path selecting module 1520 outputs a starting point 1522 to the reverse direction path end point calculating module 1530 and proceeds to Step 4.

<<Step 2>>

The forward direction path calculating module 1510 is connected to the sequential path selecting module 1520, analyzes an image 1501 to calculate paths 1511 of all of the received starting points 1521, and outputs the paths to the sequential path selecting module 1520.

<<Step 3>>

When R is zero, the sequential path selecting module 1520 outputs the received path 1511 as a separation path 1599, and the process ends.

If not, R←R−2 is performed, and the sequential path selecting module 1520 uses the starting point of the received path 1511 as the end point and outputs the starting point 1522 to the reverse direction path end point calculating module 1530.

<<Step 4>>

The reverse direction path end point calculating module 1530 is connected to the sequential path selecting module 1520, analyzes the image 1501 to calculate end points 1531 of the paths of all of the received starting points 1522, and outputs the end points to the sequential path selecting module 1520.

<<Step 5>>

The sequential path selecting module 1520 outputs the received end point 1531 as the starting point to the forward direction path calculating module 1510 and proceeds to Step 2.

<Exemplary Embodiment A-5>

Figure 16:
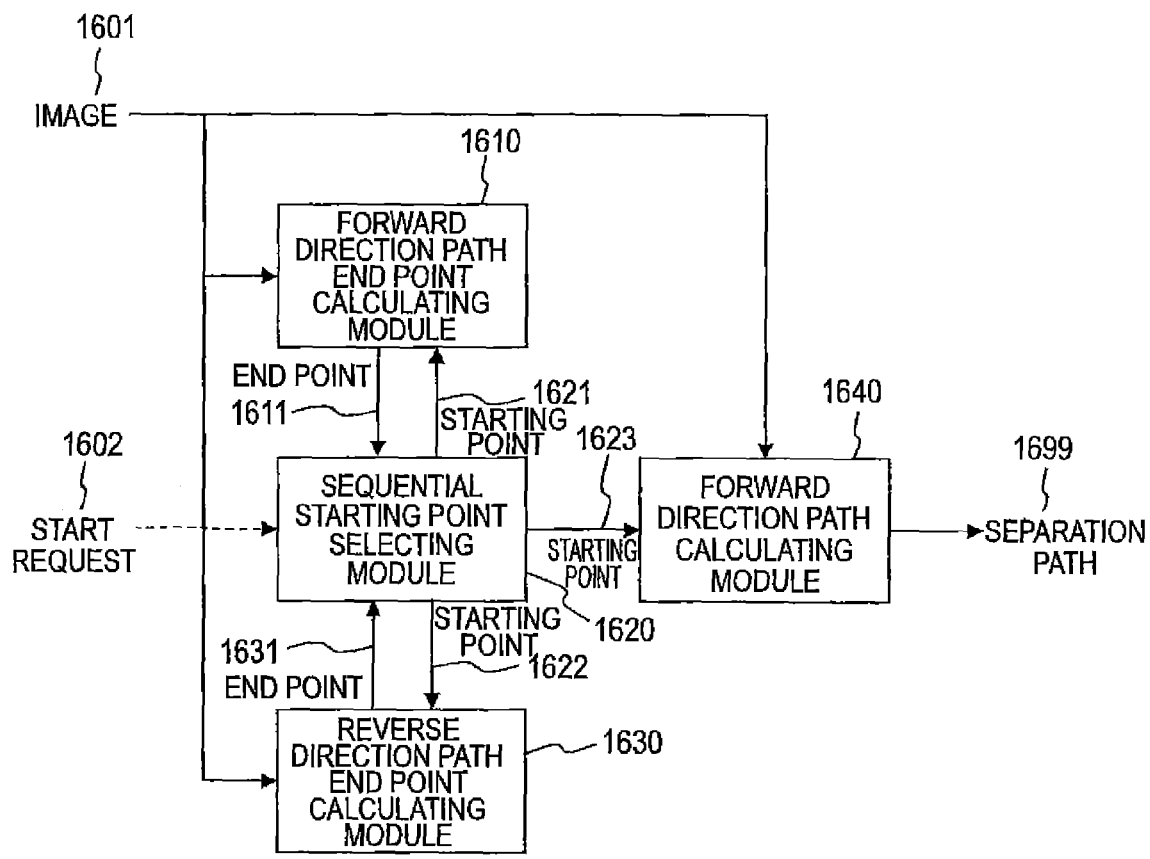
FIG. 16 is a conceptual module structure diagram illustrating an example of a structure according to an exemplary embodiment A-5.

FIG. 16 is a conceptual module structure diagram illustrating an example of a structure according to an exemplary embodiment A-5. The exemplary embodiment A-5 includes a forward direction path endpoint calculating module 1610, a sequential starting point selecting module 1620, a reverse direction path end point calculating module 1630, and a forward direction path calculating module 1640.

The exemplary embodiment A-5 performs the following process.

<<Step 1>>

The number of reciprocations is represented by R.

The sequential starting point selecting module 1620 is connected to the forward direction path end point calculating module 1610, the reverse direction path endpoint calculating module 1630, and the forward direction path calculating module 1640 and performs the following process.

When R is an even number, the sequential starting point selecting module 1620 outputs a starting point 1621 to the forward direction path end point calculating module 1610 and proceeds to Step 2.

If not, R←R−1 is performed, and the sequential starting point selecting module 1620 outputs a starting point 1622 to the reverse direction path end point calculating module 1630 and proceeds to Step 4.

<<Step 2>>

The forward direction path end point calculating module 1610 is connected to the sequential starting point selecting module 1620, analyzes an image 1601 to calculate end points 1611 of the paths of all of the received starting points 1621, and outputs the end points to the sequential starting point selecting module 1620.

<<Step 3>>

When R is zero, the sequential starting point selecting module 1620 outputs the received end point 1611 as a starting point 1623 to the forward direction path calculating module 1640 and proceeds to Step 6.

If not, R←R−2 is performed, and the sequential starting point selecting module 1620 uses the received end point 1611 of the path as the starting point and outputs a starting point 1622 to the reverse direction path endpoint calculating module 1630.

<<Step 4>>

The reverse direction path end point calculating module 1630 is connected to the sequential starting point selecting module 1620, analyzes the image 1601 to calculate end points 1631 of the paths of all of the received starting points 1622, and outputs the end points to the sequential starting point selecting module 1620.

<<Step 5>>

The sequential starting point selecting module 1620 outputs the received end point 1631 as the starting point 1621 to the forward direction path end point calculating module 1610 and proceeds to Step 2.

<<Step 6>>

The forward direction path calculating module 1640 is connected to the sequential starting point selecting module 1620, creates the paths of all of the received starting points 1623, outputs the paths as separation paths 1699, and ends the process.

<Exemplary Embodiment Outputting Partial Image>

Structures that perform image separation using the separation paths calculated by the above-described exemplary embodiments are shown in FIGS. 17, 18, 19, and 20. In the structures, single characters are separated from a character string image and are output as single character images. In FIGS. 17, 18, 19, and 20, a path extracting module has the structure according to the exemplary embodiment A-1 (FIG. 12), the exemplary embodiment A-2 (FIG. 13), the exemplary embodiment A-3 (FIG. 14), the exemplary embodiment A-4 (FIG. 15), and the exemplary embodiment A-5 (FIG. 16). The output single character image is processed by, for example, a character image recognizing apparatus.

Figure 17:
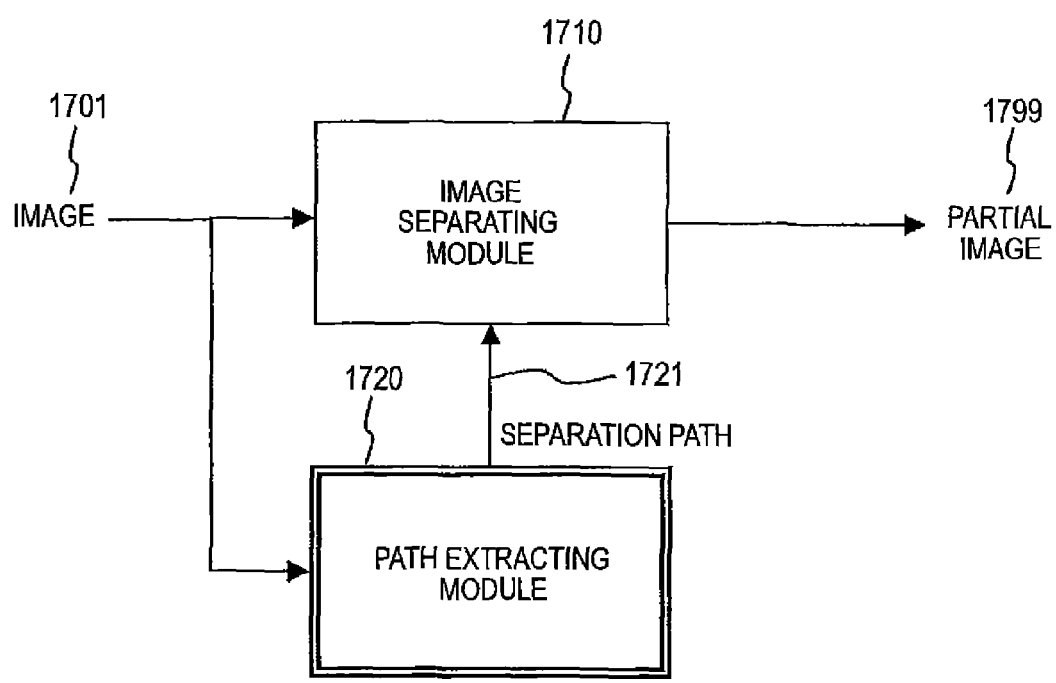
FIG. 17 is a conceptual module structure diagram illustrating an example of the structure of an image processing apparatus provided with a path extracting module.

FIG. 17 is a conceptual module structure diagram illustrating an example of the structure of an image processing apparatus provided with a path extracting module 1720. This exemplary embodiment separates images using the separation paths and outputs partial images. This exemplary embodiment includes an image separating module 1710 and the path extracting module 1720.

The image separating module 1710 is connected to the path extracting module 1720, receives an image 1701, which is a character string image, separates the image 1701 into single character image regions according to separation paths 1721 received from the path extracting module 1720, and outputs the single character image regions as partial images 1799.

Figure 18:
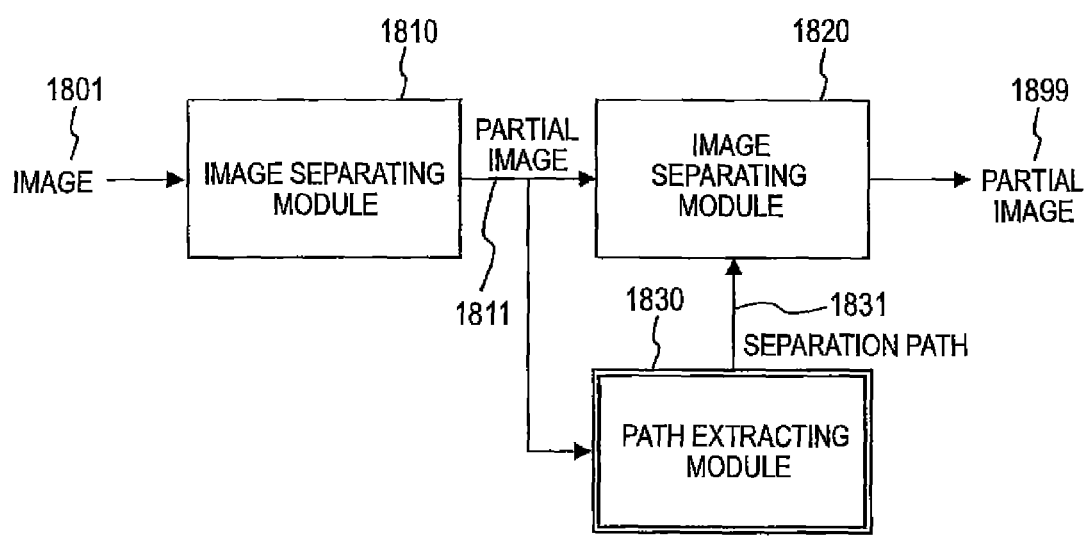
FIG. 18 is a conceptual module structure diagram illustrating an example of the structure of an image processing apparatus provided with a path extracting module.

FIG. 18 is a conceptual module structure diagram illustrating an example of the structure of an image processing apparatus provided with a path extracting module 1830. This exemplary embodiment includes an image separating module 1810, an image separating module 1820, and a path extracting module 1830.

The image separating module 1810 is connected to the image separating module 1820 and the path extracting module 1830 and performs a process of extracting separation candidate regions as a pre-process of the path extracting module 1830. For example, the image separating module 1810 extracts only a character image as a partial image 1811 from an image 1801. In addition, the image separating module 1810 separates the single character image that can be separated by the related art using, for example, projection information and transmits the single character image (partial image 1811) that cannot be separated to the path extracting module 1830.

The image separating module 1820 is connected to the image separating module 1810 and the path extracting module 1830, separates the partial image 1811 received from the image separating module 1810 into single character image regions according to separation paths 1831 received from the path extracting module 1830, and outputs the single character image regions as partial images 1899. When the image separating module 1810 separates the single character image, the partial image 1811 transmitted from the image separating module 1810 to the image separating module 1820 includes the single character images (images other than the image to be processed by the path extracting module 1830) in the regions separated by the image separating module 1810, and is output as a partial image 1899.

Figure 19:
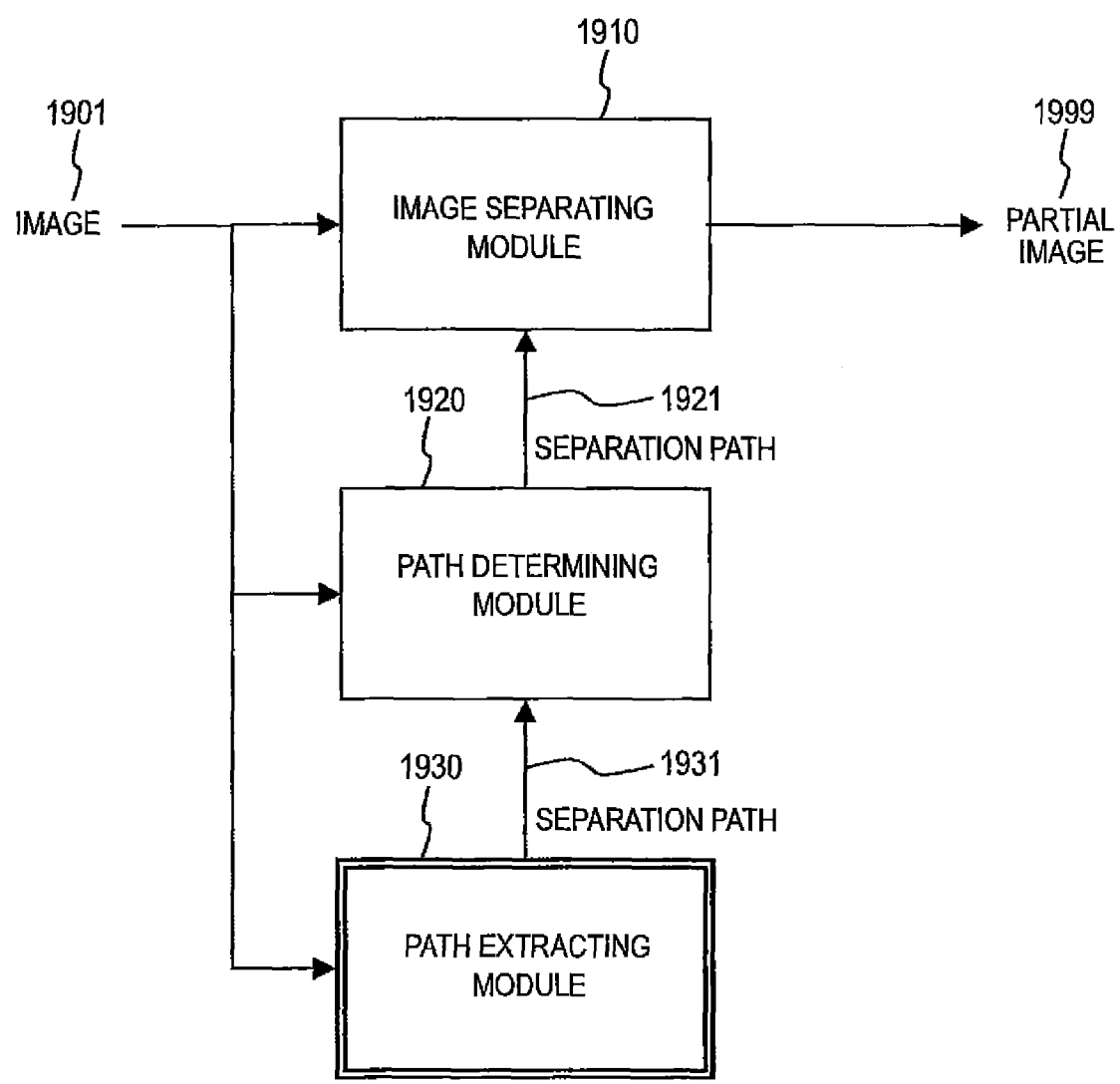
FIG. 19 is a conceptual module structure diagram illustrating an example of the structure of an image processing apparatus provided with a path extracting module.

FIG. 19 is a conceptual module structure diagram illustrating an example of the structure of an image processing apparatus provided with a path extracting module 1930. This exemplary embodiment includes an image separating module 1910, a path determining module 1920, and a path extracting module 1930.

The path determining module 1920 is connected to the image separating module 1910 and the path extracting module 1930 and performs a process of determining whether separation is exactly performed by separation paths 1931 output from the path extracting module 1930. This process is for rejecting meaningless separation paths, such as separation paths having a gap smaller than that between other separation paths (for example, the radical and phonetic of a Chinese character). During the determination, an image 1901 may be used.

The image separating module 1910 is connected to the path determining module 1920, separates the image 1901 into single character image regions according to the separation paths 1921 received from the path determining module 1920, and outputs the single character image regions as partial images 1999.

Figure 20:
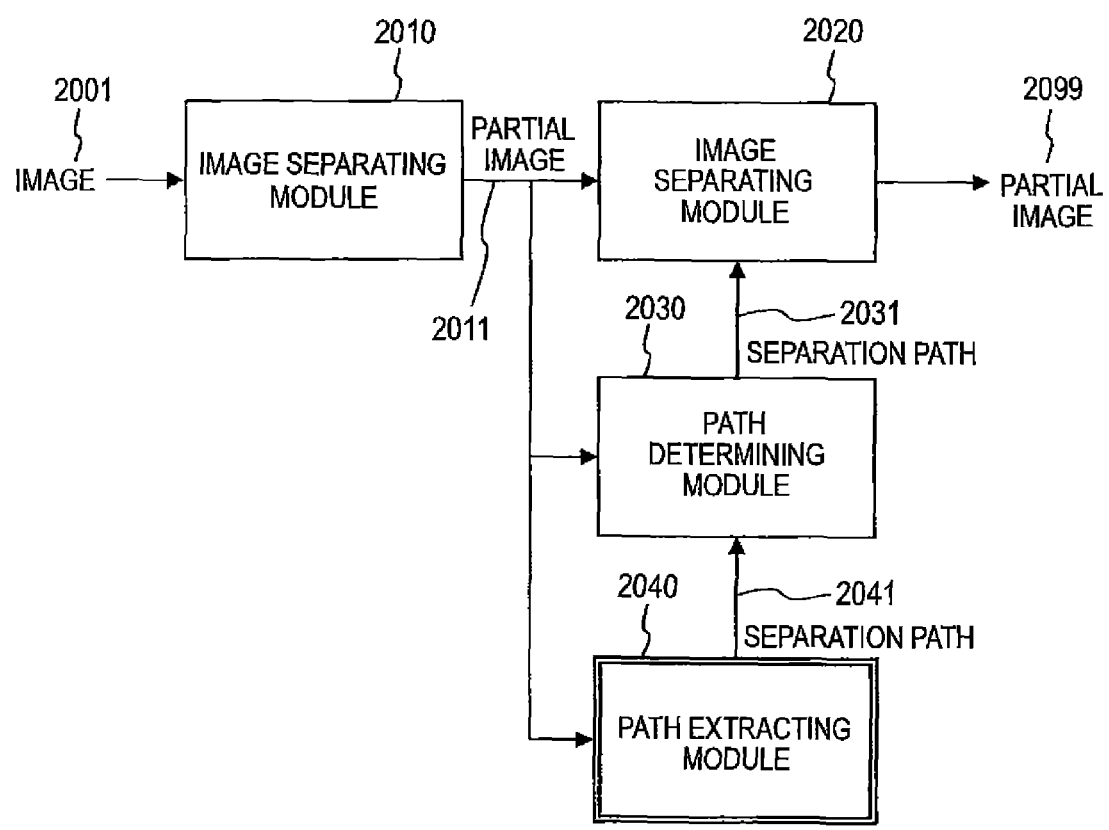
FIG. 20 is a conceptual module structure diagram illustrating an example of the structure of an image processing apparatus provided with a path extracting module.

FIG. 20 is a conceptual module structure diagram illustrating an example of the structure of an image processing apparatus provided with a path extracting module 2040. This exemplary embodiment includes an image separating module 2010, an image separating module 2020, a path determining module 2030, and a path extracting module 2040. This structure is a combination of the examples shown in FIGS. 18 and 19.

The image separating module 2010 is connected to the image separating module 2020, the path determining module 2030, and the path extracting module 2040 and performs the same process as the image separating module 1810 shown in FIG. 18.

The path determining module 2030 is connected to the image separating module 2010, the image separating module 2020, and the path extracting module 2040 and performs the same process as the path determining module 1920 shown in FIG. 19.

The image separating module 2020 is connected to the image separating module 2010 and the path determining module 2030 and performs the same process as the image separating module 1910 shown in FIG. 19. However, a target image is a partial image 2011 received from the image separating module 2010.

A detailed example of the process of calculating the paths in the above-described exemplary embodiments (for example, the process performed by the forward direction path calculating module 1210 and the reverse direction path end point calculating module 1220 in the exemplary embodiment A-1 (FIG. 12)) will be described below.

An example of simultaneously calculating the information of plural shortest paths having different starting points using the shortest paths shown in FIG. 21 for the shortest paths shown in FIG. 1 will be described. Some methods, such as a Dijkstra method, may be used to calculate the shortest paths.

The shortest paths shown in FIG. 21 will be described below.

A tree structure in which a pixel is used as the parent and pixels adjacent to each other in the end point direction (the upper direction in FIG. 21) and three pixels inclined at 45 degrees with respect to the end point direction are used as the child is a target. This structure is repeated, and a tree which has a pixel (starting point 2111) at one end of the image 2100 as the root and the other end (for example, an end point 2121) as the leaf and has a height equal to the image height is extracted, as shown in FIG. 21.

In this exemplary embodiment, the shortest path means a path in which the cost, which is the cumulative value of the brightness values of the pixels (paragraph) on the path, is the minimum or the maximum among all paths from the root to the leaf in the tree. The root is the starting point and the leaf is the end point.

Figure 22:
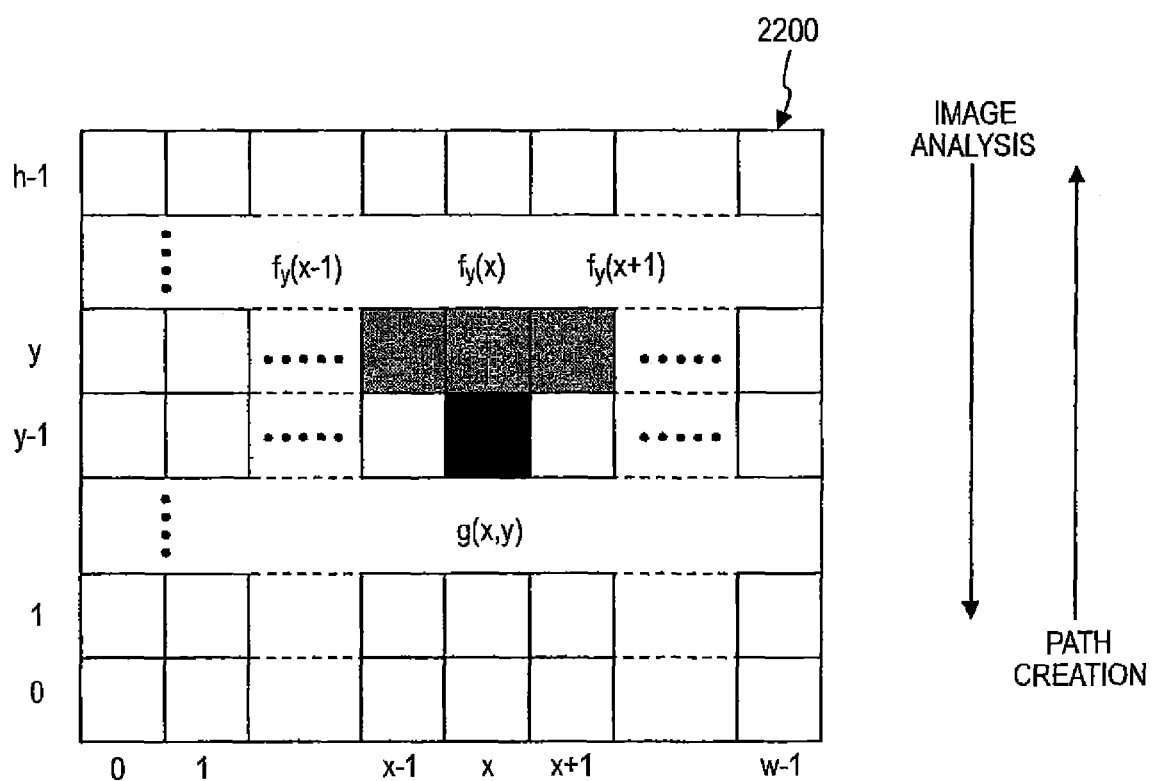
FIG. 22 is a diagram illustrating an example of the calculation of path information.

First, an example of a basic process of calculating the shortest path is shown in the algorithm of Expression 14. For reference, FIG. 22 shows the positional relationship between objects to be processed.

Figure 21:
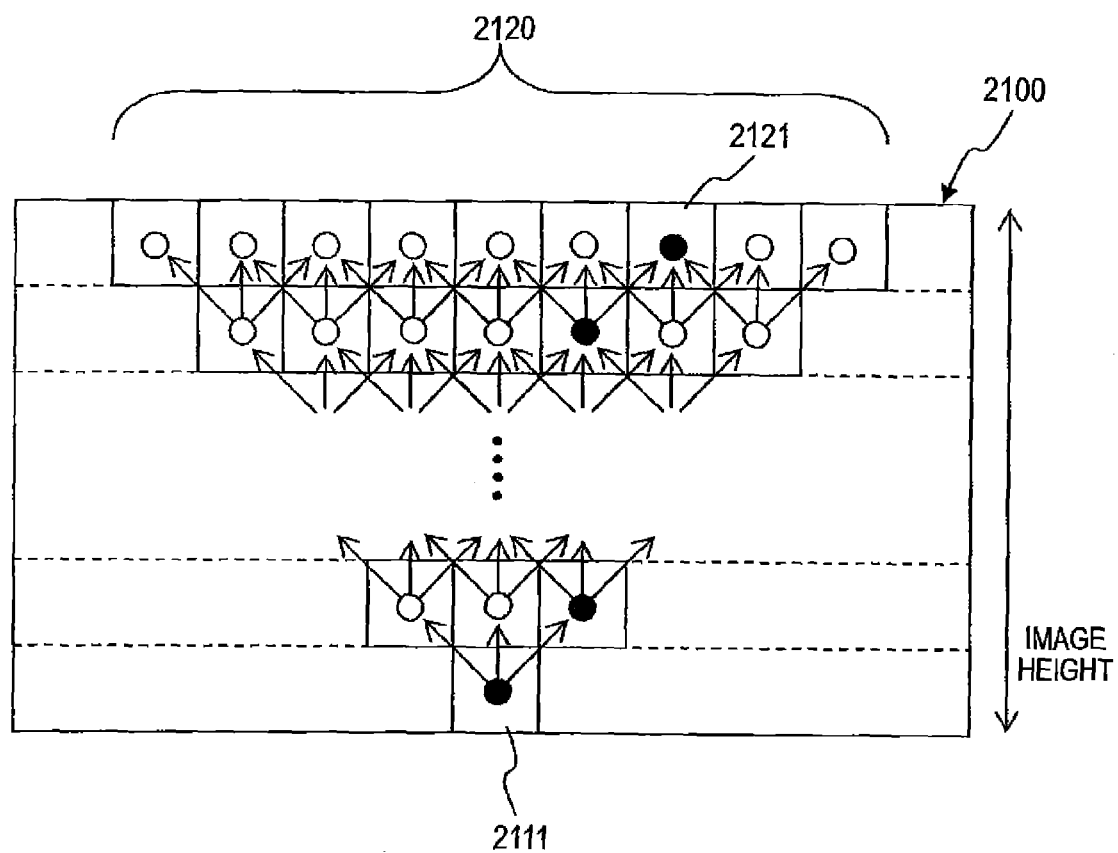
FIG. 21 is a diagram illustrating an example of the calculation of path information.

This example is a backward inductive process and is a method of searching for the shortest path of the tree shown in FIG. 21. However, the cost of the path is at the joint, not the side. It is noted that the process is performed at the position on the image in reverse order in <Step 2: Image analysis> and <Step 3: Creation of path>. The process calculates the shortest path in the upward direction. However, the process may calculate the shortest path in any direction including the downward direction.

This process corresponds to a "forward direction path calculating process". The process after Step 3 corresponds to a "forward direction path creating process".

[Expression 14]
Step 1
Initialization
For x=[0, w−1], $f_{h-1}(x) \leftarrow g(x, h-1)$.
Step 2
Image Analysis
Step 2-1
y←h−1
Step 2-2
For x=[0, w−1], $f_{y-1}(x) \leftarrow c_i \times g(x, y-1) + f_y(x+i)$ and $\phi_{y-1}(x) \leftarrow i$ (where i satisfies $$f_y(x+i) = \min_{-1 \leq j \leq 1}(f_y(x+j))).$$

Step 2-3
y←y−1
Step 2-4
When y=0, the process proceeds to Step 3. If not, the process proceeds to Step 2-2.

Step 3
Creation of Path
For all xs satisfying x∈S,
Step 3-1
p(0)←x∈S
Step 3-2
y←1
Step 3-3
p(y)←p(y−1)+ϕ_y(p(y−1))
Step 3-4
y←y+1
Step 3-5
When y=h, p is added to P. If not, the process proceeds to Step 3-3.
Step 4
P is output and process ends.

When only the end point of the path is output, p(h−1) may be referred to. In order to reduce the work memory, the process after Step 3 may be performed along the algorithm of the following Expression 15:
[Expression 15]
Step 3
Calculation of End Point of Path
For all xs satisfying x∈S,
Step 3-1
e←x∈S
Step 3-2
y←1
Step 3-3
e←e+ϕ_y(e)
Step 3-4
y←y+1
Step 3-5
When y=h, e is added to E. If not, the process proceeds to Step 3-3.
Step 4
E is output and the process ends.

This process corresponds to a "forward direction path end point calculating process" and a "reverse direction path end point calculating process".

Similarly, a path starting point/end point table may be calculated along the algorithm of the following Expression 16:
[Expression 16]
Step 3
Calculation of End Point of Path
For all xs satisfying x∈S,
Step 3-1
e←x∈S
Step 3-2
y←1
Step 3-3
e←e+ϕ_y(e)
Step 3-4
y←y+1
Step 3-5
When y=h, T(x)←e. If not, the process proceeds to Step 3-3.
Step 4
T is output and the process ends.

This process corresponds to a "forward direction path starting point/end point table calculating process" and a "reverse direction path starting point/end point table calculating process".

The meaning of each symbol is as shown in the following Expression 17:
[Expression 17]
w: The width of an image in the horizontal direction
h: The width of an image in the vertical direction
g(x,y): The brightness value of the pixel at the position (x,y) of an input image
$f_y(x)$: Cost information of the path
$\phi_y(x)$: Path creation information
p(y): The position x of the path at a height y
$c_i$: A weight constant in cost evaluation
S: A set of starting points
E: A set of ends points
P: A set of paths
T(x): A starting point/end point table, the end point of the path having the start point at the position x In the above-mentioned process, attention is needed for a method of storing the following Expressions 18 and 19:

$$f_y(x);$$ [Expression 18]

and $$\phi_y(x).$$ [Expression 19]

That is, the number of values stored in Expression 18 and Expression 19 may be smaller than an image size.

Specifically, Expression 18 indicates information related to the cost of the path and is a line buffer. The process may refer to only the previous line, and a unit for storing Expression 18 may be two line buffers. Expression 19 indicates information related to the movement of the path and the process sequentially determines regions without a path. Storage regions corresponding to the regions may be sequentially reduced.

Figure 23:
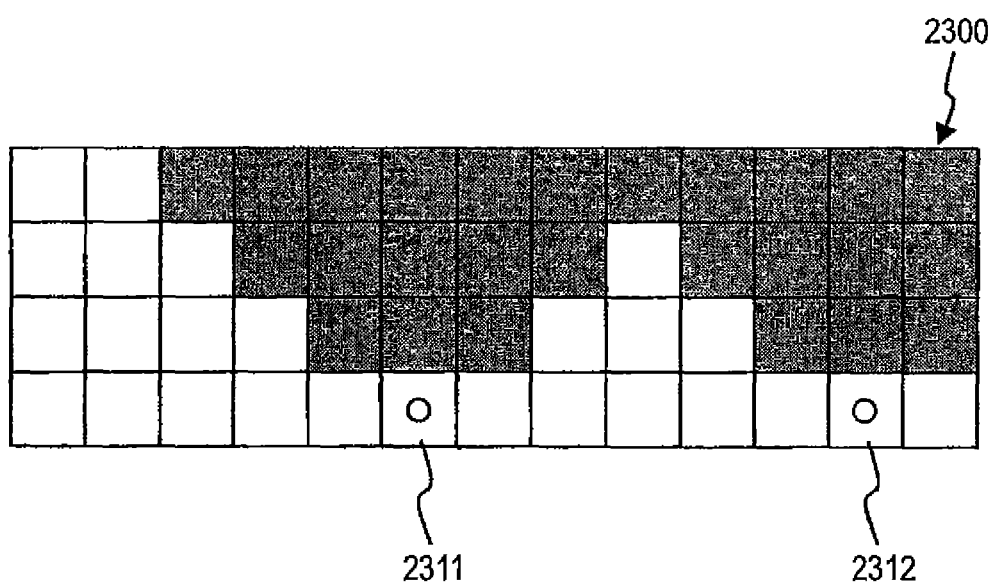
FIG. 23 is a diagram illustrating an example of information required to calculate the path information.

When the starting point is designated, as shown in FIG. 23, the above-mentioned tree structure is formed. Therefore, information required to calculate the shortest path is less than the image size and a region for storing Expression 18 and Expression 19 may be further reduced. In the example shown in FIG. 23, in an image 2300 including a starting point 2311 and a starting point 2312, colored pixels are needed to be referred to in analysis, and white pixels are not necessarily referred to in analysis.

<Experimental Result A>

The experimental results of the above-described exemplary embodiments will be described with reference to FIGS. 24, 25 and 26.

Figure 24:
FIG. 24 is a diagram illustrating an example of a target image.

FIG. 24 is a diagram illustrating an example of a target image (character image "Character"). FIG. 25 is a diagram illustrating an example of the separation of the target image according to this exemplary embodiment. FIG. 26 is a diagram illustrating an example of the projection information of the target image.

The experimental results will be described from the following three viewpoints.

(1) In the projection information, image separation is performed even in a region, which is the gap between character images that cannot be separated.

Figure 26:
FIG. 26 is a diagram illustrating an example of projection information of the target image.

For a character image portion "ter" (see FIG. 24) in the target image, as shown in FIG. 26, there is a gap between the character images that are difficult to be separated in projection information 2600. That is, even when separation is performed using the projection information in the related art, it is difficult to separate the character images since there is no clear valley in the projection information 2600, as shown in FIG. 26.

Figure 25:
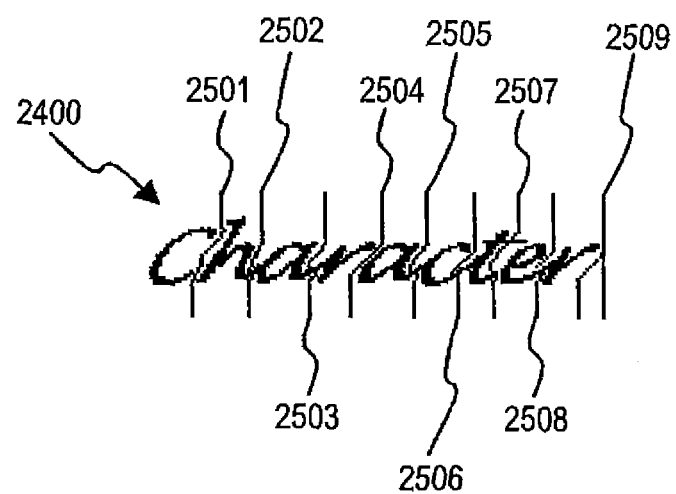
FIG. 25 is a diagram illustrating an example of the separation of the target image.

In this exemplary embodiment, the separation path having a shape passing through the surrounding of the character image is calculated from the image, as shown in FIG. 25.

(2) A connection component is separated.

For character image portions "har", "act", and "er" (see FIG. 24) in the target image, there is a portion that connects adjacent character images.

As shown in FIG. 25, a character image connecting the adjacent character images is also separated in this exemplary embodiment. As described above, this is because the separation path with the minimum or maximum cost is calculated by the image separation method using the shortest path in the range in which the shortest path can be moved.

(3) The process corresponds to a multi-valued image.

An image 2400 shown in FIG. 24 is a multi-valued image. The process according to the above-described exemplary embodiments corresponds to a multi-valued image including a binary image. In this way, for example, it is not necessary to set a threshold value for each of the received images in binarization.

The content described in <A> can be understood as follows.

(A1) An image forming apparatus includes: a first path information calculator that calculates first path information indicating a first path for separating a region from an image; a second path information calculator that calculates second path information indicating a second path which is reverse to the first path and is for separating the region from the image; and a path selector that selects one of the first path information calculated by the first path information calculator and the second path information calculated by the second path information calculator.

(A2) In the image processing apparatus according to (A1), in the first path and the second path, the cumulative value of the brightness values of pixels on the path satisfies predetermined conditions.

(A3) In the image processing apparatus according to (A1) or (A2), the second path information calculator calculates the second path information on the basis of the first path information calculated by the first path information calculator. The first path information calculator calculates the first path information on the basis of the second path information calculated by the second path information calculator in the second or subsequent process.

(A4) In the image processing apparatus according to (A3), the process by the first path information calculator and the process by the second path information calculator end on condition that the processes are performed a predetermined number of times or the first path information calculated by the first path information calculator is identical to the second path information calculated by the second path information calculator.

<B>

Next, an exemplary embodiment based on the technique described in <A> will be described. The separation path calculated on the basis of the technique disclosed in "JP-A-04-10089" may be used as the characteristics of a separation path.

The exemplary embodiment of <B> will be described in brief. In this exemplary embodiment, a projection distribution or a connection component is not used, but a separation path is used. The separation path is the same as that in <A>. <A> relates to the structure that receives the image of a character string and calculates the separation paths for outputting a partial image, such as a single character or a standard character. However, the exemplary embodiment of <B> relates to a structure that separates a received document image into partial images, which are character strings, using the separation paths and outputs the partial images.

In the exemplary embodiment of <B>, the separation path is calculated such that the cost (that is, the cumulative value of the brightness values of pixels on the path) is the minimum or the maximum. Then, a separation boundary between the character strings that do not appear in a projection distribution is specified, characters are disconnected, and the separation boundary between the character strings is specified.

When the direction of the character strings forming a paragraph is not known, it is necessary to determine the direction. In the exemplary embodiment of <B>, the separation paths in plural directions are compared to determine the direction of the character strings.

When the separation paths in the image of the document are calculated, there are the following properties.

(1) The distortion of the separation path in the correct direction is less than that of the separation path in the incorrect direction.

(2) When image separation by the separation paths is not performed (the number of separation paths is 2 or less), there is a single character or a single character string.

The exemplary embodiment of <B> relates to an image processing apparatus that separates (hereinafter, referred to as "cuts out") a character region from an image. In particular, the image processing apparatus is used in the field of a character recognition technique, determines the direction of the character strings included in the image of a target document, and separates character string images.

For the following description, a supplementary description of the field of the character recognition technique will be made. The character separation technique in character recognition is classified as follows for convenience.

(1) Determination of Attributes of Regions (a Character Region and a Non-Character Region) and Separation It is determined whether a region in an image is a character region or a non-character region, and the region is separated.

(2) Determination of Direction of Character String Region and Separation

The direction (vertical or horizontal direction) of a character string region in a character region in an image (including a character region) is determined and the character string region is separated.

(3) Separation of Single Character Region

Characters are separated one by one from an image (including a character region and a character string region).

The exemplary embodiment of <B> particularly belongs to (2).

(2) includes the following two techniques:

A) Determination of direction of character string; and

B) Separation of character string (region).

When the direction of a character string is not known, the function of (2) is a series of A) and B). The exemplary embodiment of <B> is a combination of A) and B)

The separation path is calculated in two directions, that is, the lateral direction (hereinafter, referred to as the horizontal direction. However, the direction may not be strictly the horizontal direction) and the longitudinal direction (hereinafter, referred to as the vertical direction. However, the direction may not be strictly the vertical direction). The separation path is a segment that separates character images in an image.

In this exemplary embodiment, various kinds of determining processes are performed on the basis of the feature amounts of the separation paths. Next, the feature amounts of the separation paths will be described.

The feature amounts of the separation paths are calculated from the number of separation paths, the position and shape of each separation path, and the brightness values of the pixels on the path (hereinafter, the brightness value of the pixel is referred to as a pixel value), which are shown in the following Table 2:

TABLE 2

| Feature amount of separation path | Symbol |
|---|---|
| Number of separation paths | Num |
| Distortion | $Curl_i$ |
| Thickness | $Thick_i$ |
| Cumulative value of pixel values on path | $Cost_i$ |

In addition, the corresponding symbols are defined. In Table 2, i indicates an index related to the number of paths.

Next, the feature amounts shown in Table 2 will be described.

First, the feature amount "Num" indicates the number of separation paths.

The feature amount "$Curl_i$" indicates the degree of the distortion of the shape of a separation path i (where i≦Num). The distortion is the difference between a straight line guided from the starting point and the end point of the separation path i and the separation path i. When the former (the straight line guided from the starting point and the end point of the separation path i) is $f_i(x)$ and the latter (separation path i) is $p_i(x)$, the distortion is, for example, $\Sigma x |f_i(x) - p_i(x)| dx$, $Max(|f_i(x) - p_i(x)|)$, or $\Sigma x (f_i(x) - p_i(x))^2 dx$.

The feature amount "$Thick_i$" indicates the thickness of the separation path i. In the separation of the character strings, the feature amount "$Thick_i$" corresponds to the gap between adjacent character strings (where i Num).

The feature amount "$Cost_i$" indicates the cost defined by the calculation of the separation path (where i≦Num). Alternatively, the cumulative value of the pixel values on the separation path i may be calculated as the cost.

The feature amount may be normalized by the length of the separation path since the length of the separation path is different in each direction (horizontal and vertical direction).

In the exemplary embodiment of <B>, a "path feature amount calculating process" calculates the feature amount.

<B-1.1: For Analysis Unit in Predetermined Section in Calculation of Separation Path>

Figure 27A:
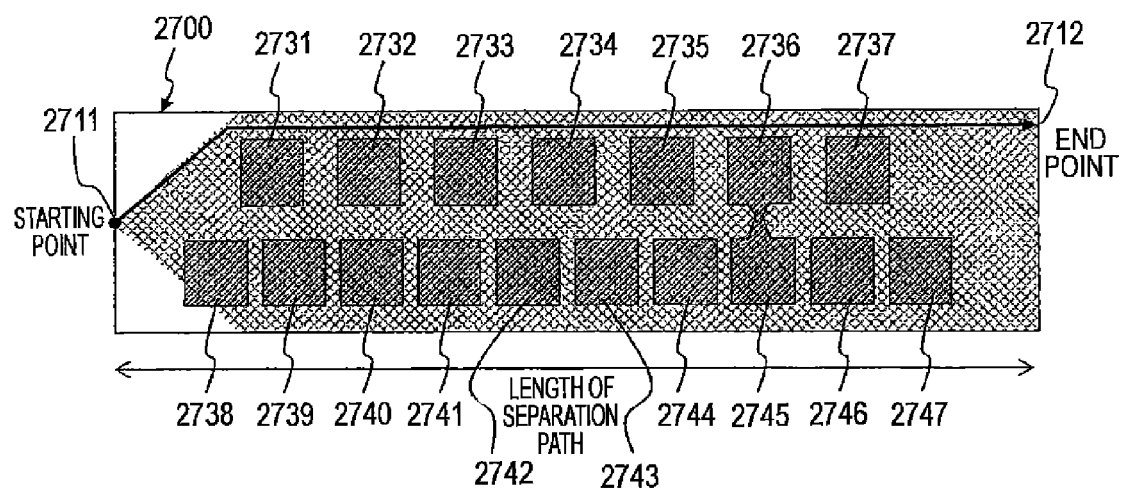
FIGS. 27A and 27B are diagrams illustrating an example of a process of calculating separation paths.
Figure 27B:
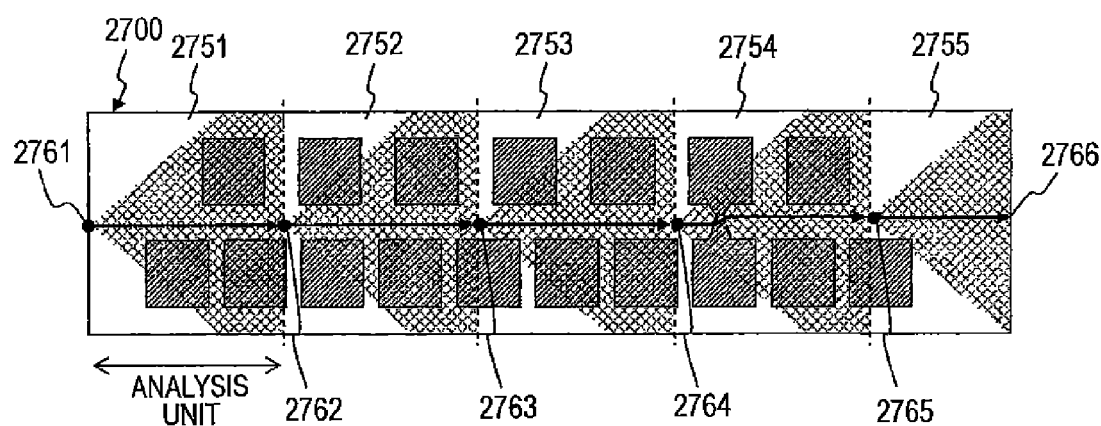

This will be described with reference to FIGS. 27A and 27B. FIGS. 27A and 27B are diagrams illustrating an example of a process of calculating the separation path.

The separation path calculating process described in <A> or the separation path calculating process disclosed in "JP-A-04-10089" calculates the path in which $Cost_i$ is the minimum or the maximum in the movement range of the separation path. In this case, as the length of the separation path increases, the movement range of the separation path is widened. When the movement range of the separation path is excessively wide, as shown in FIG. 27A, a local obstacle pattern (obstacle patterns 2731 to 2747; an example of the local obstacle pattern is, for example, a character image) has a great effect on the calculation of the separation path. That is, the local obstacle pattern has a negative effect on the accuracy of separation from the object of cutting out the character string. For example, as shown in FIG. 27A, the obstacle pattern 2736 and the obstacle pattern 2745 contact each other due to, for example, noise or writing. Therefore, the path in which $Cost_i$ is the minimum or the maximum extends from the starting point 2711 to the end point 2712 through the upper side.

In the calculation of the separation path, the separation path in which the cumulative value of the pixel values on the pixel satisfies predetermined conditions is calculated in a predetermined range of a target image including a portion of the character image. Specifically, as shown in FIG. 27B, the target image is divided into analysis units in predetermined sections, and the separation path in the next section is calculated using the end point of the separation path in a given section as used as the starting point of an adjacent section (for example, a middle point 2762, which is the end point of a region 2751, is used as the starting point of a region 2752). This process is repeatedly performed to narrow the movement range of the separation path, and the presence of a local obstacle pattern reduces an influence on the calculation of the separation path. Therefore, in a region 2754, a separation path that cuts the connection between the obstacle pattern 2736 and the obstacle pattern 2745 is calculated and the straightness of the separation path is adjusted. The regions, such as the region 2751 which is a predetermined range, may have the same size or different sizes. For example, the size of a character in a target image may be measured and the size of, for example, the region 2751 may be determined on the basis of the multiple of the size of the character. Alternatively, the size of, for example, the region 2751 may be determined such that a predetermined number of characters are included in the region.

In particular, in the technique described in <A>, in the process of calculating the separation path, the line buffer related to $Cost_i$ is provided. However, in this case, the same process as described above is obtained by only initializing the line buffer for each predetermined length.

<B-1.2: Combination of Plural Equivalent Separation Paths>

As in the technique described in <A>, after the separation paths are calculated, plural equivalent separation paths are combined with each other.

In the combination of plural equivalent separation paths, when the width of the gap between adjacent separation paths satisfies predetermined conditions in the calculation of the separation paths, the adjacent separation paths are determined to be equivalent, regardless of the brightness values of the pixels in the gap, and are combined with each other. Alternatively, when the cumulative value of the brightness values of the pixels in the gap between adjacent separation paths satisfies predetermined conditions in the calculation of the separation paths, the adjacent separation paths are determined to be equivalent and are combined with each other.

This process will be described with reference to FIG. 28. FIG. 28 is a diagram illustrating an example of a process of combining the separation paths. Two adjacent separation paths are equivalent to each other by the obstacle pattern of the gap between the two adjacent separation paths from the object of separation and are combined into a single separation path. In FIG. 28, separation paths 2811 to 2815 are combined into a separation path 2851, separation paths 2816 to 2819 are combined into a separation path 2852, and separation paths 2820 and 2821 are combined into a separation path 2853. Since there is no separation path equivalent to a separation path 2822 and a separation path 2823, the separation path 2822 and the separation path 2823 are not combined with other separation paths. The combined separation path has a thickness equal to or more than 1 [pixel]. Among obstacle patterns 2831 to 2837, the obstacle pattern 2834 is noise.

The combination process will be described with reference to FIG. 29. FIG. 29 is a diagram illustrating an example of the process of combining the separation paths. The combined separation path is referred to as $path_i$, and $path_i = (top\_path_i, bottom\_path_i)$ is represented by two separation paths, which are the outline of the separation paths. In this case, when a separation path before combination is $src\_path_i$, $top\_path_i$ and $bottom\_path_i$ indicate $src\_path_j$. In the combination of three of more separation paths, a separation path ($src\_path_{j-1}$, which is a separation path 2912, in FIG. 29) that is not disposed at the end is deleted. The combined path $path_i$ with a thickness is "$top\_path_i \neq bottom\_path_i$". The path $path_i$ that is not combined is "$top\_path_i = bottom\_path_i$". Since the separation paths are aligned in the horizontal direction, the combined separation path is represented by the upper end (top) and lower end (bottom) separation paths. However, in the case of the separation paths in the vertical direction, the combined separation path is represented by the right and left separation paths.

A separation path 2951 obtained by combining the upper three separation paths (separation paths 2911 to 2913) in FIG. 29 is represented by the following Expression 20:

$$path_{i-1} = (\text{top\_path}_{i-1}, \text{bottom\_path}_{i-1}) \quad \text{[Expression 20]}$$

$$\begin{cases} \text{top\_path}_{i-1} = \text{src\_path}_{j-2} \\ \text{bottom\_path}_{i-1} = \text{src\_path}_{j}. \end{cases}$$

That is, the separation path 2951 is represented by the information of the outline of the separation paths.

One separation path (separation path 2914) on the lower side of FIG. 29 is not combined. However, the separation path is represented by the following Expression 21 according to combination notation:

$$path_i = (\text{top\_path}_i, \text{bottom\_path}_i)$$

$$\text{top\_path}_i = \text{bottom\_path} = \text{src\_path}_{j+1}. \quad \text{[Expression 21]}$$

When the width of the gap between adjacent separation paths satisfies predetermined conditions (for example, when the width is equal to or less than a predetermined value), the separation paths may be combined with each other, regardless of the presence or absence of an obstacle pattern. Similarly, when the cost (the cumulative value of the pixel values) of the gap between adjacent separation paths satisfies predetermined conditions (for example, when the cost is equal to or less than a predetermined value), the separation paths may be combined with each other.

The combination of the separation paths and the calculation of the feature amount may be combined with each other. For example, when the path is a combination of n $src\_paths_j$, the feature amount $Thick_i$, which will be described below, may be n.

<B-1.3: For Feature Amount of Separation Path>

An example of the feature amount of the separation path shown in Table 2 will be described on the basis of the above-mentioned definition of the separation path.

Next, for simplicity, the separation path in the horizontal direction will be described. The separation path in the vertical direction can correspond to the separation path in the horizontal direction by changing the upper end to the right end and the lower end to the left end. Hereinafter, the starting point of the path is $(x_s, y_s)$, the end point is $(x_e, y_e)$, and $x_s < x_e$ is satisfied. The horizontal position x and the vertical position y of a separation path i are represented by "$\text{top\_path}_i(x)$, $\text{bottom\_path}_i(x)$". The pixel value of a target image at the horizontal position x and the vertical position y is represented by $img(x, y)$. For simplicity, as the value of $img(x, y)$ increases, the probability of the obstacle pattern appearing increases.

First, the feature amount "Num" indicates the number of combined separation paths.

The feature amount "$Curl_i$" is extracted by, for example, the following Expressions 22, 23, 24, and 25:

$$Curl_i = \begin{cases} \dfrac{\sum_{x=x_s}^{x_e} |f(x) - \text{top\_path}_i(x)|}{x_e - x_s} & \dots (\text{top\_path}_i = \text{bottom\_path}_i) \\ 0 & \dots (\text{others}); \end{cases} \quad \text{[Expression 22]}$$

$$Curl_i = \begin{cases} \dfrac{\sum_{x=x_s}^{x_e} (f(x) - \text{top\_path}_i(x))^2}{x_e - x_s} & \dots (\text{top\_path}_i = \text{bottom\_path}_i) \\ 0 & \dots (\text{others}); \end{cases} \quad \text{[Expression 23]}$$

$$Curl_i = \dfrac{\sum_{x=x_s}^{x_e} |f(x) - \lfloor p_i(x) \rfloor|}{x_e - x_s} \quad \text{[Expression 24]}$$

where $p_i(x) = \dfrac{\text{top\_path}_i(x) + \text{bottom\_path}_i(x)}{2}$; and $$Curl_i = \dfrac{\sum_{x=x_s}^{x_e-d} |\lfloor p_i(x+d) \rfloor - \lfloor p_i(x) \rfloor|}{x_e - x_s}. \quad \text{[Expression 25]}$$

The feature amount "$Thick_i$" is extracted by, for example, the following Expressions 26, 27, and 28:

$$Thick_i = \begin{cases} 1 & \dots (\text{top\_path}_i = \text{bottom\_path}_i) \\ \max_{x_s \le x \le x_e} |\text{top\_path}_i(x) - \text{bottom\_path}_i(x)| & \dots (\text{others}); \end{cases} \quad \text{[Expression 26]}$$

$$Thick_i = \begin{cases} 1 & \dots \text{(top\_path}_i = \text{bottom\_path}_i) \\ \min_{x_s \leq x \leq x_e} |\text{top\_path}_i(x) - \text{bottom\_path}_i(x)| & \dots \text{(others)}; \end{cases} \quad \text{[Expression 27]}$$

and $$Thick_i = \frac{\sum_{x=x_s}^{x_e}(\text{bottom\_path}_i(x) - \text{top\_path}_i(x))}{x_e - x_s}. \quad \text{[Expression 28]}$$

The feature amount "$Cost_i$" is extracted by, for example, the following Expressions 29, 30, and 31:

$$Cost_i = \begin{cases} \sum_{x=x_s}^{x_e} img(x, \text{top\_path}_i(x)) & \dots \text{(top\_path}_i = \text{bottom\_path}_i) \\ \sum_{x=x_s}^{x_e} \sum_{y=\text{top\_path}_i(x)}^{\text{bottom\_path}_i(x)} img(x, y) & \dots \text{(others)}; \end{cases} \quad \text{[Expression 29]}$$

$$Cost_i = \sum_{x=x_s}^{x_e} img(x, \lfloor p_i(x) \rfloor); \text{ and} \quad \text{[Expression 30]}$$

$$Cost_i = \sum_{x=x_s}^{x_e - 1} (c_i \times img(x, \lfloor p_i(x) \rfloor)) \quad \text{[Expression 31]}$$

$$c_i = \begin{cases} 1 & \dots (p_i(x) = p_i(x+1)) \\ c & \dots \text{(others)}. \end{cases}$$

Figure 30:
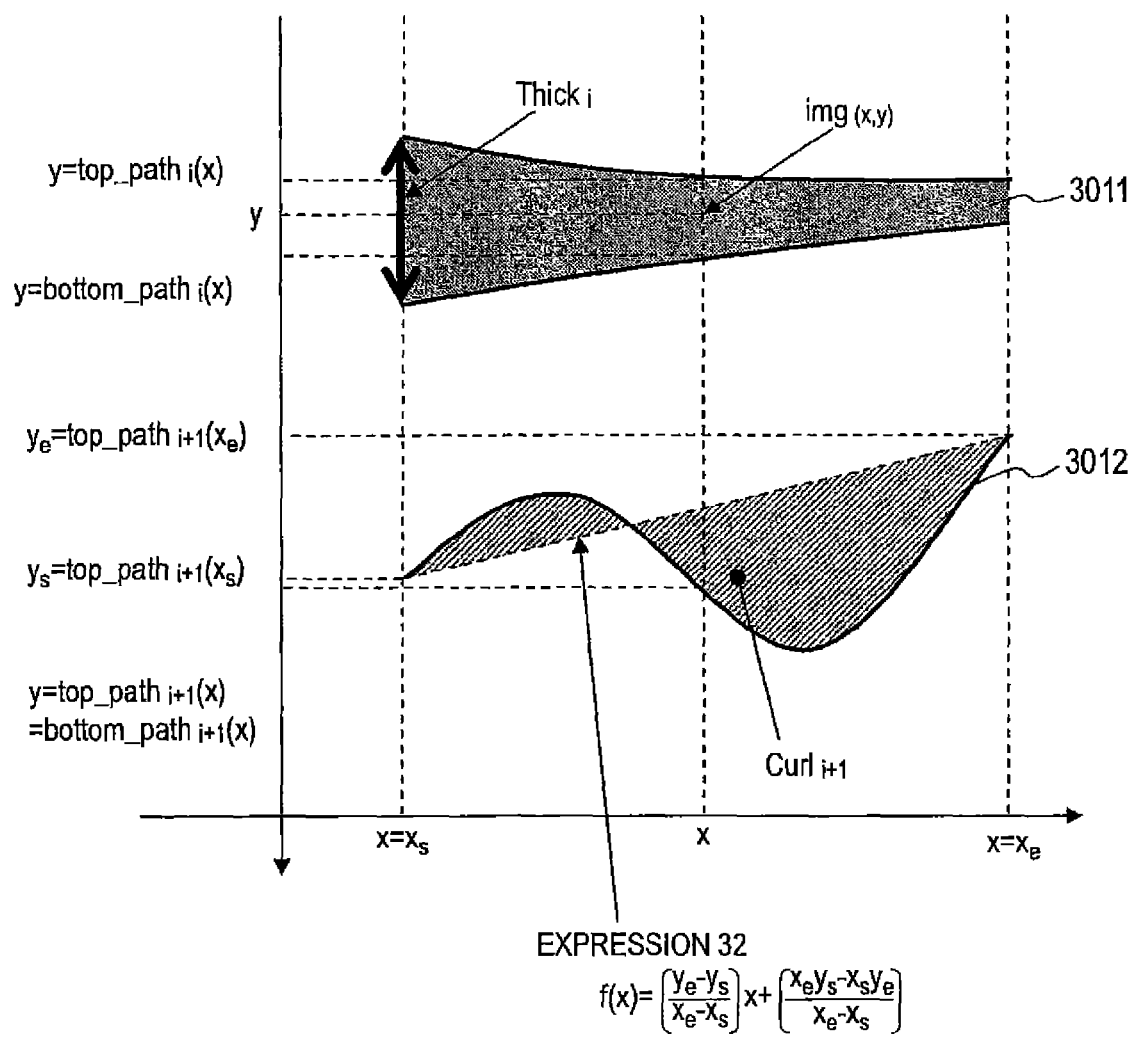
FIG. 30 is a diagram illustrating an example of feature amounts.

The feature amounts will be described with reference to FIG. 30. FIG. 30 mainly shows the feature amounts represented by Expressions 22 and 26. That is, the feature amount $Thick_i$ of a separation path 3011 shown in FIG. 30 is extracted by Expression 22 and the feature amount $Curl_{i+1}$ of a separation path 3012 is extracted by Expression 26. The separation path 3011 has a thickness equal to or more than 1, and the separation path 3012 has a thick of 1.

The feature amount $Curl_i$ will be described using the separation path 3012. In FIG. 30, the difference (the area of a ray portion) between the separation path 3012 represented by a solid line and a straight line f(x) (the following Expression 32) passing through the starting point and the end point of the separation path 3012 is normalized by the length (=$x_e - x_s$) of the separation path 3012:

$$f(x) = \left(\frac{y_e - y_s}{x_e - x_s}\right)x + \left(\frac{x_e y_s - x_s y_e}{x_e - x_s}\right). \quad \text{[Expression 32]}$$

For the feature amount $Curl_i$, the difference between the separation path 3012 and a straight line connecting the starting point and the end point may be evaluated, as shown in Expressions 22, 23, and 24. Specifically, Expression 22 is the absolute value of the difference between a path without a thickness and the straight line, and Expression 23 is the square error of the difference between the path without a thickness and the straight line. In addition, Expression 24 is the absolute value of the difference between a center line calculated for a path with a thickness and the straight line, similar to Expression 22. As in Expression 25, the differential value (differential distance $d_{[px]}$) of the path may be evaluated.

For the feature amount $Thick_i$, the maximum value, the minimum value, or the average value may be used, as in Expressions 26, 27, and 28.

For the feature amount $Cost_i$, the cumulative value of the pixel values on the path may be evaluated as in Expressions 29 and 30. Specifically, Expression 29 is an example of evaluating the cumulative value of the pixel values on the path. Expression 30 is an example of evaluating the cumulative value of the pixel values on the center line of the path. As in Expression 31, the cumulative value of the pixel values on the path weighted by the curvature of the path may be evaluated. That is, a separation path in which the cumulative value of the product of the brightness value of the pixel on the path and a weight coefficient based on the movement of the path satisfies predetermined conditions may be calculated. The weight coefficient is determined on the basis of the relationship between $p_i(x)$ and $p_i(x+1)$. Specifically, when $p_i(x)$ and $p_i(x+1)$ are equal to each other (that is, in the case of a straight line), a weight coefficient ($c_i$) is 1. When $p_i(x)$ and $p_i(x+1)$ are different from each other (that is, in the case of an oblique line), the weight coefficient ($c_i$) is c (c is greater than 1).

<B-2 Exemplary Embodiment>

In this exemplary embodiment, a process of separating a character string and a process of determining the direction of the character string are performed on the image of a document.

<Exemplary Embodiment B-1>

An exemplary embodiment that receives the image of a document and separates a character string will be described.

In the B-1 exemplary embodiment, it is assumed that the direction of the character string in the received image of the document has been known.

Figure 31:
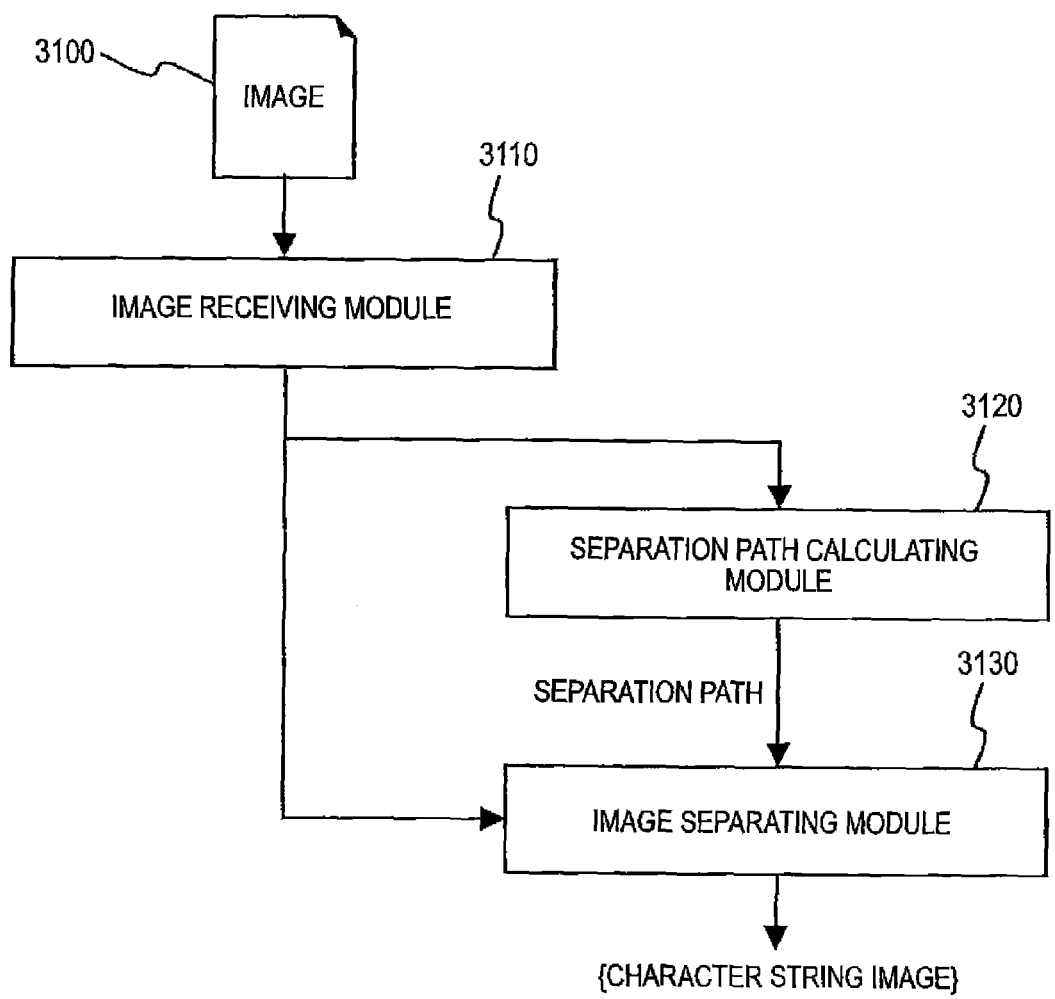
FIG. 31 is a conceptual module structure diagram illustrating an example of a structure according to an exemplary embodiment B-1.

FIG. 31 is a conceptual module structure diagram illustrating an example of a structure according to the exemplary embodiment B-1. The exemplary embodiment B-1 calculates a separation path aligned in the direction of the known character string, separates the image on the basis of the separation path, and outputs the separated image. The exemplary embodiment B-1 includes an image receiving module 3110, a separation path calculating module 3120, and an image separating module 3130.

The image receiving module 3110 is connected to the separation path calculating module 3120 and the image separating module 3130. The image receiving module 3110 receives an image 3100 and transmits the image to the separation path calculating module 3120 and the image separating module 3130. The reception of the image includes, for example, reading an image with a scanner or a camera, receiving an image from an external apparatus through a communication line using a facsimile, and reading an image stored in a hard disk (including a hard disk provided in a computer and a hard disk connected through a network). The image may be a binary image or a multi-valued image (including a color image). The number of received images may be one or two or more. The content of the image may be, for example, a document for business or an advertisement pamphlet as long as it includes at least a character image.

The separation path calculating module 3120 is connected to the image receiving module 3110 and the image separating module 3130. The separation path calculating module 3120 calculates a separation path for separating a character image in the image received by the image receiving module 3110. For example, the character image is separated by the techniques described in <A>, <B-1.1: For analysis unit in predetermined section in calculation of separation path>, and <B-1.2: For combination of plural equivalent separation paths>. Since the direction of the character string in the image received by the image receiving module 3110 has been known, the separation path in the direction may be calculated.

The image separating module 3130 is connected to the image receiving module 3110 and the separation path calculating module 3120. The image separating module 3130 separates the image received by the image receiving module 3110 into plural character string images using the separation path calculated by the separation path calculating module 3120. For example, there is a process of separating a region in the gap between bottom_path$_{i-1}$ and top_path$_i$. When the number of obstacle patterns on the path is equal to or more than a predetermined value, that is, when Cost$_{i-1}$ or Cost$_{i-1}$ is equal to or more than a predetermined value, a region in the gap between top_path$_{i-1}$ and top_path$_i$, bottom_path$_{i-1}$ and bottom_path$_i$, or top_path$_{i-1}$ and bottom_path$_i$ is separated. Therefore, in the output character string image, a portion of the character pattern is not lost.

<Exemplary Embodiment B-2>

An exemplary embodiment that receives the image of a document and determines the direction of a character string will be described.

Figure 32:
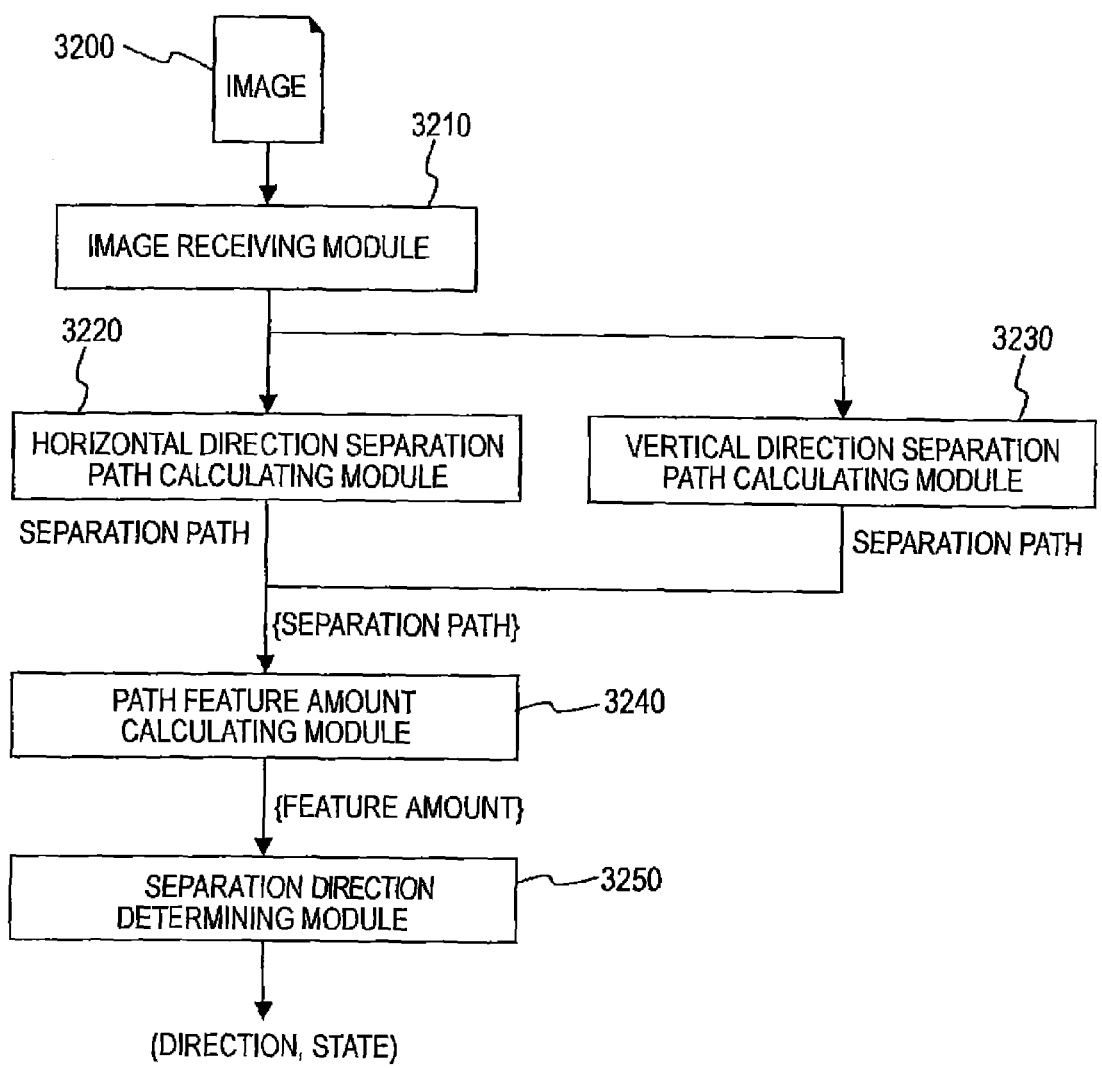
FIG. 32 is a conceptual module structure diagram illustrating an example of a structure according to an exemplary embodiment B-2.

FIG. 32 is a conceptual module structure diagram illustrating an example of a structure according to an exemplary embodiment B-2. The exemplary embodiment B-2 calculates separation paths in the horizontal direction and the vertical direction, calculates the feature amounts of each of the separation paths, compares the feature amounts to determine the direction and state of the character string, and outputs the comparison. The exemplary embodiment B-2 includes an image receiving module 3210, a horizontal direction separation path calculating module 3220, a vertical direction separation path calculating module 3230, a path feature amount calculating module 3240, and a separation direction determining module 3250.

The image receiving module 3210 is connected to the horizontal direction separation path calculating module 3220 and the vertical direction separation path calculating module 3230 and performs the same process as the image receiving module 3110 according to the exemplary embodiment B-1. The image receiving module 3210 receives an image 3200 and transmits the image to the horizontal direction separation path calculating module 3220 and the vertical direction separation path calculating module 3230. The direction of the character string in the image 3200 is not known. Therefore, it is necessary to calculate the separation paths in plural directions (the horizontal direction and the vertical direction). In this exemplary embodiment, it is assumed that the image 3200 is the image of a document including a single paragraph.

The horizontal direction separation path calculating module 3220 is connected to the image receiving module 3210 and the path feature amount calculating module 3240. The vertical direction separation path calculating module 3230 is connected to the image receiving module 3210 and the path feature amount calculating module 3240. The image receiving module 3210 and the horizontal direction separation path calculating module 3220 correspond to the separation path calculating module 3120 according to the exemplary embodiment B-1, calculate the separation paths in plural directions, and transmit the separation paths to the path feature amount calculating module 3240.

The horizontal direction separation path calculating module 3220 calculates the separation path, which is a segment in the horizontal direction, for separating a character image in the image received by the image receiving module 3210. For example, the character image is separated by the techniques described in <A>, <B-1.1: For analysis unit in predetermined section in calculation of separation path>, and <B-1.2: For combination of plural equivalent separation paths>.

The vertical direction separation path calculating module 3230 calculates the separation path, which is a segment in the vertical direction, for separating a character image in the image received by the image receiving module 3210. For example, the character image is separated by the techniques described in <A>, <B-1.1: For analysis unit in predetermined section in calculation of separation path>, and <B-1.2: For combination of plural equivalent separation paths>.

The path feature amount calculating module 3240 is connected to the horizontal direction separation path calculating module 3220, the vertical direction separation path calculating module 3230, and the separation direction determining module 3250. The path feature amount calculating module 3240 calculates the feature amounts of the separation paths in plural directions calculated by the horizontal direction separation path calculating module 3220 and the vertical direction separation path calculating module 3230 and transmits the feature amounts to the separation direction determining module 3250. For example, the path feature amount calculating module 3240 calculates the feature amounts using Expressions 22, 26, and 29 and the statistical values thereof. In the following description, the maximum value of the feature amount F is represented by MaxF, the minimum value thereof is represented by MinF, and the average value thereof is represented by AvgF. For example, the maximum value of distortion is represented by MaxCurl.

Figure 33:
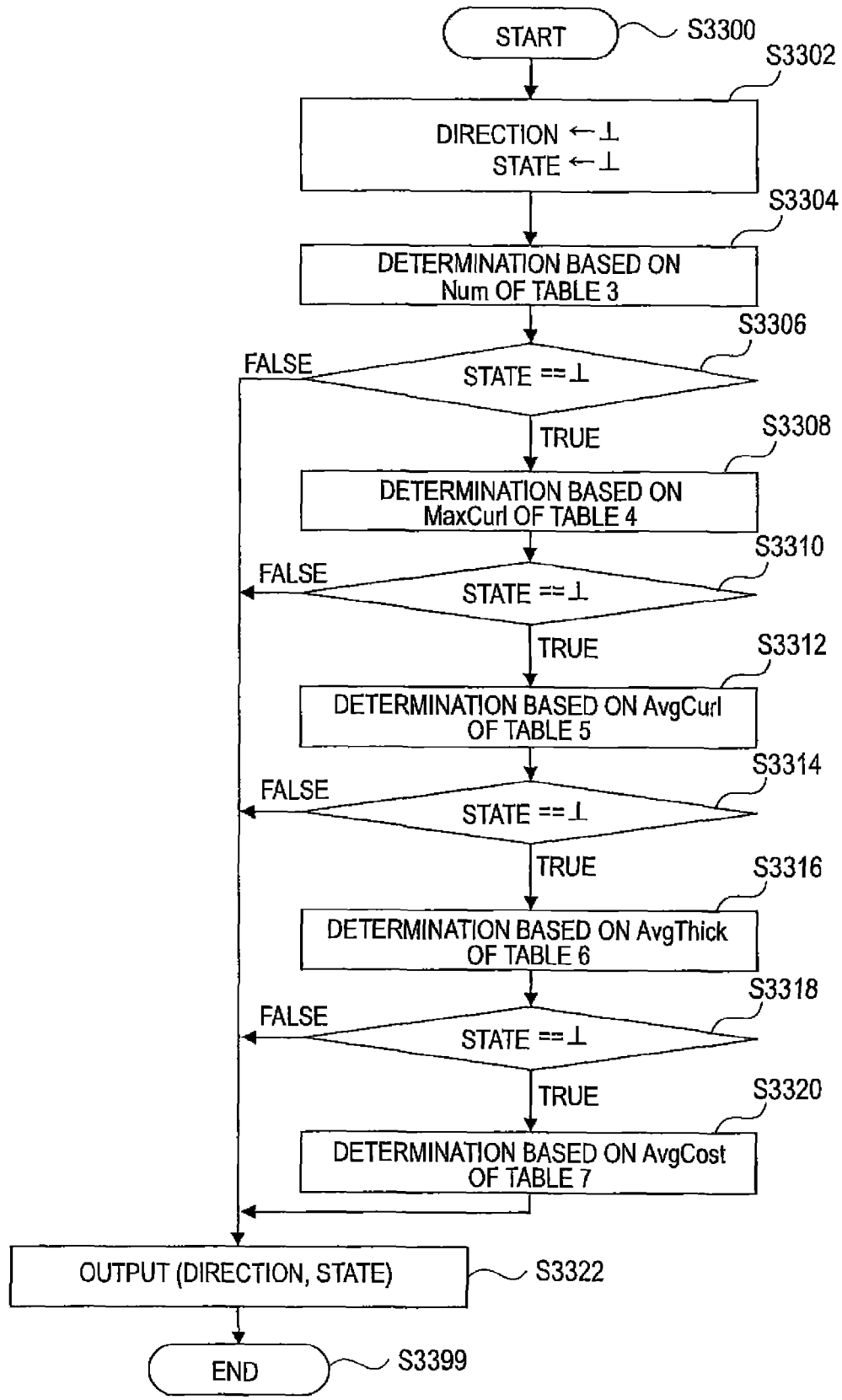
FIG. 33 is a flowchart illustrating an example of a direction determining process.

The separation direction determining module 3250 is connected to the path feature amount calculating module 3240. The separation direction determining module 3250 determines the separation direction of the image and the state of the character image on the basis of the feature amounts calculated by the path feature amount calculating module 3240 and selects separation paths among the separation paths in plural directions on the basis of the determination result. Specifically, the process is performed along a flowchart shown in FIG. 33. FIG. 33 is a flowchart illustrating an example of the direction determining process of the separation direction determining module 3250.

In the flowchart shown in FIG. 33, the separation direction determining module 3250 performs the direction determining process using Table 3, Table 4, Table 5, Table 6, and Table 7. Next, the direction determining process will be described.

TABLE 3

|  |  | Num of H = 2 | |
|---|---|---|---|
|  |  | True | False |
| Num of V = 2 | True | State←C | Direction←V State←T |
|  | False | Direction←H State←T | Nothing (⊥) |

TABLE 4

|  | MaxCurl | | |
|---|---|---|---|
|  | Others (H == V) | H < V | H > V |
| Process | Nothing (⊥) | Direction←H State←P | Direction←V State←P |

TABLE 5

|  | AvgCurl | | |
|---|---|---|---|
|  | Others (H == V) | H < V | H > V |
| Process | Nothing (⊥) | Direction←H State←P | Direction←V State←P |

TABLE 6

|  | AvgThick | | |
|---|---|---|---|
|  | Others (H == V) | H > V | H < V |
| Process | Nothing (⊥) | Direction←H State←P | Direction←V State←P |

TABLE 7

|  | AvgCost | | |
|---|---|---|---|
|  | Others (H == V) | H < V | H > V |
| Process | Nothing (⊥) | Direction←H State←P | Direction←V State←P |

The separation direction determining module 3250 compares the feature amounts of the separation paths in the horizontal direction and the vertical direction transmitted from the horizontal direction separation path calculating module 3220 and the vertical direction separation path calculating module 3230 and determines the separation direction (that is, the direction of an output character string; hereinafter, referred to as a "direction") of a target image and the state of the target image (hereinafter, referred to as a "state"). The direction and state are variables with the following values.

The "direction" has the following three values:
(1) H: horizontal;
(2) V: vertical; and
(3) ⊥: determination is unavailable.

The "state" has the following four values:
(1) P: single paragraph;
(2) T: single character string;
(3) C: single character; and
(4) ⊥: determination is unavailable.

In the flowchart shown in FIG. 33, first, it is determined whether a target image is a single character, a single character string, or others using Table 3. This determination is performed by the number Num of separation paths. That is, when both of the number of separation paths in the horizontal direction and the number of separation paths in the vertical directions are two, the target image is a single character (C). When either the number of separation paths in the horizontal direction or the number of separation paths in the vertical directions is two, the target image is a single character string (T). When the number of separation paths in the horizontal direction is two, the direction is horizontal (H). When the number of separation paths in the vertical direction is two, the direction is vertical (V). When neither the number of separation paths in the horizontal direction nor the number of separation paths in the vertical directions is two, the target image is nothing (the determination of the state is unavailable (⊥)).

The direction of the character string is determined on the basis of the feature amount of the separation path using Table 4, Table 5, Table 6, and Table 7.

In the flowchart shown in FIG. 33, "determination based on Num" (Table 3), "determination based on Curl" (Table 4 and Table 5), "determination based on Thick" (Table 6), and "determination based on Cost" (Table 7) are performed in this order. Next, the order will be described.

First, the separation direction determining module 3250 determines the direction of the character string on the basis of the shape of the separation path. Therefore, the "determination based on Cost", which is not determination based on shape information, has the lowest priority and is arranged in the last stage.

Since the "determination based on Curl" and "determination based on Thick" which are determination based on shape information, correspond to arrangement, such as itemization, the direction in which MaxThick or AvgThick is the maximum is not necessarily the direction of the character string. Therefore, the "determination based on Curl" (Table 4 and Table 5) is arranged before the "determination based on Thick" (Table 6).

For the "determination based on Curl", the total number of separation paths in the horizontal direction is not necessarily equal to the number of separation paths in the vertical direction, according to a target image (that is, for example, there is horizontal writing that is long in the vertical direction or vertical writing that is long in the horizontal direction). Since the average value of the separation paths in a given direction is affected by the total number of separation paths, the "determination based on MaxCurl" (Table 4) is arranged before the "determination based on AvgCurl" (Table 5).

The above-mentioned determination process is designed considering the image of a document including plural character strings. However, the image of a target document does not necessarily include plural character strings. Therefore, the "determination based on Num" (Table 3) is arranged at the forefront to determine whether the image of a target document is a single character, a single character string, or others.

In Step S3302, ⊥ (determination is unavailable) is substituted into a "direction" variable and ⊥ (determination is unavailable) is substituted into a "state" variable.

In Step S3304, determination is performed on the basis of Num of Table 3.

In Step S3306, it is determined whether the "state" variable indicates "determination is unavailable" (state==⊥). When it is determined that the "state" variable indicates "determination is unavailable", the process proceeds to Step S3308. In the other cases, the process proceeds to Step S3322.

In Step S3308, determination is performed on the basis of MaxCurl of Table 4. That is, when MaxCurl in the horizontal direction is less than MaxCurl in the vertical direction, the direction is horizontal (H) and the state is a single paragraph (P). When MaxCurl in the horizontal direction is more than MaxCurl in the vertical direction, the direction is vertical (V) and the state is a single paragraph (P). In other cases (when MaxCurl in the horizontal direction is equal to MaxCurl in the vertical direction), nothing is done (the state "determination is unavailable (⊥)" is maintained).

In Step S3310, it is determined whether the "state" variable indicates "determination is unavailable" (state=⊥). When it is determined that the "state" variable indicates "determination is unavailable", the process proceeds to Step S3312. In other cases, the process proceeds to Step S3322.

In Step S3312, determination is performed on the basis of AvgCurl of Table 5. That is, when AvgCurl in the horizontal direction is less than AvgCurl in the vertical direction, the direction is horizontal (H), and the state is a single paragraph (P). When AvgCurl in the horizontal direction is more than AvgCurl in the vertical direction, the direction is vertical (V), and the state is a single paragraph (P). In other cases (when AvgCurl in the horizontal direction is equal to AvgCurl in the vertical direction), nothing is done (the state "determination is unavailable (I)" is maintained).

In Step S3314, it is determined whether the "state" variable indicates "determination is unavailable" (state==⊥). When it is determined that the "state" variable indicates "determination is unavailable", the process proceeds to Step S3316. In other cases, the process proceeds to Step S3322.

In Step S3316, determination is performed on the basis of AvgThick of Table 6. That is, when AvgThick in the horizontal direction is more than AvgThick in the vertical direction, the direction is horizontal (H) and the state is a single paragraph (P). When AvgThick in the horizontal direction is less than AvgThick in the vertical direction, the direction is vertical (V) and the state is a single paragraph (P). In other cases (when AvgThick in the horizontal direction is equal to AvgThick in the vertical direction), nothing is done (the state "determination is unavailable (⊥)" is maintained).

In Step S3318, it is determined whether the "state" variable indicates "determination is unavailable" (state==⊥). When it is determined that the "state" variable indicates "determination is unavailable", the process proceeds to Step S3320. In other cases, the process proceeds to Step S3322.

In Step S3320, determination is performed on the basis of AvgCost of Table 7. That is, when AvgCost in the horizontal direction is less than AvgCost in the vertical direction, the direction is horizontal (H) and the state is a single paragraph (P). When AvgCost in the horizontal direction is more than AvgCost in the vertical direction, the direction is vertical (V) and the state is a single paragraph (P). In other cases (when AvgCost in the horizontal direction is equal to AvgCost in the vertical direction), nothing is done (the state "determination is unavailable (⊥)" is maintained).

In Step S3322, (direction, state), which is a set of the "direction" variable and the "state" variable, is output.

In addition, an image separating module may be added to the structure shown in FIG. 32, and the image separating module may separate the image received by the image receiving module 3210 into plural partial images using the separation paths selected by the separation direction determining module 3250.

<Exemplary Embodiment B-3>

Next, an exemplary embodiment that receives the image of a document and performs a process of determining the direction of a character string and a separation process will be described.

Figure 34:
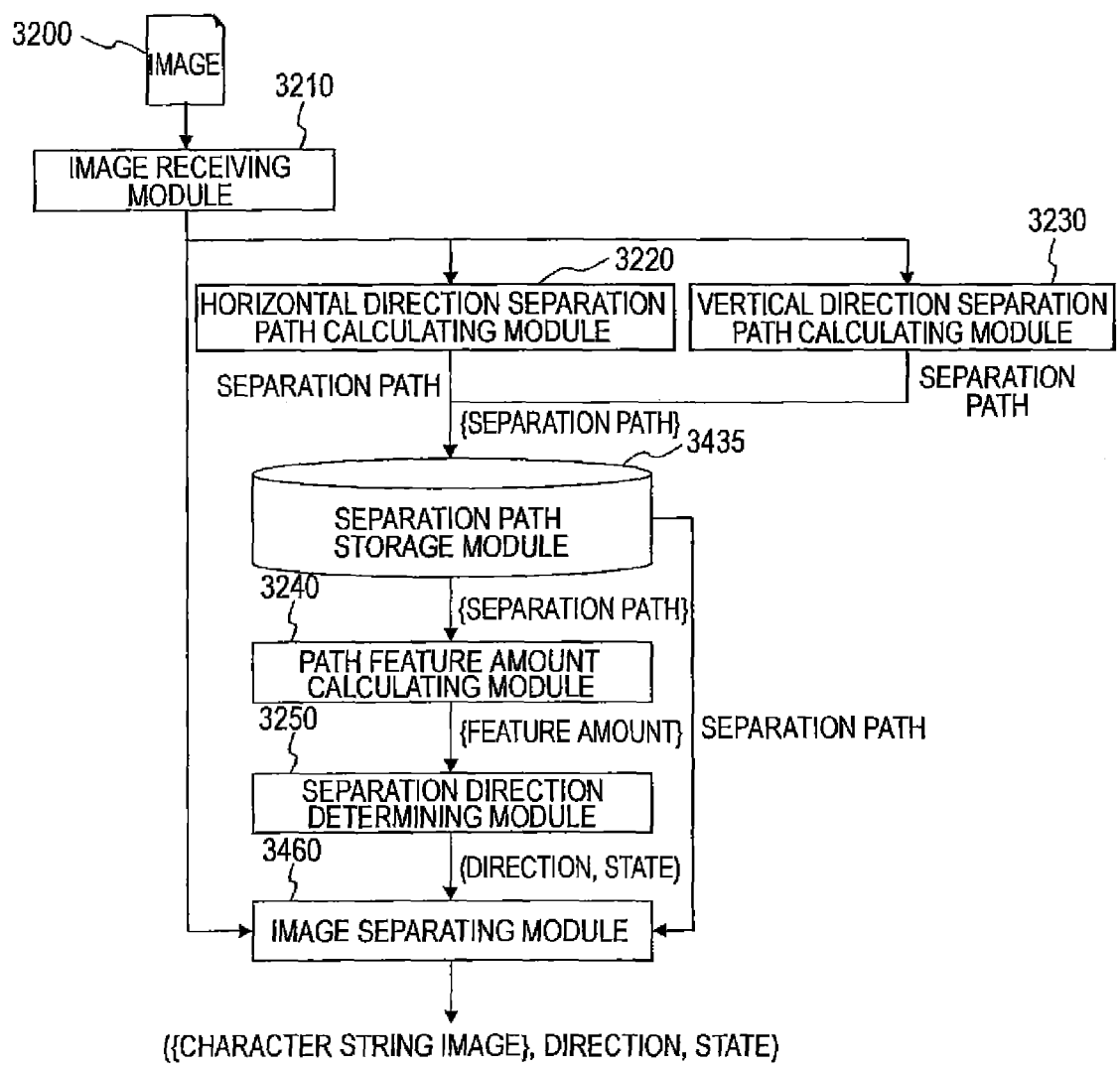
FIG. 34 is a conceptual module structure diagram illustrating an example of a structure according to an exemplary embodiment B-3.
Figures 36A, 36B, 36C:
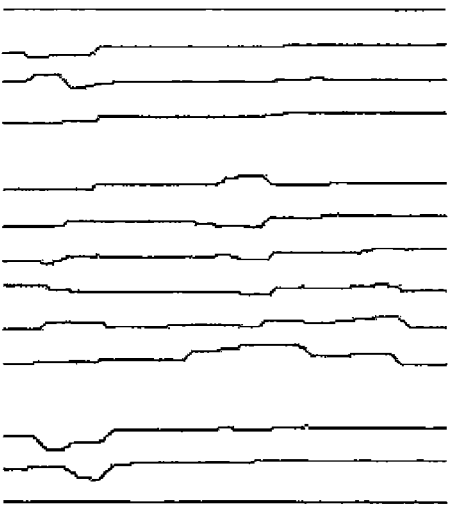
FIGS. 36A to 36C are diagrams illustrating an example of separation paths in the horizontal and vertical directions.

FIG. 34 is a conceptual module structure diagram illustrating an example of a structure according to the exemplary embodiment B-3. The exemplary embodiment B-3 calculates separation paths in the horizontal direction and the vertical direction, stores the separation paths once, calculates the feature amounts of each of the separation paths, compares the feature amounts to determine the direction and state of a character string, selects the separation paths in the determined direction, and performs image separation on the basis of the separation paths. The exemplary embodiment B-3 includes an image receiving module 3210, a horizontal direction separation path calculating module 3220, a vertical direction separation path calculating module 3230, a separation path storage module 3435, a path feature amount calculating module 3240, a separation direction determining module 3250, and an image separating module 3460.

In this exemplary embodiment, the same components as those in the above-described exemplary embodiments are denoted by the same reference numerals and a description thereof will be omitted. That is, components according to this exemplary embodiment are the same as those according to the exemplary embodiment B-2 (FIG. 32) except for the separation path storage module 3435 and the image separating module 3460.

The separation path storage module 3435 is connected to the horizontal direction separation path calculating module 3220, the vertical direction separation path calculating module 3230, the path feature amount calculating module 3240, and the image separating module 3460 and stores the separation paths calculated by the horizontal direction separation path calculating module 3220 and the vertical direction separation path calculating module 3230. Then, the separation path storage module 3435 transmits the separation paths to the path feature amount calculating module 3240 or the image separating module 3460.

The image separating module 3460 is connected to the image receiving module 3210, the separation path storage module 3435, and the separation direction determining module 3250.

The determination and process of the image separating module 3460 are shown in the following Table 8:

TABLE 8

|  |  | State | |
| --- | --- | --- | --- |
|  |  | ∈ {T, C, ⊥} | ∈ others |
| Direction | =⊥ | Output target image<br>Output direction | Output target image<br>Output direction |
|  | ∈ others | Output target image<br>Output direction | Separate target image into plural partial images using separation |

TABLE 8-continued

| State | |
|---|---|
| ∈ {T, C, ⊥} | ∈ others |
| | paths in "direction" |
| | Output direction |

When the "direction" variable does not indicate "determination is unavailable (⊥)" and the "state" variable does not indicate a single character string (T), a single character (C), and "determination is unavailable (⊥)" (that is, when the "state" variable indicates a single paragraph (9)) the image separating module 3460 selects the separation paths in the direction determined by the separation direction determining module 3250 from the separation path storage module 3435 and separates the image received by the image receiving module 3210 into plural partial images. When the "direction" variable indicates "determination is unavailable (⊥)" or when the "state" variable indicates a single character string (T), a single character (C), and "determination is unavailable (⊥)" (that is, when the "state" variable does not indicate a single paragraph (P)), the image separating module 3460 output the image of the target document without selecting a separation path and separating an image.

<Experimental Result B>

The experimental results of the exemplary embodiments in <B> will be described in comparison with the case in which these exemplary embodiments are not used.

First, the case in which the exemplary embodiments are not used will be described. There is the technique described in the background art as the case in which the exemplary embodiments are not used. The approach is mainly classified into two approaches, that is, an approach based on the projection distribution and an approach based on the connection components. The projection distribution of the circumscribed rectangle of the connection components belongs to the approach based on the projection distribution.

The feature amounts of basic information (that is, the projection distribution and the connection components) are calculated, and the feature amounts in plural directions are compared with each other to determine the direction of the character string or cut out the character string.

In the determination of the direction of the character string on the basis of the projection distribution, the values of the projection distribution or the features of the shape (for example, the mountain and the valley) of the projection distribution are compared with each other. For example, in the technique disclosed in JP-A-04-311283, the direction of the character string is determined using the maximum value of the projection distribution in the horizontal direction and the vertical direction as the feature amount.

In the determination of the direction of the character string on the basis of the connection components, the features of the positional relationship between the connection components are compared with each other. For example, in the technique disclosed in JP-A-05-073718, the numbers of pairs of the connection components where the minimum distance is obtained in the horizontal direction and the vertical direction are compared with each other to determine the direction. For example, in the technique disclosed in JP-A-2000-090194, the average gaps between the circumscribed rectangles of the connection components in the horizontal direction and the vertical direction are compared with each other to determine the direction.

In the cutting-out of the character string on the basis of the projection distribution, for the projection distribution of the directions of the character strings, the valley of the projection distribution corresponding to the gap between the character strings is specified as a separation boundary.

In the cutting-out of the character string on the basis of the connection components, adjacent connection components are integrated into a character string. In this case, when the direction of the character string has been known, this information is effectively used. In addition, the integration of the connection components makes it possible to perform both the determination of the direction and the cutting-out of the character string, which is disclosed in L. O'Gorman, "The Document Spectrum for Page Layout Analysis," IEEE TPAMI, Vol. 15, No. 11, November 1993, pp. 1162-1173.

FIGS. 35A and 35B are diagrams illustrating an example of the projection distribution. FIG. 35A shows an example of the projection distribution in the horizontal and vertical directions, and FIG. 35B shows an example of the projection distribution of the circumscribed rectangle of the connection components in the horizontal and vertical directions. In the image of a document shown in FIGS. 35A and 35B, characters are closely arranged. In some cases, the projection distribution and the connection components effective to cut out the character string from the image may not be obtained. In general, the projection distribution is greatly affected by the skew of a document image and the connection components are greatly affected by the pattern (for example, language or decoration) of single characters forming the document image and the pattern (for example, underline and noise) of non-characters. In particular, as shown in FIGS. 35A and 35B, the above-mentioned influence is noticeable in the image of the document in which characters are closely arranged. In this situation, the information of the separation boundary between the character strings does not appear and a sufficient difference in the horizontal direction and the vertical direction does not occur.

Next, the separation paths used in the exemplary embodiments of <B> will be described with reference to FIGS. 36A to 36C and FIGS. 37A to 37C. FIGS. 36A to 36C and FIGS. 37A to 37C are diagrams illustrating an example of the separation paths in the horizontal and vertical directions, in which the separation paths in the horizontal direction and the vertical direction are calculated from a paragraph image, which is a target image. The separation path extending in the same direction as the direction of the character strings forming a paragraph has a shape close to a straight line, and the separation path extending in a direction different from the direction of the character strings is distorted (see FIGS. 36A to 36C). The separation paths having the same degree of distortion have different thicknesses (see FIGS. 37A to 37C). In the exemplary embodiments of <B>, these features are quantitatively evaluated and are compared as the feature amounts to determine the direction of the character string. Specifically, the feature amounts are extracted on the basis of the number of separation paths, the position and shape of each separation path, and the pixel values on the path.

Figures 38A, 38B, 38C:
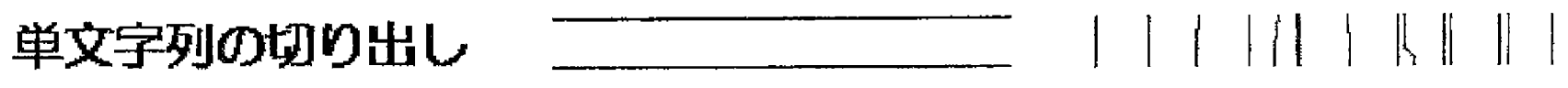

In the exemplary embodiments of <B>, it is determined whether a target image is a single paragraph, a single character, or a single character string on the basis of the number of separation paths. This aspect is shown in FIGS. 38A to 38C. That is, the separation paths in the correct direction and the incorrect direction have a difference effective to determine the direction of the character string.

FIGS. 39A to 39C, FIGS. 40A to 40C, and FIG. 41 show an example of the cutting-out of the character strings in the exemplary embodiments of <B>.

Figures 39A, 39B, 39C:
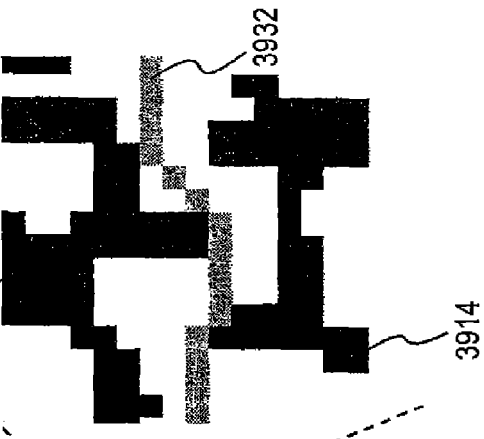
FIGS. 39A to 39C are diagrams illustrating an example of the process according to this exemplary embodiment.

FIGS. 39A to 39C show the cutting-out result of the character strings in the exemplary embodiment B-3. In the exemplary embodiment B-3, the image of the document is received and the state is determined to be P, that is, the image is determined to be a single paragraph. In addition, it is determined that the direction of the character string is the horizontal direction. As a result, adjacent (neighboring) character strings are separated by the separation path (see enlarged views of FIGS. 39B and 39C).

Figure 40C:
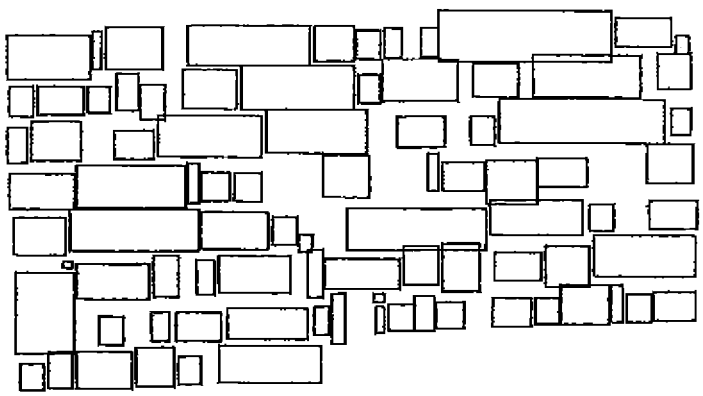
FIGS. 40A to 40C are diagrams illustrating an example of the process according to this exemplary embodiment.
Figure 40B:
Figure 40A:

FIG. 40A shows the cutting-out result in the exemplary embodiments of <B>, FIG. 40B shows a target image and a projection distribution, and FIG. 40C shows the circumscribed rectangles of the connection components. As can be seen from FIGS. 40A to 40C, the exemplary embodiments of <B> specify a separation boundary that does not appear in the projection distribution, disconnect plural characters, and integrate the erroneous separation of the single characters to determine the direction of the character string and cut out the character string.

Figure 41:
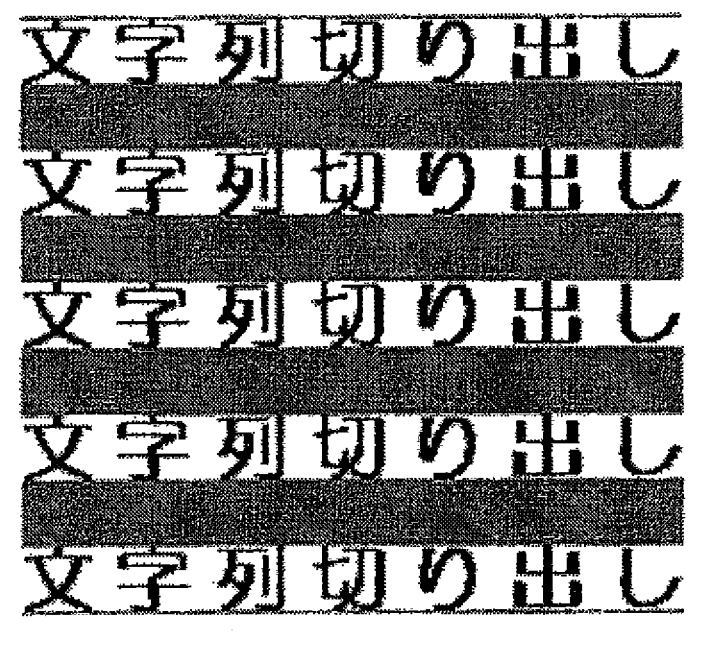

As can be seen from FIG. 41, the exemplary embodiments of <B> cut out the character strings from the image shown in FIGS. 37A to 37C in which the gap between the character strings is large as well as the image shown in FIG. 39B in which the characters are closely arranged.

The content of <B> can be understood as follows.

(B1) An image processing apparatus includes: a receiver that receives an image including at least a character image; a path calculator that calculates a separation path, which is a segment for separating the character images in the image received by the receiver; and a separator that separates the image received by the receiver into plural character images using the separation path calculated by the path calculator. The path calculator calculates the separation path in which the cumulative value of the brightness values of pixels on the path satisfies a predetermined condition in a predetermined range including a portion of the character image in the image.

(B2) The image processing apparatus according to (B1) further includes a feature amount calculator and a selector. The path calculator calculates the separation paths in plural directions. The feature amount calculator calculates the feature amounts of the separation paths in the plural directions calculated by the path calculator. The selector determines the separation direction of the image and the state of the character image on the basis of the feature amounts calculated by the feature amount calculator, and selects the separation path among the separation paths in the plural directions on the basis of the determination result. The separator separates the image received by the receiver into plural partial images using the separation path selected by the selector.

(B3) In the image processing apparatus according to (B1) or (B2), the path calculator calculates the separation path in which the cumulative value of the product of the brightness values of the pixels on the path and a weight coefficient based on the movement of the path satisfies a predetermined condition in the predetermined range including a portion of the character image in the image.

(B4) In the image processing apparatus according to any one of (B1) to (B3), in the calculation of the separation path, when the width of a gap between adjacent separation paths satisfies a predetermined condition, the path calculator determines that the adjacent separation paths are equivalent to each other, regardless of the brightness values of pixels in the gap and combines the adjacent separation paths. Alternatively, in the calculation of the separation path, when the cumulative value of the brightness values of the pixels in the gap between the adjacent separation paths satisfies a predetermined condition, the path calculator determines that the adjacent separation paths are equivalent to each other and combines the adjacent separation paths.

<C>

Next, exemplary embodiments based on the technique described in <A> and <B> will be described. That is, the technique described in <B> is used and the separation path obtained in <A> is mainly used to recursively perform image separation, thereby separating character string images. The notation of, for example, the separation path is the same as that in <B>.

<Exemplary Embodiment C-1>

Exemplary embodiments of <C> will be described in brief.

Figure 42:
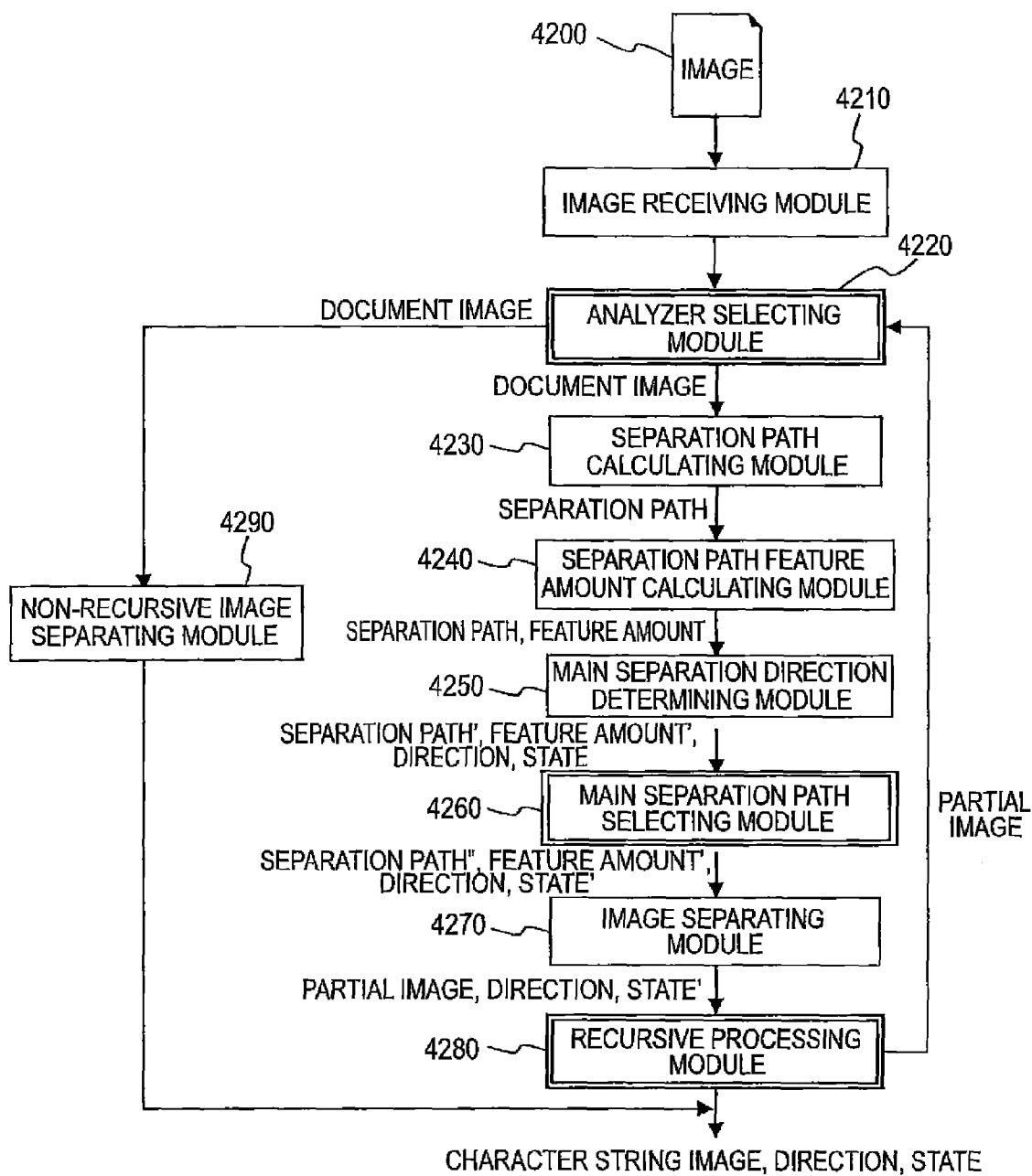
FIG. 42 is a conceptual module structure diagram illustrating an example of a structure according to an exemplary embodiment C-1.

FIG. 42 is a conceptual module structure diagram illustrating an example of a structure according to an exemplary embodiment C-1.

The exemplary embodiment C-1 includes an image receiving module 4210, an analyzer selecting module 4220, a separation path calculating module 4230, a separation path feature amount calculating module 4240, a main separation direction determining module 4250, a main separation path selecting module 4260, an image separating module 4270, a recursive processing module 4280, and a non-recursive image separating module 4290.

The image receiving module 4210 is connected to the analyzer selecting module 4220. The image receiving module 4210 receives an image 4200 and transmits the image to the analyzer selecting module 4220. The image receiving module 4210 corresponds to, for example, the image receiving module 3110 described in <B>. The image 4200 may include plural paragraphs.

The analyzer selecting module 4220 is connected to the image receiving module 4210, the separation path calculating module 4230, the recursive processing module 4280, and the non-recursive image separating module 4290, and transmits a target image to the non-recursive image separating module 4290 or the separation path calculating module 4230. The analyzer selecting module 4220 compares the ratio of the length of the image 4200 received by the image receiving module 4210 or a partial image (a partial image transmitted from the recursive processing module 4280 when recursive processing is performed) separated by the image separating module 4270 in the vertical direction and the length thereof in the horizontal direction with a predetermined value, or determines whether to instruct the non-recursive image separating module 4290 or the separation path calculating module 4230 to process the image 4200 received by the image receiving module 4210 or the partial image separated by the image separating module 4270 on the basis of the depth of recursion when the recursive processing module 4280 determines to perform recursive processing. This will be described in detail below with reference to FIGS. 55 and 56.

The separation path calculating module 4230 is connected to the analyzer selecting module 4220 and the separation path feature amount calculating module 4240 and transmits a separation path to the separation path feature amount calculating module 4240. The separation path calculating module 4230 calculates a separation path, which is a segment for separating character images in the image received by the image receiving module 4210. The separation path calculating module 4230 corresponds to the horizontal direction separation path calculating module 3220, the vertical direction separation path calculating module 3230, and the separation path storage module 3435 described in <B>. In addition, when the recursive processing module 4280 determines to perform recursive processing, the separation path calculating module 4230 calculates a separation path, which is a segment for separating character images in the image separated by the image separating module 4270.

The separation path feature amount calculating module 4240 is connected to the separation path calculating module 4230 and the main separation direction determining module 4250, and transmits the separation paths and the feature amounts thereof to the main separation direction determining module 4250. The separation path feature amount calculating module 4240 calculates the feature amounts of the separation paths in plural directions calculated by the separation path calculating module 4230. The separation path feature amount calculating module 4240 corresponds to the path feature amount calculating module 3240 described in <B>.

The main separation direction determining module 4250 is connected to the separation path feature amount calculating module 4240 and the main separation path selecting module 4260, and transmits the separation paths, the feature amounts thereof, and the direction and state of the character images to the main separation path selecting module 4260. The main separation direction determining module 4250 determines the separation direction of the image and the state of the character image on the basis of the feature amounts calculated by the separation path feature amount calculating module 4240. The main separation direction determining module 4250 corresponds to the separation direction determining module 3250 described in <B>.

The main separation path selecting module 4260 is connected to the main separation direction determining module 4250 and the image separating module 4270 and transmits the separation paths, the feature amounts thereof, and the direction and state of the character image to the image separating module 4270. The main separation path selecting module 4260 selects a separation path among the separation paths in plural directions on the basis of the determination result of the main separation direction determining module 4250. The main separation path selecting module 4260 may determine the state of the character image in order to determine whether to perform recursive processing by the recursive processing module 4280. When the state of the character image indicates multiple paragraphs, the main separation path selecting module 4260 may thin out some of the separation paths calculated by the separation path calculating module 4230. The thinning-out process will be described below with reference to FIGS. 52 and 53.

The image separating module 4270 is connected to the main separation path selecting module 4260 and the recursive processing module 4280 and transmits the partial image and the direction and state of the partial image to the recursive processing module 4280. The image separating module 4270 separates the image into plural partial images using the separation path selected by the main separation path selecting module 4260. The image separating module 4270 corresponds to the image separating module 3460 described in <B>.

The recursive processing module 4280 is connected to the analyzer selecting module 4220 and the image separating module 4270. When recursive processing is performed, the recursive processing module 4280 transmits the partial image to the analyzer selecting module 4220. When the end conditions of recursive processing are satisfied, the recursive processing module 4280 outputs a character string image and the direction and state thereof. The recursive processing module 4280 determines whether to perform recursive processing on the basis of the state of the character image separated from the image by the image separating module 4270. When determining to perform the recursive processing, the recursive processing module 4280 transmits the partial image received from the image separating module 4270 as a target image to the analyzer selecting module 4220. The "execution of recursive processing on the state of the character image" means that the analyzer selecting module 4220, the separation path calculating module 4230, the separation path feature amount calculating module 4240, the main separation direction determining module 4250, the main separation path selecting module 4260, and the image separating module 4270 repeatedly performs their processes on the partial images separated by the image separating module 4270 on condition that recursive processing ends when the state of the character image does not indicate multiple paragraphs (When there are five determination conditions, that is, multiple paragraphs, a single paragraph, a single character string, a single character, and "determination is unavailable", the state of the character image indicates any one of the single paragraph, the single character string, the single character, and "determination is unavailable").

The non-recursive image separating module 4290 is connected to the analyzer selecting module 4220 and outputs the character string image and the direction and state of the character string image. The non-recursive image separating module 4290 separates an image without performing recursive processing. Any image separation technique may be used as long as the processes of the separation path calculating module 4230 to the recursive processing module 4280 are not performed. For example, the technique described in <B> is used.

A detailed example of the feature amounts is shown in the following Table 9:

TABLE 9

| Feature amounts of separation path | Symbol | Detailed example |
| --- | --- | --- |
| Number of separation paths | Num | Total number of paths$_i$ |
| Distortion of separation paths | Curl$_i$ | Expressions 33, 34, 35, and 36 |
| Thickness of separation paths | Thick$_i$ | Expressions 43, 44, and 45 |
| Cost of separation paths | Cost$_i$ | Expressions 52, 53, and 54 |
| Gap between separation paths | Gap$_i$ | Expressions 61, 62, and 63 |

As shown in Table 9, the number Num of separation paths is the total number of separation paths. The feature amounts are calculated for each direction in which the separation path is calculated (in the exemplary embodiments of <C>, the horizontal direction and the vertical direction).

Figure 43:
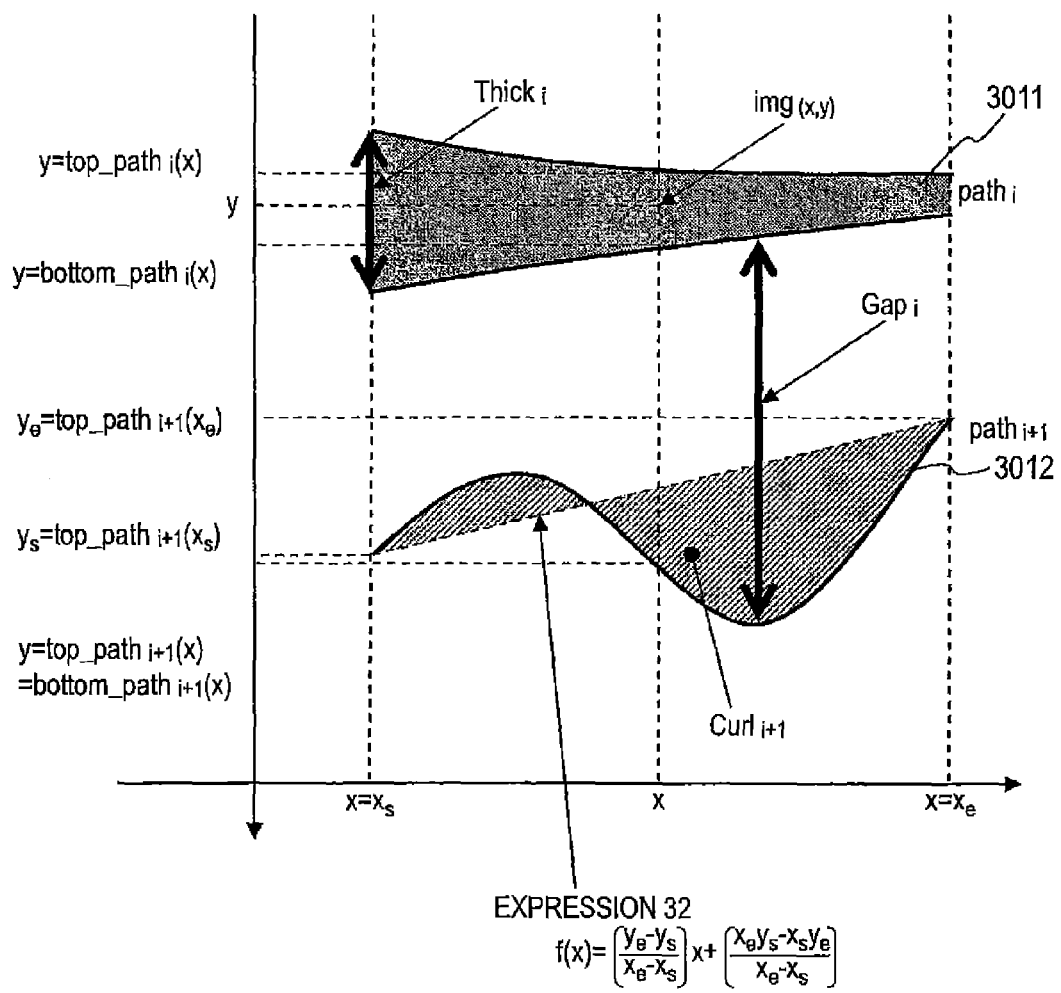
FIG. 43 is a diagram illustrating an example of the feature amounts.

FIG. 43 is a diagram illustrating an example of the feature amounts shown in Table 9. In the example of FIG. 43, the "gap (Gap$_i$) between the separation paths" is added as the feature of the separation path to the example shown in FIG. 30. Among the feature amounts shown in Table 9, Curl$_i$, Thick$_i$, and Cost$_i$ are calculated for each path$_i$. The Gap$_i$ is the feature amount of the gap between a path$_i$ and a path$_{i+1}$ and is calculated for each pair of the path$_i$ and the path$_{i+1}$.

Next, each of the feature amounts will be described in detail.

For the "distortion of the separation path", an example of Curl$_i$ is represented by the following Expressions 33, 34, 35, and 36:

$$Curl_i = \begin{cases} \dfrac{\sum\limits_{x=x_s}^{x_e} |f(x) - \text{top\_path}_i(x)|}{x_e - x_s} & \ldots (\text{top\_path}_i = \text{bottom\_path}_i) \\ 0 & \ldots (\text{others}); \end{cases}$$

$$Curl_i = \begin{cases} \dfrac{\sum\limits_{x=x_s}^{x_e} (f(x) - \text{top\_path}_i(x))^2}{x_e - x_s} & \ldots (\text{top\_path}_i = \text{bottom\_path}_i) \\ 0 & \ldots (\text{others}); \end{cases}$$

$$Curl_i = \dfrac{\sum\limits_{x=x_s}^{x_e} |f(x) - p_i(x)|}{x_e - x_s}$$

where $p_i(x) = \dfrac{\text{top\_path}_i(x) + \text{bottom\_path}_i(x)}{2}$; and $$Curl_i = \dfrac{\sum\limits_{x=x_s}^{x_e-d} |\lfloor p_i(x+d) \rfloor - \lfloor p_i(x) \rfloor|}{x_e - x_s}.$$

As shown in FIG. 43, $Curl_i$ is the distortion of the $path_i$.

For $Curl_i$, for example, the difference between the $path_i$ and a straight line f(x) (hereinafter, referred to as an ideal straight line) connecting the starting point and the endpoint may be evaluated, as shown in Expressions 33, 34, and 35. Specifically, Expression 33 is the absolute value of the difference between a path without a thickness and the ideal straight line, and Expression 34 is the square error of the difference. In addition, Expression 35 is the absolute value of the difference between a center line calculated for a path with a thickness and the ideal straight line, similar to Expression 33. In the example shown in FIG. 43, these correspond to the evaluation of the area of a ray portion of a $path_{i+1}$.

As shown in Expression 36, the differential value (differential distance $d_{[px]}$) of the path may be evaluated.

An example of the feature amount, which is the statistical value of the "distortion of the separation path" will be described.

$Curl_i$ is calculated for each $path_i$. An example in which the statistical values of $Curl_i$ of all paths; are used as the feature amounts is represented by the following Expressions 37, 38, and 39:

$$MaxCurl = \max_{i \in (0, \ldots, Num-1)} (Curl_i);$$ [Expression 37]

$$MinCurl = \min_{i \in (0, \ldots, Num-1)} (Curl_i); \text{ and}$$ [Expression 38]

$$AvgCurl = \dfrac{\sum\limits_{i=0}^{Num-1} Curl_i}{Num}.$$ [Expression 39]

The feature amounts correspond to the maximum value (MaxCurl), the minimum value (MinCurl), and the average value (AvgCurl) of $Curl_i$ of all of the separation paths.

For example, the feature amounts as the statistical values obtained by excluding $Curl_0$ and $Curl_{Num-1}$, which are $Curl_i$ of two separation paths (that is, a $path_0$ and a $path_{Num-1}$) disposed at the ends, from the above-mentioned feature amounts as the statistical values are represented by the following Expressions 40, 41, and 42:

[Expression 33]

[Expression 34]

[Expression 35]

[Expression 36]

$$MaxCurl = \max_{i \in (0, \ldots, Num-2)} (Curl_i);$$ [Expression 40]

$$MinCurl = \min_{i \in (0, \ldots, Num-2)} (Curl_i); \text{ and}$$ [Expression 41]

$$AvgCurl = \dfrac{\sum\limits_{i=0}^{Num-2} Curl_i}{Num - 2}.$$ [Expression 42]

$Curl_i$ of the two separation paths disposed at the ends does not greatly depend on a target image and is not necessarily suitable as the feature amount referred to by various determination processes. Therefore, for accurate analysis, $Curl_i$ of the two separation paths disposed at the ends is excluded, as shown in the expressions.

For the "thickness of the separation path", an example of $Thick_i$ is represented by the following Expressions 43, 44, and 45:

$$Thick_i = \begin{cases} 1 & \ldots (\text{top\_path}_i = \text{bottom\_path}_i) \\ \max_{x_s \le x \le x_e} (t_i(x)) & \ldots (\text{others}) \end{cases}$$ [Expression 43]

(where $t_i(x) = \text{bottom\_path}_i(x) - \text{top\_path}_i(x)$);

$$Thick_i = \begin{cases} 1 & \ldots (\text{top\_path}_i = \text{bottom\_path}_i) \\ \min_{x_s \le x \le x_e} (t_i(x)) & \ldots (\text{others}); \end{cases}$$ [Expression 44]

$$Thick_i = \dfrac{\sum\limits_{x=x_s}^{x_e} t_i(x)}{x_e - x_s}.$$ [Expression 45]

As shown in FIG. 43, $Thick_i$ is the thickness of the $path_i$. This corresponds to the evaluation of the distance between $top\_path_i$ and $bottom\_path_i$ shown in FIG. 43.

Expression 43 is an example in which the maximum value of the thickness of the $path_i$ is used as the feature amount.

Expression 44 is an example in which the minimum value of the thickness of the $path_i$ is used as the feature amount.

Expression 45 is an example in which the average value of the thickness of the $path_i$ is used as the feature amount.

Similar to $Curl_i$, for example, the feature amounts of Thick, are statistical values represented by Expressions 46, 47, 48, 49, 50, and 51:

$$MaxThick = \max_{i \in (0, \ldots, Num-1)} (Thick_i); \quad \text{[Expression 46]}$$

$$MinThick = \min_{i \in (0, \ldots, Num-1)} (Thick_i); \quad \text{[Expression 47]}$$

$$AvgThick = \frac{\sum_{i=0}^{Num-1} Thick_i}{Num}; \quad \text{[Expression 48]}$$

$$MaxThick = \max_{i \in (0, \ldots, Num-2)} (Thick_i); \quad \text{[Expression 49]}$$

$$MinThick = \min_{i \in (0, \ldots, Num-2)} (Thick_i); \text{ and} \quad \text{[Expression 50]}$$

$$AvgThick = \frac{\sum_{i=1}^{Num-2} Thick_i}{Num-2}. \quad \text{[Expression 51]}$$

For the "cost of the separation paths", an example of $Cost_i$ is represented by the following Expressions 52, 53, and 54:

$$Cost_i = \begin{cases} \sum_{x=x_s}^{x_e} img(x, top\_path_i(x)) & \ldots (top\_path_i = bottom\_path_i) \\ \sum_{x=x_s}^{x_e} \sum_{y=top\_path_i(x)}^{bottom\_path_i(x)} img(x, y) & \ldots (others); \end{cases} \quad \text{[Expression 52]}$$

$$Cost_i = \sum_{x=x_s}^{x_e} img(x, \lfloor p_i(x) \rfloor); \text{ and} \quad \text{[Expression 53]}$$

$$Cost_i = \sum_{x=x_s}^{x_e-1} (c_i \times img(x, \lfloor p_i(x) \rfloor)) \quad \text{[Expression 54]}$$

$$c_i = \begin{cases} 1 & \ldots (p_i(x) = p_i(x+1)) \\ c & \ldots (others). \end{cases}$$

For $Cost_i$ the cumulative value of the pixel values on the path is simply evaluated, as shown in Expressions 52 and 53. Specifically, Expression 52 is an example of evaluating the cumulative value of the pixel values on the path. Expression 53 is an example of evaluating the cumulative value of the pixel values on the center line of the path. Expression 54 is an example of evaluating the cumulative value of the pixel values on the path multiplied by a weight (in Expression 54, corresponding to a coefficient c) due to the distortion of the path.

Similar to $Curl_i$, for example, the feature amounts of $Cost_i$ are statistical values represented by the following Expressions 55, 56, 57, 58, 59, and 60:

$$MaxCost = \max_{i \in (0, \ldots, Num-1)} (Cost_i); \quad \text{[Expression 55]}$$

$$MinCost = \min_{i \in (0, \ldots, Num-1)} (Cost_i); \quad \text{[Expression 56]}$$

$$AvgCost = \frac{\sum_{i=0}^{Num-1} Cost_i}{Num}; \quad \text{[Expression 57]}$$

$$MaxCost = \max_{i \in (0, \ldots, Num-2)} (Cost_i); \quad \text{[Expression 58]}$$

$$MinCost = \min_{i \in (0, \ldots, Num-2)} (Cost_i); \text{ and} \quad \text{[Expression 59]}$$

$$AvgCost = \frac{\sum_{i=1}^{Num-2} Cost_i}{Num-2}. \quad \text{[Expression 60]}$$

For the "gap between the separation paths", an example of $Gap_i$ is represented by the following Expressions 61, 62, and 63:

$$Gap_i = \max_{x_s \leq x \leq x_e} (g_i(x)) \quad \text{[Expression 61]}$$

(where $g_i(x) = bottom\_path_{i+1}(x) - top\_path_i(x)$);

$$Gap_i = \min_{x_s \leq x \leq x_e} (g_i(x)); \quad \text{[Expression 62]}$$

$$Gap_i = \frac{\sum_{x=x_s}^{x_e} g_i(x)}{x_e - x_s}. \quad \text{[Expression 63]}$$

As shown in FIG. 43, $Gap_i$ is the width of the gap between a $path_i$ and a $path_{i+1}$. In FIG. 43, this corresponds to the evaluation of the distance between $bottom\_path_i$ and $top\_path_{i+1}$.

Expression 61 is an example in which the maximum value of the width of the gap between a pair of the $path_i$ and $path_{i+1}$ is used as the feature amount.

Expression 62 is an example in which the minimum value of the width of the gap between a pair of the $path_i$ and $path_{i+1}$ is used as the feature amount.

Expression 63 is an example in which the average value of the width of the gap between a pair of the $path_i$ and $path_{i+1}$ is used as the feature amount.

Similar to $Curl_i$, for example, the feature amounts of $Gap_i$ are statistical values represented by the following Expressions 64, 65, and 66:

$$MaxGap = \max_{i \in (0, \ldots, Num-2)}(Gap_i);$$ [Expression 64]

$$MinGap = \min_{i \in (0, \ldots, Num-2)}(Gap_i); \text{ and}$$ [Expression 65]

$$AvgGap = \frac{\sum_{i=0}^{Num-2} Gap_i}{Num-1}.$$ [Expression 66]

However, unlike $Curl_i$, the width of the gap at the end (that is, the gap between a $path_0$ and a $path_1$ and the gap between a $path_{Num-2}$ and a $path_{Num-1}$) depends on a target image.

<Exemplary Embodiment C-2>

Figure 44:
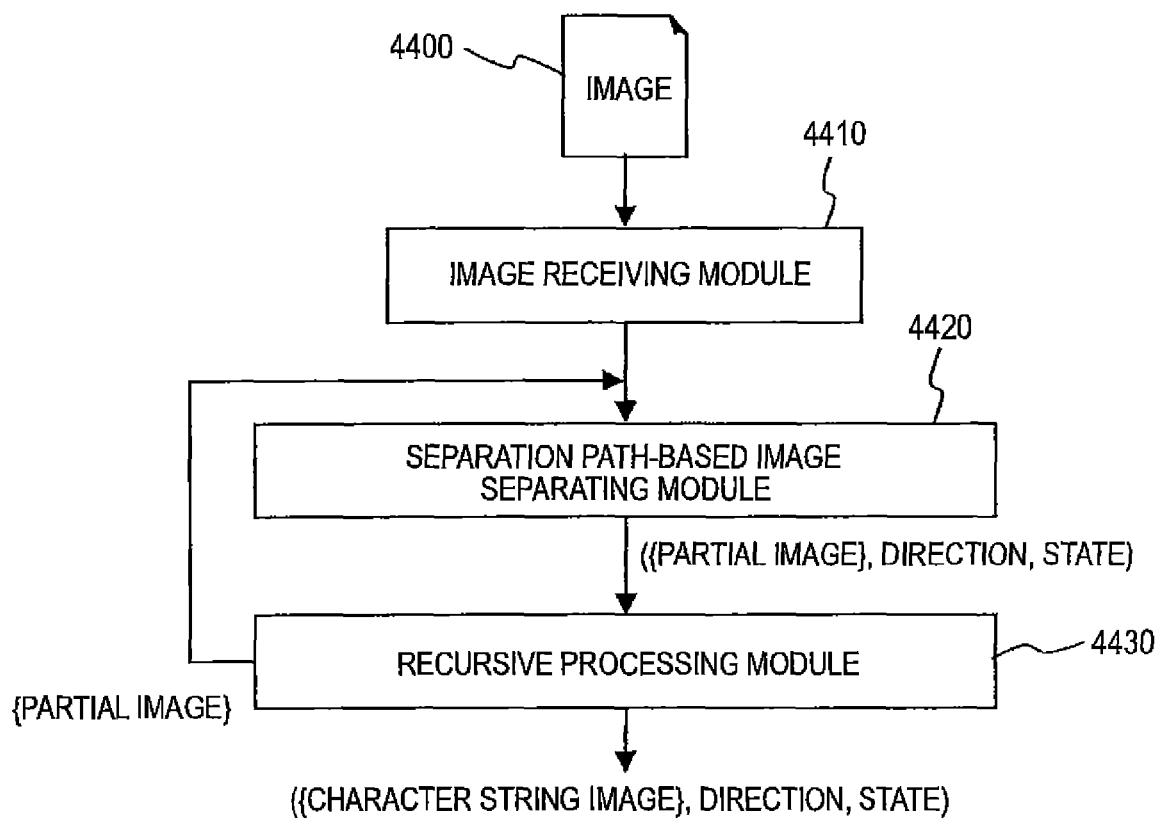
FIG. 44 is a conceptual module structure diagram illustrating an example of a structure according to an exemplary embodiment C-2.

FIG. 44 is a conceptual module structure diagram illustrating an example of a structure according to an exemplary embodiment C-2.

The exemplary embodiment C-2 includes an image receiving module 4410, a separation path-based image separating module 4420, and a recursive processing module 4430.

The image receiving module 4410 is connected to the separation path-based image separating module 4420 and corresponds to the image receiving module 4210 shown in FIG. 42. An image 4400 corresponds to the image 4200 shown in FIG. 42.

The separation path-based image separating module 4420 is connected to the image receiving module 4410 and the recursive processing module 4430. The separation path-based image separating module 4420 separates a target image into partial images and outputs the partial images. In addition, the separation path-based image separating module 4420 determines the separation direction (hereinafter, referred to as a direction) and state of the target image and outputs the determination result. The separation path-based image separating module 4420 will be described below with reference to FIG. 45.

The recursive processing module 4430 is connected to the separation path-based image separating module 4420. The recursive processing module 4430 determines whether to perform recursive processing on the basis of the state of the target image. When the recursive processing is performed, each partial image is transmitted to the separation path-based image separating module 4420. If not, a partial image, which is a character string image, the direction, and the state are output and the process ends. The recursive processing module 4430 will be described below with reference to FIG. 46.

The "direction" has the following three values:
(1) H: horizontal;
(2) V: vertical; and
(3) ⊥: determination is unavailable.

The "state" has the following five values:
(1) M: multiple paragraphs (there is recursive processing);
(2) P: single paragraph (it is suspected that there is recursive processing);
(3) T: single character string (there is no recursive processing);
(4) C: single character (there is no recursive processing); and
(5) ⊥: determination is unavailable (there is no recursive processing).

Figure 45:
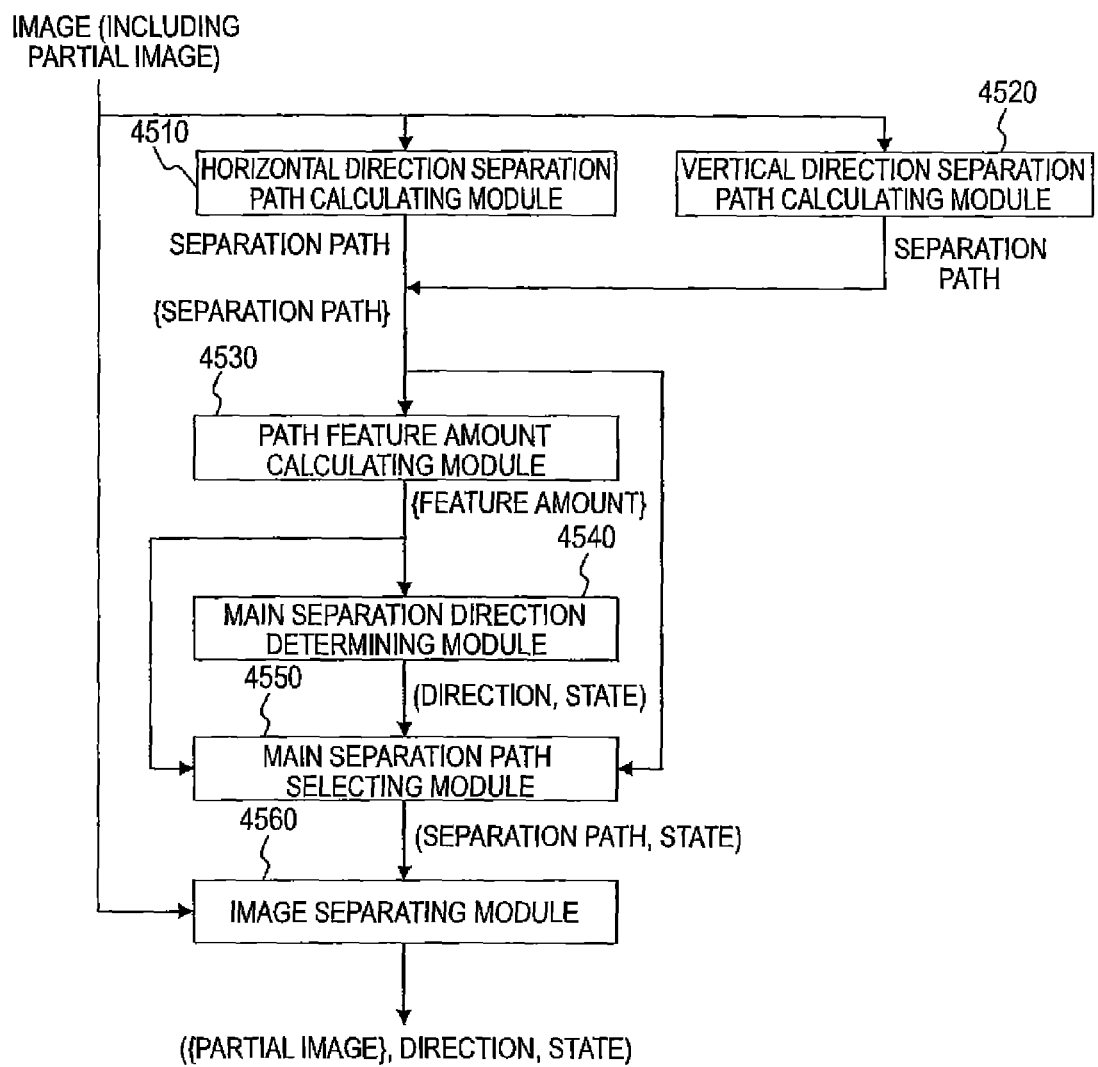
FIG. 45 is a conceptual module structure diagram illustrating an example of the structure of an image separating module using the separation paths.

FIG. 45 is a conceptual module structure diagram illustrating an example of the structure of the separation path-based image separating module 4420.

The separation path-based image separating module 4420 includes a horizontal direction separation path calculating module 4510, a vertical direction separation path calculating module 4520, a path feature amount calculating module 4530, a main separation direction determining module 4540, a main separation path selecting module 4550, and an image separating module 4560.

The horizontal direction separation path calculating module 4510 is connected to the path feature amount calculating module 4530 and the main separation path selecting module 4550. The horizontal direction separation path calculating module 4510 calculates a separation path in the horizontal direction in a target image and transmits the separation path to the path feature amount calculating module 4530. The horizontal direction separation path calculating module 4510 is the same as the horizontal direction separation path calculating module 3220 described in <A> and <B>.

The vertical direction separation path calculating module 4520 is connected to the path feature amount calculating module 4530 and the main separation path selecting module 4550. The vertical direction separation path calculating module 4520 calculates a separation path in the vertical direction in the target image and transmits the separation path to the path feature amount calculating module 4530. The vertical direction separation path calculating module 4520 is the same as the vertical direction separation path calculating module 3230 described in <A> and <B>.

The path feature amount calculating module 4530 is connected to the horizontal direction separation path calculating module 4510, the vertical direction separation path calculating module 4520, the main separation direction determining module 4540, and the main separation path selecting module 4550. The path feature amount calculating module 4530 calculates the feature amounts of the separation paths and transmits the feature amounts to the main separation direction determining module 4540 and the main separation path selecting module 4550. The path feature amount calculating module 4530 is the same as the path feature amount calculating module 3240 described in <B>.

Figure 47:
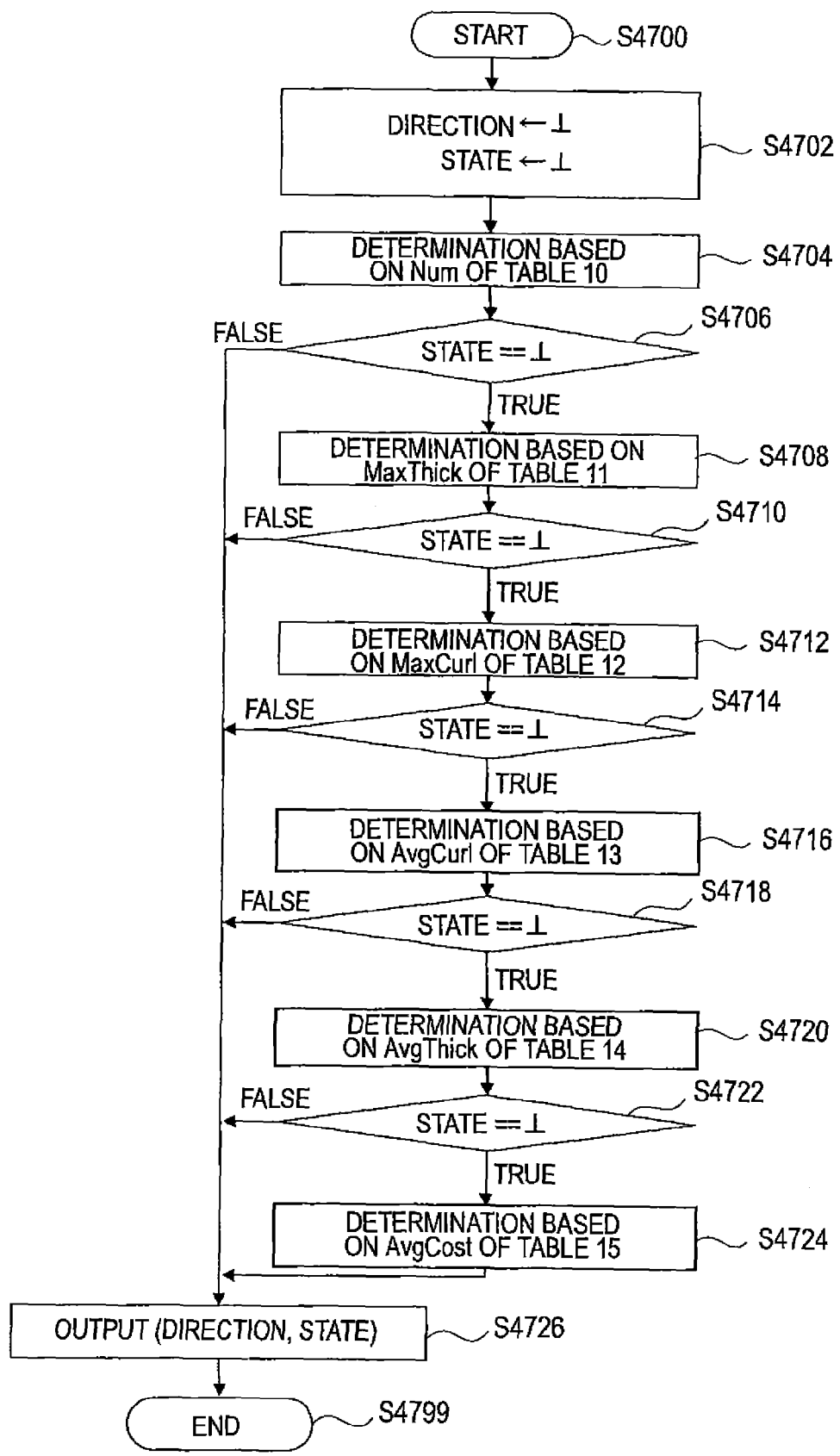
FIG. 47 is a flowchart illustrating an example of the process of a main separation direction determining module.

The main separation direction determining module 4540 is connected to the path feature amount calculating module 4530 and the main separation path selecting module 4550. The main separation direction determining module 4540 determines the separation direction and the state and transmits the determined separation direction and state to the main separation path selecting module 4550. However, the state may be updated by the subsequent process. The determination is performed on the basis of the feature amounts of the separation paths in the horizontal direction and the vertical direction. The flow of this process is shown in FIG. 47, which will be described below.

The main separation path selecting module 4550 is connected to the horizontal direction separation path calculating module 4510, the vertical direction separation path calculating module 4520, the path feature amount calculating module 4530, the main separation direction determining module 4540, and the image separating module 4560. The main separation path selecting module 4550 selects some of the separation paths in the separation direction as main separation paths and transmits the selected separation paths and the state thereof to the image separating module 4560. In addition, the main separation path selecting module 4550 thins out the separation paths. When conditions are satisfied, the state is updated. The main separation path selecting module 4550 selects the separation paths in the selected direction and determines whether the state of the target image is M on the basis of the feature amounts of the separation paths in the horizontal direction and the vertical direction in order to determine recursion. In this case, the main separation path selecting module 4550 thins out the separation paths. The flow of this process is shown in FIGS. 48 to 53, which will be described below.

The image separating module 4560 is connected to the main separation path selecting module 4550. The image separating module 4560 is the same as the image separating module 4270 and transmits the partial image, the direction, and the state to the recursive processing module 4430.

Figure 46:
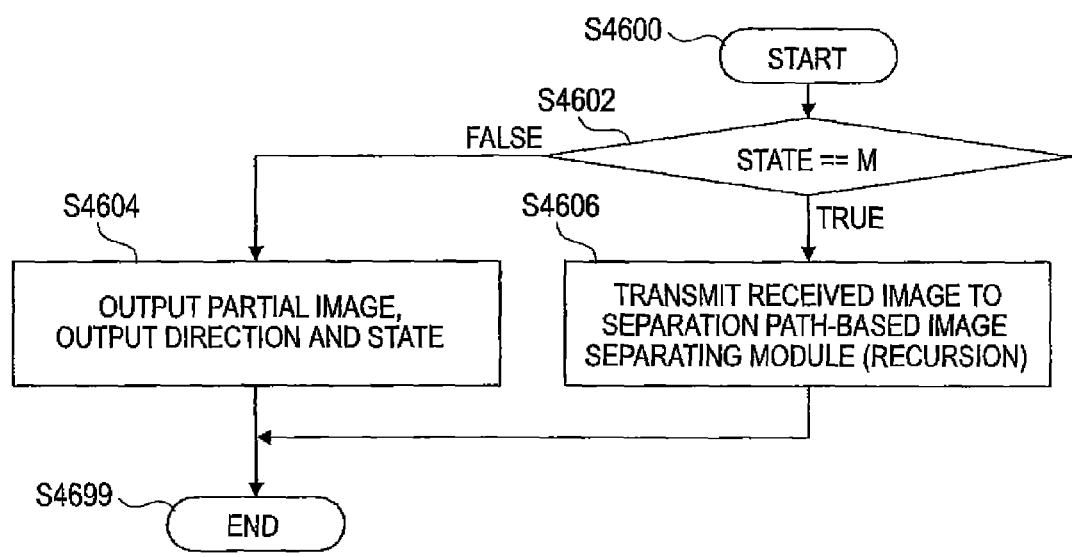
FIG. 46 is a flowchart illustrating an example of the process of a recursive processing module.

FIG. 46 is a flowchart illustrating an example of the process of the recursive processing module 4430.

The recursive processing module 4430 determines whether to perform recursive processing on the basis of the state. Specifically, when it is determined that a target image to be separated image is multiple paragraphs, the recursive processing module 4430 transmits each of the separated partial images to the separation path-based image separating module 4420 (that is, the recursive processing module 4430 performs recursive processing). If not, the recursive processing module 4430 outputs the partial image, which is a character string image, the direction, and the state and ends the process.

This process will be described with reference to the flowchart.

In Step S4602, it is determined whether the "state" variable indicates multiple paragraphs (state==M). When it is determined that the "state" variable indicates multiple paragraphs, the process proceeds to Step S4606. In the other cases, the process proceeds to Step S4604.

In Step S4604, the partial image is output, and the direction and the state are output.

In Step S4606, the recursive processing module 4430 receives the partial image (recursion) and transmits the received image to the separation path-based image separating module 4420.

Next, the process of the main separation direction determining module 4540 will be described. FIG. 47 is a flowchart illustrating an example of the process of the main separation direction determining module 4540. The main separation direction determining module 4540 performs determination using Table 10, Table 11, Table 12, Table 13, Table 14, and Table 15. The tables show the comparison between the feature amounts in the horizontal direction and the vertical direction. The main separation direction determining module 4540 performs determination, updates the direction and the state, and outputs them.

TABLE 10

|  |  | Num of H = 2 | |
|---|---|---|---|
|  |  | True | False |
| Num of V = 2 | True | State←C<br>State←T | Direction←V<br>State←T |
|  | False | Direction←H<br>State←T | Nothing (⊥) |

TABLE 11

|  | MaxThick | | |
|---|---|---|---|
|  | Others (H == V) | H > V | H < V |
| Process | Nothing (⊥) | Direction←H<br>State←P | Direction←V<br>State←P |

TABLE 12

|  | MaxCurl | | |
|---|---|---|---|
|  | Others (H == V) | H < V | H > V |
| Process | Nothing (⊥) | Direction←H<br>State←P | Direction←V<br>State←P |

TABLE 13

|  | AvgCurl | | |
|---|---|---|---|
|  | Others (H == V) | H < V | H > V |
| Process | Nothing (⊥) | Direction←H<br>State←P | Direction←V<br>State←P |

TABLE 14

|  | AvgThick | | |
|---|---|---|---|
|  | Others (H == V) | H > V | H < V |
| Process | Nothing (⊥) | Direction←H<br>State←P | Direction←V<br>State←P |

TABLE 15

|  | AvgCost | | |
|---|---|---|---|
|  | Others (H == V) | H < V | H > V |
| Process | Nothing (⊥) | Direction←H<br>State←P | Direction←V<br>State←P |

In the flowchart shown in FIG. 47, the determination processes are sequentially performed. The order of the determination processes shown in FIG. 47 is based on the following.

First, a separation direction determining process according to this exemplary embodiment determines a separation direction on the basis of the shape of the separation path. Therefore, the "determination based on Cost", which is not determination based on shape information, has the lowest priority and is arranged in the last stage.

Then, a target image is likely to be multiple paragraphs and it is necessary to cut out character strings from the image. First, it is necessary to separate paragraphs. In general, the gap between the paragraphs is more than that between character strings forming the paragraph. First, "determination based on MaxThick" (Table 11) is performed.

The total number of separation paths calculated in the horizontal direction is not necessarily equal to the number of separation paths calculated in the vertical direction, according to a target image (that is, for example, there is horizontal writing that is long in the vertical direction or vertical writing that is long in the horizontal direction). Since the average value of the separation paths in a given direction is affected by the total number (that is, Num) of separation paths, "determination based on MaxCurl" (Table 12) is arranged before "determination based on AvgCurl" (Table 13).

When the gap between the character strings is sufficiently large, determination based on Curl may not be performed. Therefore, "determination based on AvgThick" (Table 14) is performed.

Finally, in a determination process considering an image including plural character strings, a target image is not necessarily limited to the image including plural character strings. Therefore, "determination based on Num" (Table 10) is performed in the first stage to determined whether a target image is a single character, a single character string, or the others.

This process will be described with reference to the flowchart.

In Step S4702, ⊥ (determination is unavailable) is substituted into a "direction" variable and ⊥ (determination is unavailable) is substituted into a "state" variable.

In Step S4704, determination based on Num of Table 10 is performed. That is, when both of the number of separation paths in the horizontal direction and the number of separation paths in the vertical directions are two, the target image is a single character (C). When either the number of separation paths in the horizontal direction or the number of separation paths in the vertical directions is two, the target image is a single character string (T). When the number of separation paths in the horizontal direction is two, the direction is horizontal (H). When the number of separation paths in the vertical direction is two, the direction is vertical (V). When neither the number of separation paths in the horizontal direction nor the number of separation paths in the vertical directions is two, the target image is nothing (the determination of the state is unavailable (⊥)).

In Step S4706, it is determined whether the "state" variable indicates "determination is unavailable" (state==⊥). When it is determined that the "state" variable indicates "determination is unavailable", the process proceeds to Step S4708. In the other cases, the process proceeds to Step S4726.

In Step S4708, determination based on MaxThick of Table 11 is determined. That is, when MaxThick in the vertical direction is less than MaxThick in the horizontal direction, the direction is horizontal (H) and the state is a single paragraph (P). When MaxThick in the vertical direction is more than MaxThick in the horizontal direction, the direction is vertical (V) and the state is a single paragraph (P). In the other cases (when MaxThick in the vertical direction is equal to MaxThick in the horizontal direction), nothing is done (the state "determination is unavailable (⊥)" is maintained).

In Step S4710, it is determined whether the "state" variable indicates "determination is unavailable" (state==⊥). When it is determined that the "state" variable indicates "determination is unavailable", the process proceeds to Step S4712. In the other cases, the process proceeds to Step S4726.

In Step S4712, determination based on MaxCurl of Table 12 is performed. That is, when MaxCurl in the horizontal direction is less than MaxCurl in the vertical direction, the direction is horizontal (H), and the state is a single paragraph (P). When MaxCurl in the horizontal direction is more than MaxCurl in the vertical direction, the direction is vertical (V), and the state is a single paragraph (P). In the other cases (when MaxCurl in the horizontal direction is equal to MaxCurl in the vertical direction), nothing is done (the state "determination is unavailable (⊥)" is maintained).

In Step S4714, it is determined whether the "state" variable indicates "determination is unavailable" (state==⊥). When it is determined that the "state" variable indicates "determination is unavailable", the process proceeds to Step S4716. In other cases, the process proceeds to Step S4726.

In Step S4716, determination based on AvgCurl of Table 13 is performed. That is, when AvgCurl in the horizontal direction is less than AvgCurl in the vertical direction, the direction is horizontal (H), and the state is a single paragraph (P). When AvgCurl in the horizontal direction is more than AvgCurl in the vertical direction, the direction is vertical (V), and the state is a single paragraph (P). In the other cases (when AvgCurl in the horizontal direction is equal to AvgCurl in the vertical direction), nothing is done (the state "determination is unavailable (⊥)" is maintained).

In Step S4718, it is determined whether the "state" variable indicates "determination is unavailable" (state==⊥). When it is determined that the "state" variable indicates "determination is unavailable", the process proceeds to Step S4720. In other cases, the process proceeds to Step S4726.

In Step S4720, determination based on AvgThick of Table 14 is performed. That is, when AvgThick in the horizontal direction is more than AvgThick in the vertical direction, the direction is horizontal (H) and the state is a single paragraph (P). When AvgThick in the horizontal direction is less than AvgThick in the vertical direction, the direction is vertical (V) and the state is a single paragraph (P). In the other case (when AvgThick in the horizontal direction is equal to AvgThick in the vertical direction), nothing is done (the state "determination is unavailable (⊥)" is maintained).

In Step S4722, it is determined whether the "state" variable indicates "determination is unavailable" (state==⊥). When it is determined that the "state" variable indicates "determination is unavailable", the process proceeds to Step S4724. In other cases, the process proceeds to Step S4726.

In Step S4724, determination based on AvgCost of Table 15 is performed. That is, when AvgCost in the horizontal direction is less than AvgCost in the vertical direction, the direction is horizontal (H) and the state is a single paragraph (P). When AvgCost in the horizontal direction is more than AvgCost in the vertical direction, the direction is vertical (V) and the state is a single paragraph (P). In the other case (when AvgCost in the horizontal direction is equal to AvgCost in the vertical direction), nothing is done (the state "determination is unavailable (⊥)" is maintained).

In Step S4726, (direction, state), which is a set of the "direction" variable and the "state" variable, is output.

The main separation direction determining module 4540 may perform the determination processes in an order different from that in the flowchart shown in FIG. 47. For example, the "determination based on AvgThick" (Table 14) may be arranged immediately after the "determination based on MaxThick" (Table 11). In addition, instead of the sequential determination shown in FIG. 47, integrated determination using the integration of the determination processes may be performed. That is, after the determination processes using Tables 10 to 15 are individually performed, the determination processes may be integrated for determination. In addition, there is integrated determination between determination based on a projection distribution or the feature amounts of connection components other than the determination based on the separation paths. The determination method may be selected according to the property of a target image.

Next, the process of the main separation path selecting module 4550 will be described. The process flows are shown in FIGS. 48 to 53. The main separation path selecting module 4550 performs the process according to any one or combinations of the process flows.

In the process, the main separation path selecting module 4550 selects an appropriate separation path among the separation paths in the determined direction and outputs the selected separation path. In addition, the main separation path selecting module 4550 performs state determination in order to determine recursion. The main separation path selecting module 4550 also thins out the separation paths.

Figure 48:
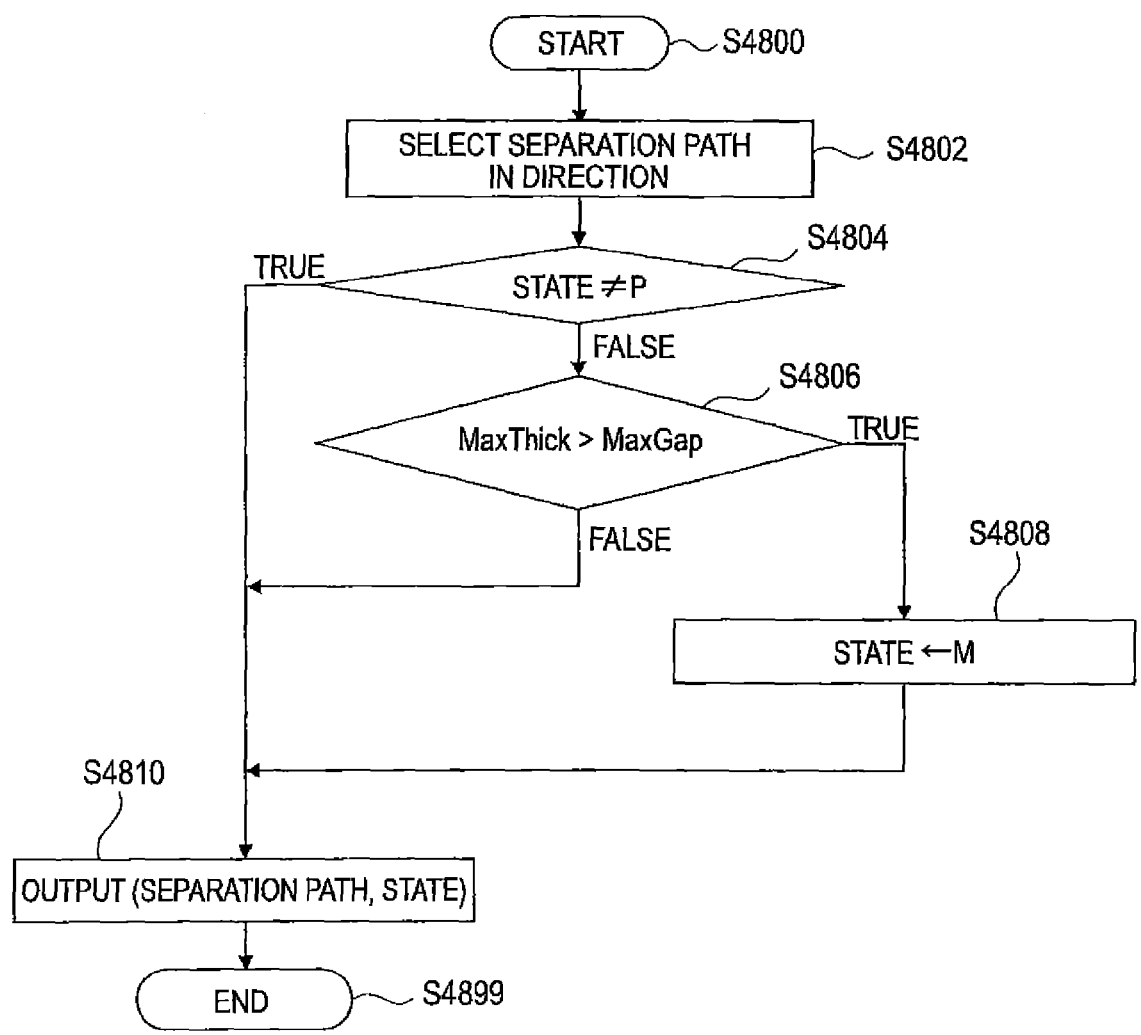
FIG. 48 is a flowchart illustrating a process example (1) of the main separation path selecting module.

FIG. 48 is a flowchart illustrating a process example (1) of the main separation path selecting module 4550.

In Step S4802, the main separation path selecting module 4550 selects the separation paths in the direction determined by the main separation direction determining module 4540.

In Step S4804, the main separation path selecting module 4550 determines whether the "state" variable does not indicate a single paragraph (state≠P). When it is determined that the "state" variable does not indicate a single paragraph, the process proceeds to Step S4810. In the other cases, the process proceeds to Step S4806. That is, when the state is not P (paragraph), the main separation path selecting module 4550 selects the separation path selected in Step S4802 and does not update the state such that recursive processing is not performed any further. This is because image separation is not performed any further when a target image is T (single character string), C (single character), or ⊥ (determination is unavailable).

In Step S4806, it is determined whether MaxThick>MaxGap is satisfied. When it is determined that MaxThick>MaxGap is satisfied, the process proceeds to Step S4808. In the other cases, the process proceeds to Step S4810. That is, when MaxThick (that is, the maximum thickness of the separation path) is sufficient large in the target image, the target image is determined to be multiple paragraphs (M) and the state is updated to M (Step S4808). The sufficient thickness is determined by comparison with MaxGap, which is the gap between the character strings, and it is determined whether the target image is multiple paragraphs (M) or a single paragraph (P).

In Step S4808, M (multiple paragraphs) is substituted into the "state" variable.

In Step S4810, (separation path, state) is output.

Figure 49:
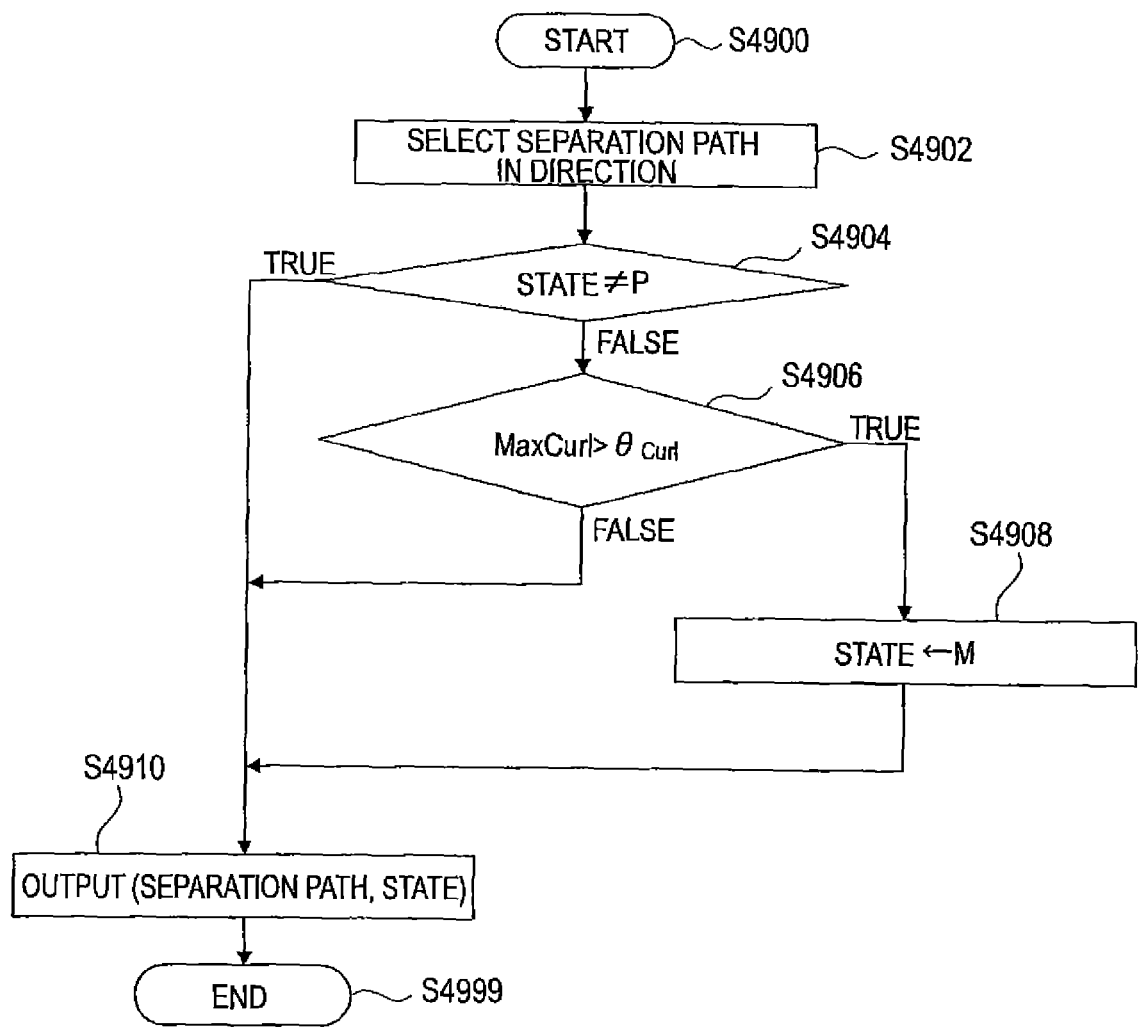
FIG. 49 is a flowchart illustrating a process example (2) of the main separation path selecting module.

FIG. 49 is a flowchart illustrating a process example (2) of the main separation path selecting module 4550.

In Step S4902, the main separation path selecting module 4550 selects the separation paths in the direction determined by the main separation direction determining module 4540.

In Step S4904, the main separation path selecting module 4550 determines whether the "state" variable does not indicate a single paragraph (state≠P). When it is determined that the "state" variable does not indicate a single paragraph, the process proceeds to Step S4910. In the other cases, the process proceeds to Step S4906.

In Step S4906, it is determined whether MaxCurl>$\theta_{Curl}$ is satisfied. When it is determined that MaxCurl>$\theta_{Curl}$ is satisfied, the process proceeds to Step S4908. In the other cases, the process proceeds to Step S4910. That is, MaxCurl is compared with a predetermined threshold value ($\theta_{Curl}$) to determine whether the state is multiple paragraphs (M). In the determination based on "MaxCurl>$\theta_{Curl}$", when the distortion of the separation path selected in Step S4902 is equal to or less than the threshold value $\theta_{Curl}$, a target image is determined to be a single paragraph (P) other than multiple paragraphs WO and the separation path selected in Step S4902 is selected. If not, the state is updated to M (Step S4908).

In Step S4908, M (multiple paragraphs) is substituted into the "state" variable.

In Step S4910, (separation path, state) is output.

Figure 50:
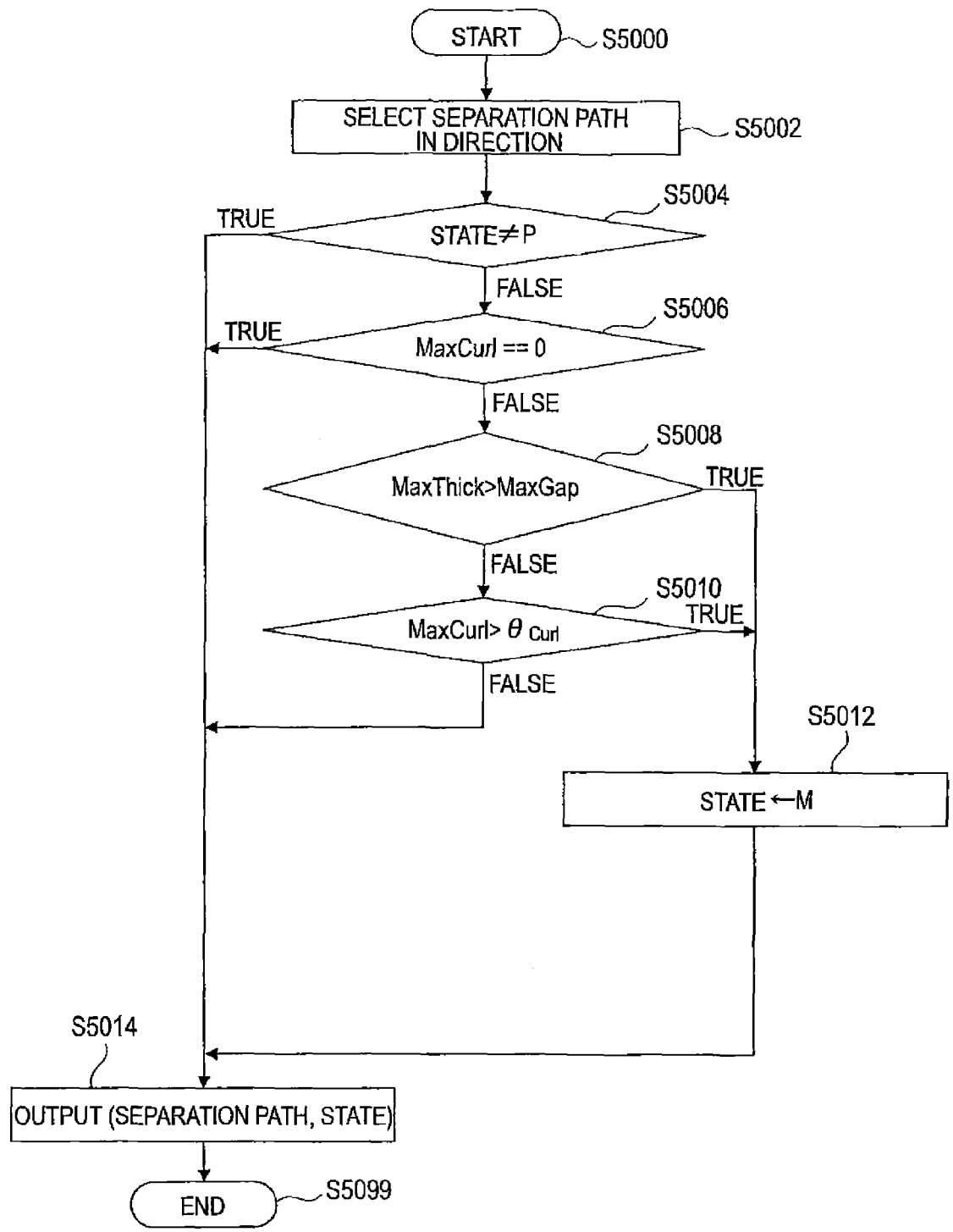
FIG. 50 is a flowchart illustrating a process example (3) of the main separation path selecting module.

FIG. 50 is a flowchart illustrating a process example (3) of the main separation path selecting module 4550. In the process example shown in FIG. 50, there are plural determination steps (Step S5006, Step S5008, and Step S5010), unlike FIG. 48 and FIG. 49.

In Step S5002, the main separation path selecting module 4550 selects the separation paths in the direction determined by the main separation direction determining module 4540.

In Step S5004, the main separation path selecting module 4550 determines whether the "state" variable does not indicate a single paragraph (state≠P). When it is determined that the "state" variable does not indicate a single paragraph, the process proceeds to Step S5014. In the other cases, the process proceeds to Step S5006.

In Step S5006, it is determined whether MaxCurl==0 is satisfied. When it is determined that MaxCurl==0 is satisfied, the process proceeds to Step S5014. In the other cases, the process proceeds to Step S5008. That is, when there is no distortion in the separation path selected in Step S5002, a target image is determined to be a single paragraph and the separation path selected in Step S5002 is selected.

In Step S5008, it is determined whether MaxThick>MaxGap is satisfied. When it is determined that MaxThick>MaxGap is satisfied, the process proceeds to Step S5012. In the other cases, the process proceeds to Step S5010. This corresponds to S4806 in the flowchart shown in FIG. 48.

In Step S5010, it is determined whether MaxCurl>$\theta_{Curl}$ is satisfied. When it is determined that MaxCurl>$\theta_{Curl}$ is satisfied, the process proceeds to Step S5012. In the other cases, the process proceeds to Step S5014. This corresponds to S4906 in the flowchart shown in FIG. 49.

In Step S5012, M (multiple paragraphs) is substituted into the "state" variable.

In Step S5014, (separation path, state) is output.

Figure 51:
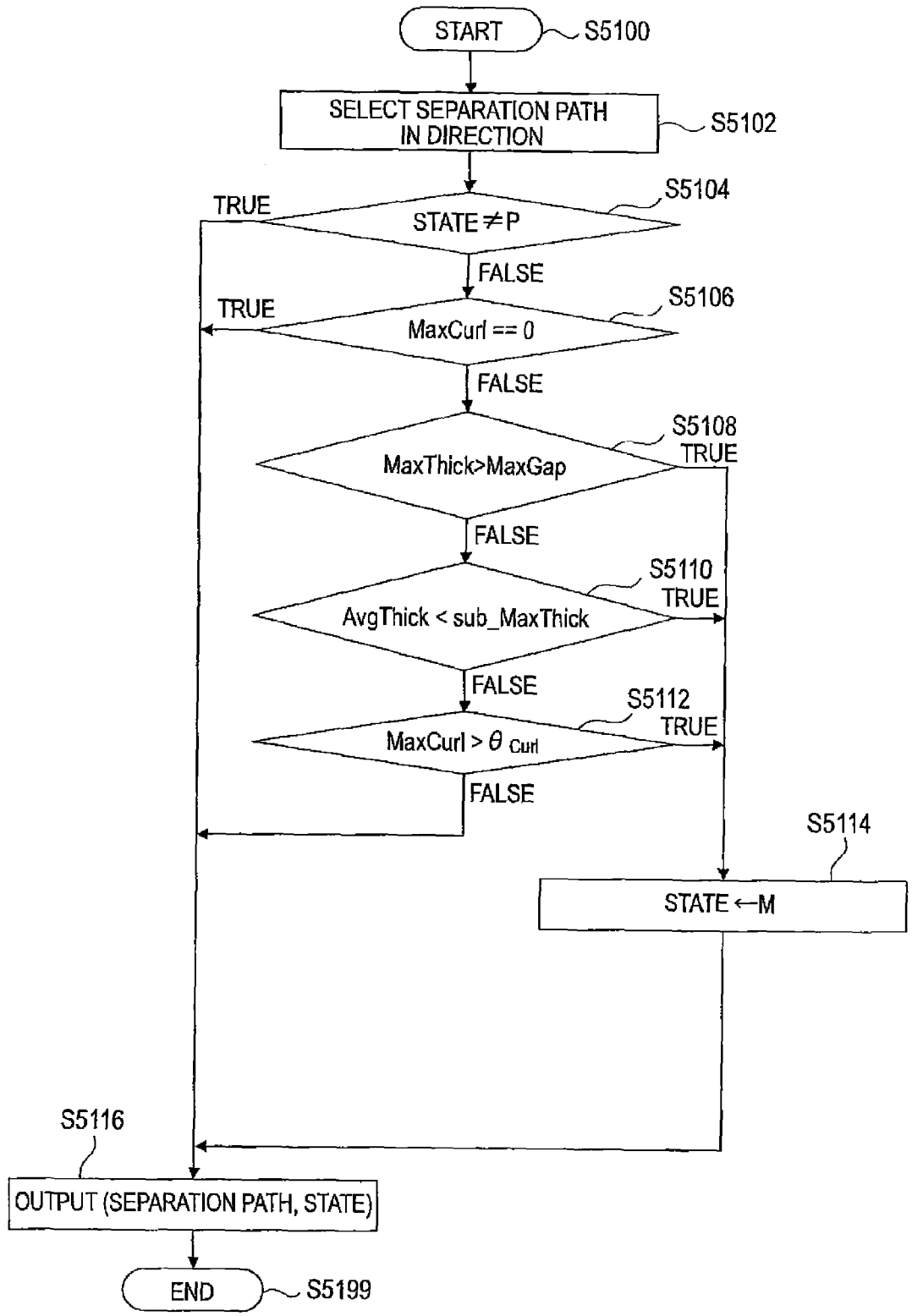
FIG. 51 is a flowchart illustrating a process example (4) of the main separation path selecting module.

FIG. 51 is a flowchart illustrating a process example (4) of the main separation path selecting module 4550. In the process example, determination is performed with reference to the feature amount of the separation path in a direction that is not the separation direction (Step S5110).

In Step S5102, the main separation path selecting module 4550 selects the separation paths in the direction determined by the main separation direction determining module 4540.

In Step S5104, the main separation path selecting module 4550 determines whether the "state" variable does not indicate a single paragraph (state≠P). When it is determined that the "state" variable does not indicate a single paragraph, the process proceeds to Step S5116. In the other cases, the process proceeds to Step S5106.

In Step S5106, it is determined whether MaxCurl=0 is satisfied. When it is determined that MaxCurl==0 is satisfied, the process proceeds to Step S5116. In the other cases, the process proceeds to Step S5108. This corresponds to S5006 in the flowchart shown in FIG. 50.

In Step S5108, it is determined whether MaxThick>MaxGap is satisfied. When it is determined that MaxThick>MaxGap is satisfied, the process proceeds to Step S5114. In the other cases, the process proceeds to Step S5110. This corresponds to S4806 in the flowchart shown in FIG. 48.

In Step S5110, it is determined whether AvgThick<sub_MaxThick is satisfied. When it is determined that AvgThick<sub_MaxThick is satisfied, the process proceeds to S5114. In the other cases, the process proceeds to Step S5112. "sub_MaxThick" is the maximum thickness of the separation path in a direction that is not the separation direction. When "sub_MaxThick" is more than "AvgThick", which is the average thickness of the separation path in the separation direction, a target image is determined to be multiple paragraphs (M).

In Step S5112, it is determined whether MaxCurl>$\theta_{Curl}$ is satisfied. When it is determined that MaxCurl>$\theta_{Curl}$, is satisfied, the process proceeds to Step S5114. In the other cases, the process proceeds to Step S5116. This corresponds to S4906 in the flowchart shown in FIG. 49.

In Step S5114, M (multiple paragraphs) is substituted into the "state" variable.

In Step S5116, (separation path, state) is output.

Figure 52:
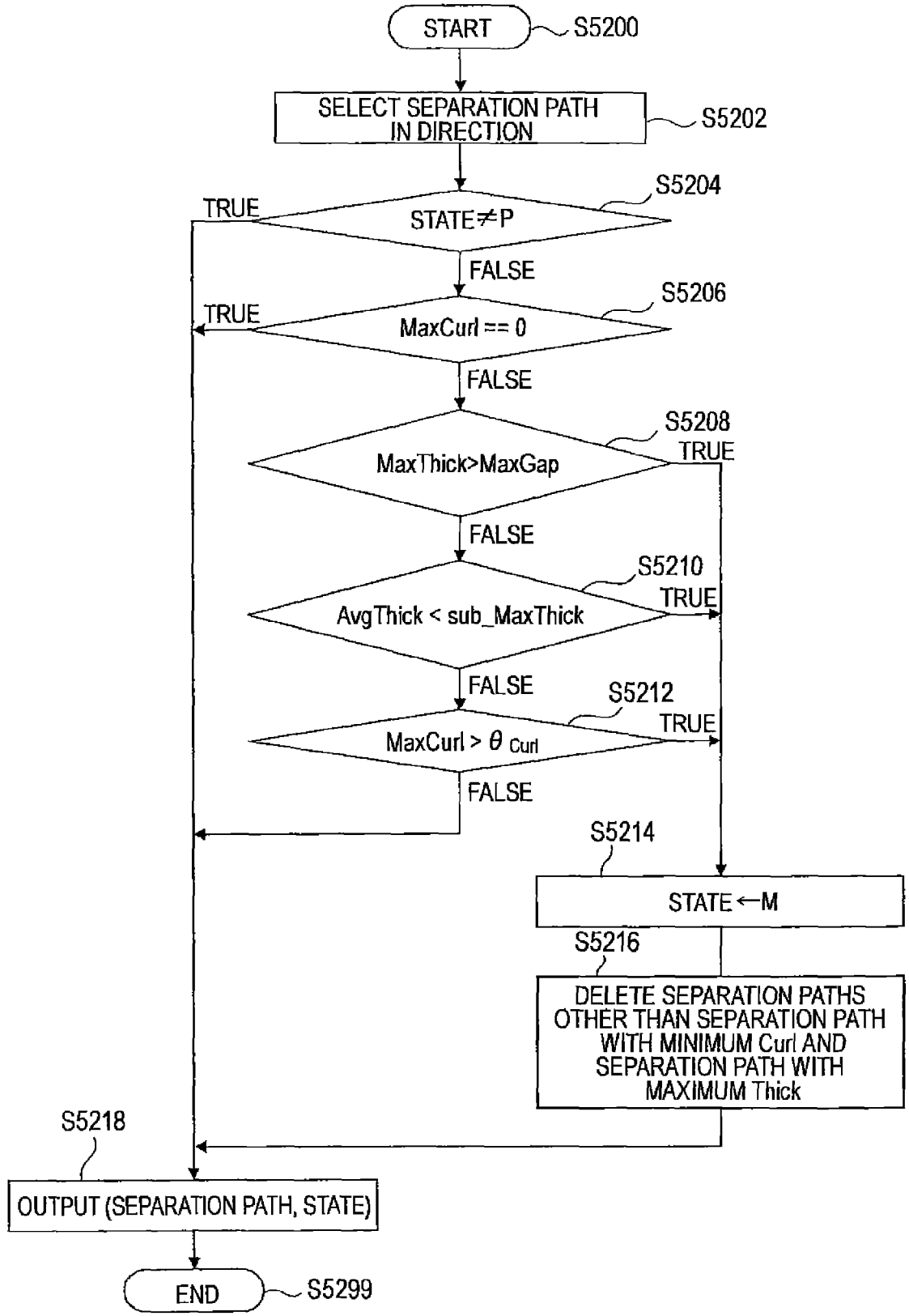
FIG. 52 is a flowchart illustrating a process example (5) of the main separation path selecting module.

FIG. 52 is a flowchart illustrating a process example (5) of the main separation path selecting module 4550. In the process example, when a target image is determined to be multiple paragraphs, main separation path selecting module 4550 thins out the separation paths. Steps S5202 to S5214 and Step S5218 respectively correspond to Steps S5102 to S5114 and Step S5116 in FIG. 51.

In Step S5202, the main separation path selecting module 4550 selects the separation paths in the direction determined by the main separation direction determining module 4540.

In Step S5204, the main separation path selecting module 4550 determines whether the "state" variable does not indicate a single paragraph (state 2). When it is determined that the "state" variable does not indicate a single paragraph, the process proceeds to Step S5218. In the other cases, the process proceeds to Step S5206.

In Step S5206, it is determined whether MaxCurl==0 is satisfied. When it is determined that MaxCurl==0 is satisfied, the process proceeds to Step S5218. In the other cases, the process proceeds to Step S5208.

In Step S5208, it is determined whether MaxThick>MaxGap is satisfied. When it is determined that MaxThick>MaxGap is satisfied, the process proceeds to Step S5214. In the other cases, the process proceeds to Step S5210.

In Step S5210, it is determined whether AvgThick<sub_MaxThick is satisfied. When it is determined that AvgThick<sub_MaxThick is satisfied, the process proceeds to S5214. In the other cases, the process proceeds to Step S5212.

In Step S5212, it is determined whether MaxCurl>$\theta_{Curl}$ is satisfied. When it is determined that MaxCurl>$\theta_{Curl}$ is satisfied, the process proceeds to Step S5214. In the other cases, the process proceeds to Step S5218.

In Step S5214, M (multiple paragraphs) is substituted into the "state" variable.

In Step S5216, separation paths other than the separation path with the minimum distortion ($Curl_i$) and the separation path with the maximum thickness ($Thick_i$) are deleted. For example, the $path_1$ satisfying the conditions may be deleted by the comparison between $Curl_i$ and MinCurl and the comparison between $Thick_i$ and MaxThick.

In Step S5218, (separation path, state) is output.

Figure 53:
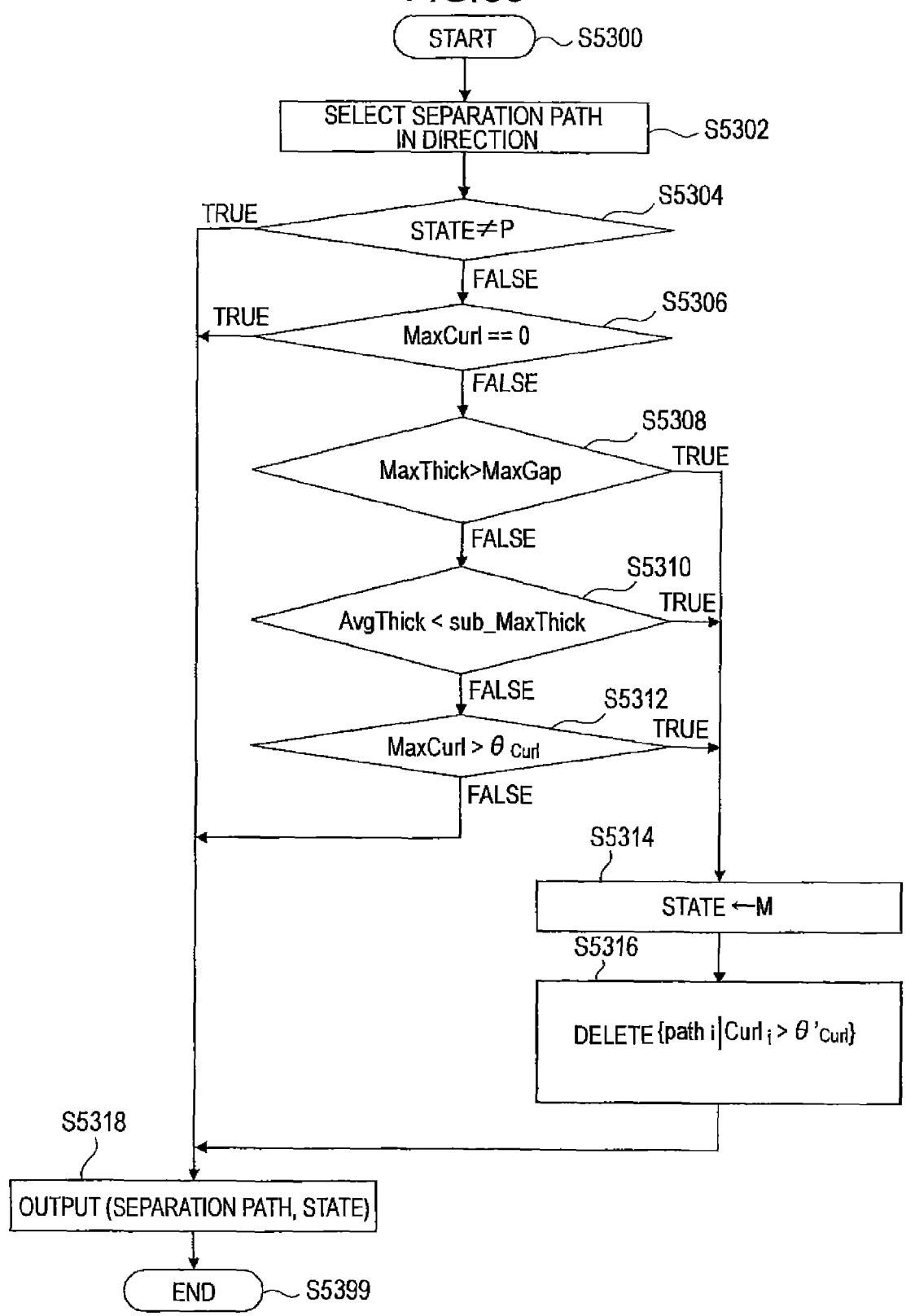
FIG. 53 is a flowchart illustrating a process example (6) of the main separation path selecting module.

FIG. 53 is a process example (6) of the main separation path selecting module 4550. In the process example, when a target image is determined to be multiple paragraphs, the main separation path selecting module 4550 thins out the separation paths. Steps S5302 to S5314 and Step S5318 respectively correspond to Steps S5102 to S5114 and Step S5116 in FIG. 51.

In Step S5302, the main separation path selecting module 4550 selects the separation paths in the direction determined by the main separation direction determining module 4540.

In Step S5304, the main separation path selecting module 4550 determines whether the "state" variable does not indicate a single paragraph (state≠P). When it is determined that the "state" variable does not indicate a single paragraph, the process proceeds to Step S5318. In the other cases, the process proceeds to Step S5306.

In Step S5306, it is determined whether MaxCurl==0 is satisfied. When it is determined that MaxCurl==0 is satisfied, the process proceeds to Step S5318. In the other cases, the process proceeds to Step S5308.

In Step S5308, it is determined whether MaxThick>MaxGap is satisfied. When it is determined that MaxThick>MaxGap is satisfied, the process proceeds to Step S5314. In the other cases, the process proceeds to Step S5310.

In Step S5310, it is determined whether AvgThick<sub_MaxThick is satisfied. When it is determined that AvgThick<sub_MaxThick is satisfied, the process proceeds to S5314. In the other cases, the process proceeds to Step S5312.

In Step S5312, it is determined whether MaxCurl>$\theta_{Curl}$ is satisfied. When it is determined that MaxCurl>$\theta_{Curl}$ is satisfied, the process proceeds to Step S5314. In the other cases, the process proceeds to Step S5318.

In Step S5314, M (multiple paragraphs) is substituted into the "state" variable.

In Step S5316, $\{path_i|Curl_i>\theta'_{Curl}\}$ is deleted. That is, the separation paths are thinned out by comparison between $Curl_i$ and a predetermined threshold value ($\theta'Curl$). The separation paths are thinned out by selecting a $path_i$ with a distortion less than the threshold value $\theta'Curl$ In Step S5318, (separation path, state) is output.

The processes from FIG. 48 to FIG. 53 perform sequential determination. However, instead of the sequential determination, integrated determination using the integration of the above-mentioned determination processes may be performed. For example, after Step S5308, Step S5310, and Step S5312 are individually performed, the steps may be integrated for determination. In addition, determination based on a projection distribution or the feature amounts of connection components may be combined with the determination based on the separation paths. For example, determination based on a projection distribution or the feature amounts of connection components may be performed according to the property of a target image, such the regularity of the width and gap in the projection distribution.

<Exemplary Embodiment C-3>

Figure 54:
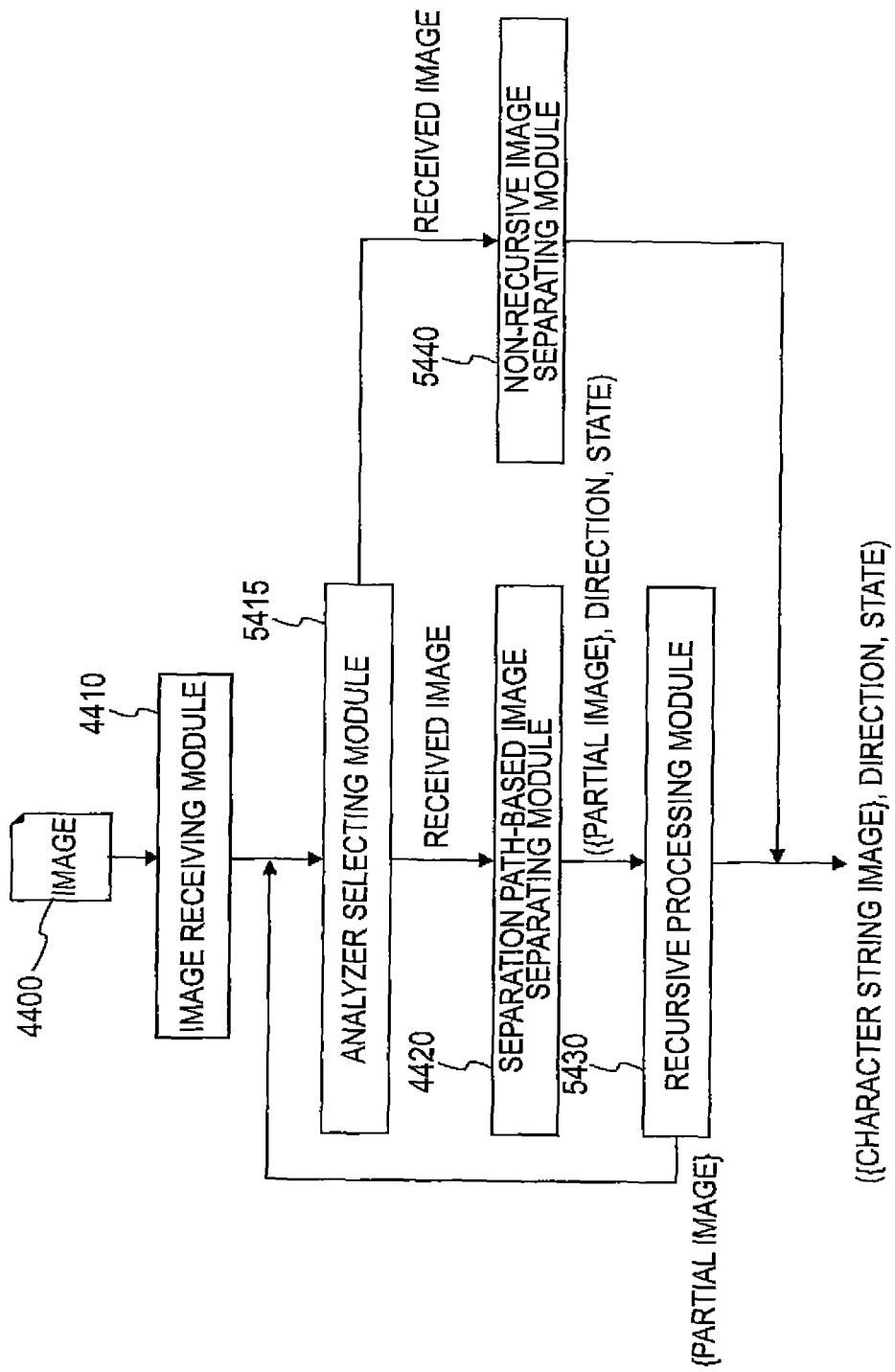
FIG. 54 is a conceptual module structure diagram illustrating an example of a structure according to an exemplary embodiment C-3.

FIG. 54 is a conceptual module structure diagram illustrating an example of a structure according to an exemplary embodiment C-3.

The exemplary embodiment C-3 cuts out a character string from an image and includes an image receiving module 4410, an analyzer selecting module 5415, a separation path-based image separating module 4420, a recursive processing module 5430, and a non-recursive image separating module 5440.

The image receiving module 4410 is connected to the analyzer selecting module 5415 and corresponds to the image receiving module 4210 shown in FIG. 42. An image 4400 corresponds to the image 4200 shown in FIG. 42.

Figure 55:
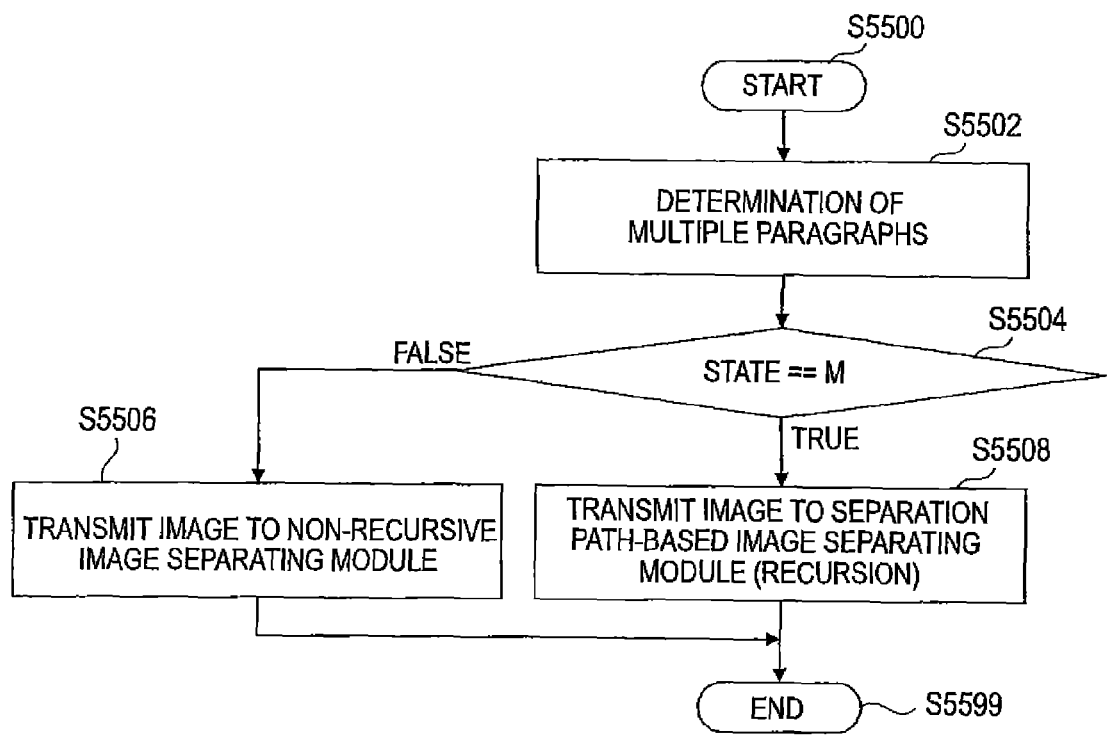
FIG. 55 is a flowchart illustrating an example of the process of an analyzer selecting module.

The analyzer selecting module 5415 is connected to the image receiving module 4410, the separation path-based image separating module 4420, and the non-recursive image separating module 5440. The analyzer selecting module 5415 distributes a target image to one of the separation path-based image separating module 4420 and the non-recursive image separating module 5440. The flow of the process is shown in FIG. 55. FIG. 55 is a flowchart illustrating an example of the process of the analyzer selecting module 5415.

In Step S5502, the analyzer selecting module 5415 performs the determination of multiple paragraphs. This process will be described below with reference to FIG. 57 and FIG. 58.

In Step S5504, it is determined whether the state is multiple paragraphs (state=M). When it is determined that the "state" variable indicates multiple paragraphs, the process proceeds to Step S5508. In the other cases, the process proceeds to Step S5506.

In Step S5506, the received image is transmitted to the non-recursive image separating module 5440.

In Step S5508, the received image is transmitted to the separation path-based image separating module 4420. Then, the recursive processing module 5430 performs recursive processing.

In this case, parameters of the processes of the separation path-based image separating module 4420 and the non-recursive image separating module 5440 may be updated according to the characteristics of a target image. For example, specifically, analysis parameters of the horizontal direction separation path calculating module 4510 and the vertical direction separation path calculating module 4520 shown in FIG. 45, the threshold values θCurl and θ'Curl shown in FIGS. 49 to 53, or a threshold value (θaspect) in "determination of multiple paragraphs", which will be described below with reference to FIGS. 57 and 58, may be updated.

The separation path-based image separating module 4420 is connected to the analyzer selecting module 5415 and the recursive processing module 5430. The separation path-based image separating module 4420 is implemented by the technique shown in FIG. 45. The recursive processing module 5430 performs recursive processing.

The non-recursive image separating module 5440 is connected to the analyzer selecting module 5415. The non-recursive image separating module 5440 is implemented by the technique described in <B>.

The recursive processing module 5430 is connected to the separation path-based image separating module 4420.

Figure 56:
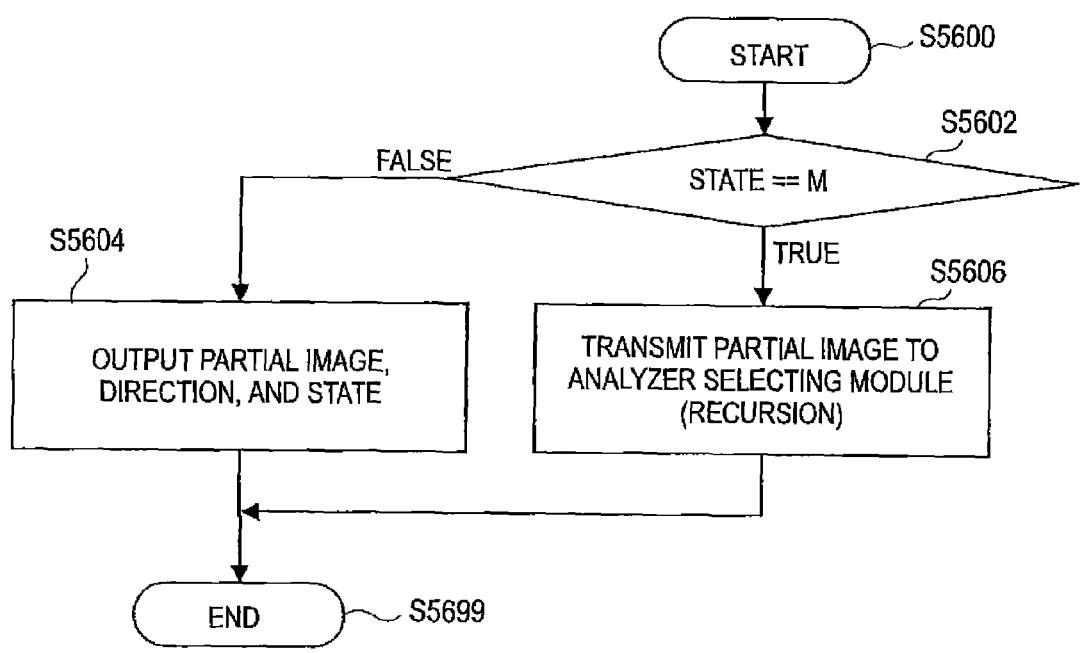
FIG. 56 is a flowchart illustrating an example of the process of a recursive processing module.

FIG. 56 is a flowchart illustrating an example of the process of the recursive processing module 5430. The recursive processing module 5430 determines whether to perform recursive processing on the basis of the state.

The process will be described with reference to the flowchart.

In Step S5602, it is determined whether the state is multiple paragraphs (state==M). When it is determined that the "state" variable indicates multiple paragraphs, the process proceeds to Step S5606. In the other cases, the process proceeds to Step S5604.

In Step S5604, the partial image, the direction, and the state are output.

In Step S5606, the received image is transmitted to the analyzer selecting module 5415 in order to perform recursive processing.

In order to prevent a single paragraph from being recursively separated, the analyzer selecting module 5415 performs the following process in Step S5502 of the flowchart shown in FIG. 55.

Figure 57:
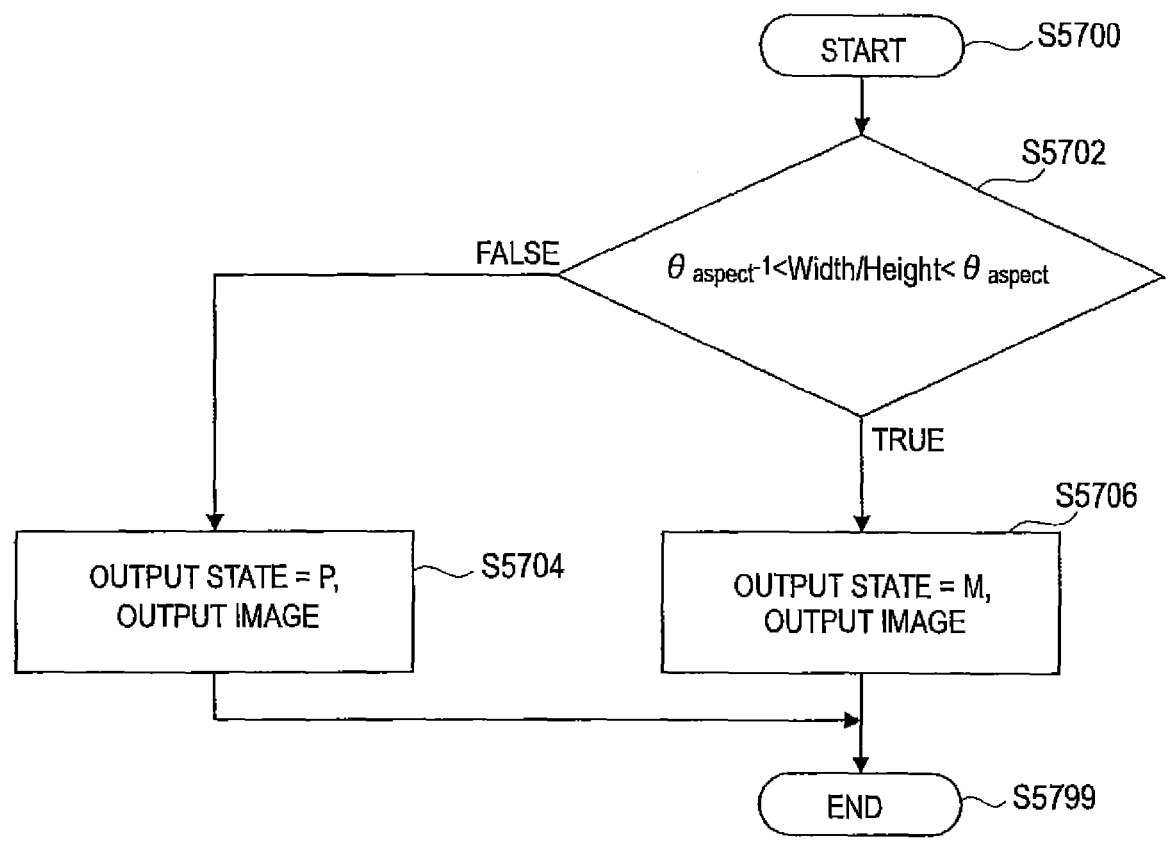
FIG. 57 is a flowchart illustrating a multiple paragraph determining process example (1) of the analyzer selecting module.

FIG. 57 is a flowchart illustrating a multiple paragraph determination process example (1) of the analyzer selecting module 5415. In the process example, it is determined whether the state is multiple paragraphs with reference to the aspect ratio of a target image. That is, it is determined whether the aspect ratio of a target image is equal to or more than $\theta_{aspect}$. Specifically, when the aspect ratio is beyond the range of a predetermined threshold value ($\theta_{aspect}$), the analyzer selecting module 5415 updates the state to P in order to transmit the image to the non-recursive image separating module 5440. The difference between Width and Height may be used in the determination. The variables shown in FIG. 57 are defined as follows:

The width of a target image in the horizontal direction: Width;

The width of a target image in the vertical direction: Height; and

Aspect ratio threshold value: $\theta_{aspect}$. The process will be described with reference to the flowchart.

In Step S5702, it is determined whether $\theta_{aspect}^{-1} < \text{Width}/\text{Height} < \theta_{aspect}$ is satisfied. When it is determined that $\theta_{aspect}^{-1} < \text{Width}/\text{Height} < \theta_{aspect}$ is satisfied, the process proceeds to Step S5706. In the other cases, the process proceeds to Step S5704.

In Step S5704, information indicating that the state is a single paragraph (state=P) is output, and the image is output.

In Step S5706, information indicating that the state is multiple paragraphs (state=M) is output and the image is output.

Figure 58:
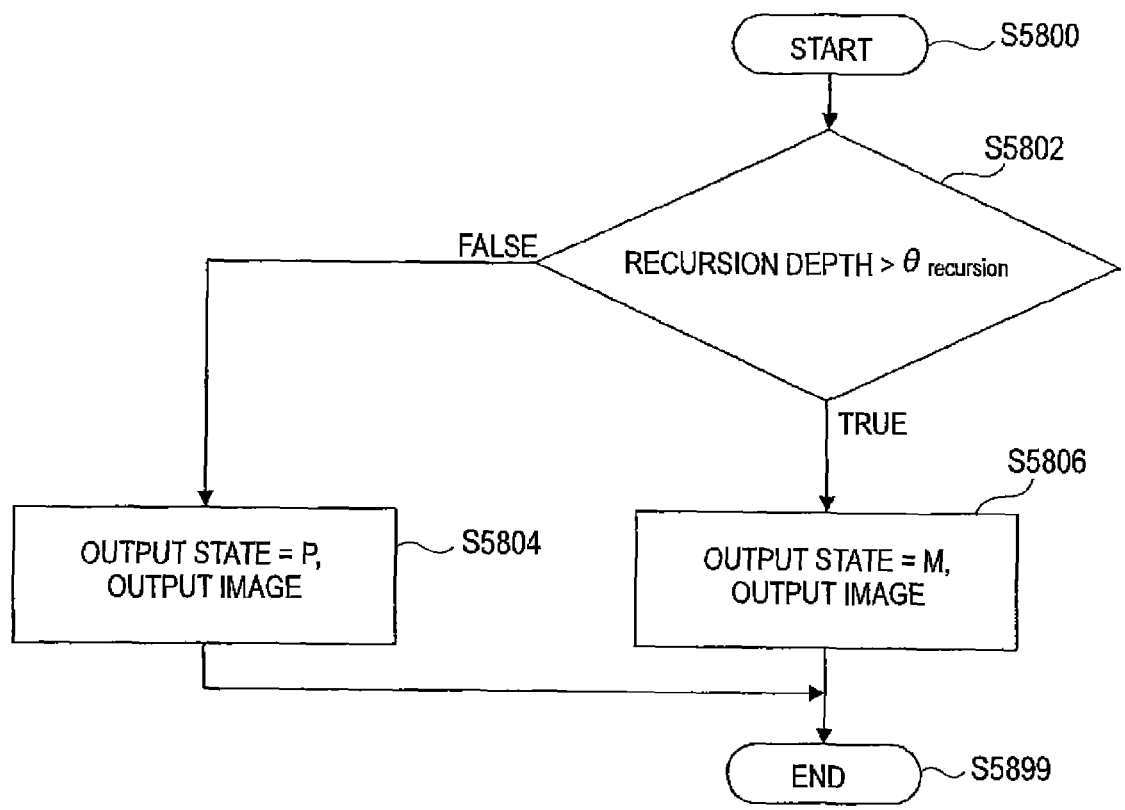
FIG. 58 is a flowchart illustrating a multiple paragraph determining process example (2) of the analyzer selecting module.

FIG. 58 is a flowchart illustrating a multiple paragraph determination process example (2) of the analyzer selecting module 5415. In the process example, that a target image does not have a complicated document structure where recursion depth is equal to or more than $\theta_{recursion}$. That is, the recursive depth (that is, the number of times a target image is separated until now) is stored and counted, and the recursive depth is compared with a predetermined threshold value ($\theta_{recursion}$) to determine whether the state is multiple paragraphs. When the recursive depth is not more than the threshold value ($\theta_{recursion}$) the analyzer selecting module 5415 updates the state to P in order to transmit the image to the non-recursive image separating module 5440. In addition, the analyzer selecting module 5415 may stores a pair of the counter of the recursive depth and a partial image, set an initial value of the counter to 0, and increases the count value by one in the process of the recursive processing module 5430. The variable shown in FIG. 58 is defined as follows:

Recursive depth: $\theta_{recursion}$.

The process will be described with reference to the flowchart.

In Step S5802, it is determined whether recursive depth>$\theta_{recursion}$ is satisfied. When it is determined that recursive depth>$\theta_{recursion}$ is satisfied, the process proceeds to Step S5806. In the other cases, the process proceeds to Step S5804.

In Step S5804, information indicating the state is a single paragraph (state=P) is output, and the image is output.

In Step S5806, information indicating the state is multiple paragraphs (state=M) is output and the image is output.

The determination of multiple paragraphs in Step S5502 shown in FIG. 55 may be other than the process flows shown in FIGS. 57 and 58. For example, the process flows shown in FIGS. 57 and 58 may be combined, and a projection distribution and connection components may be used.

Exemplary embodiments in which a pre-process or a post-process is added to the above-described exemplary embodiments will be described below, in which a character string is cut out from a target image.

<Exemplary Embodiment C-4>

Figure 59:
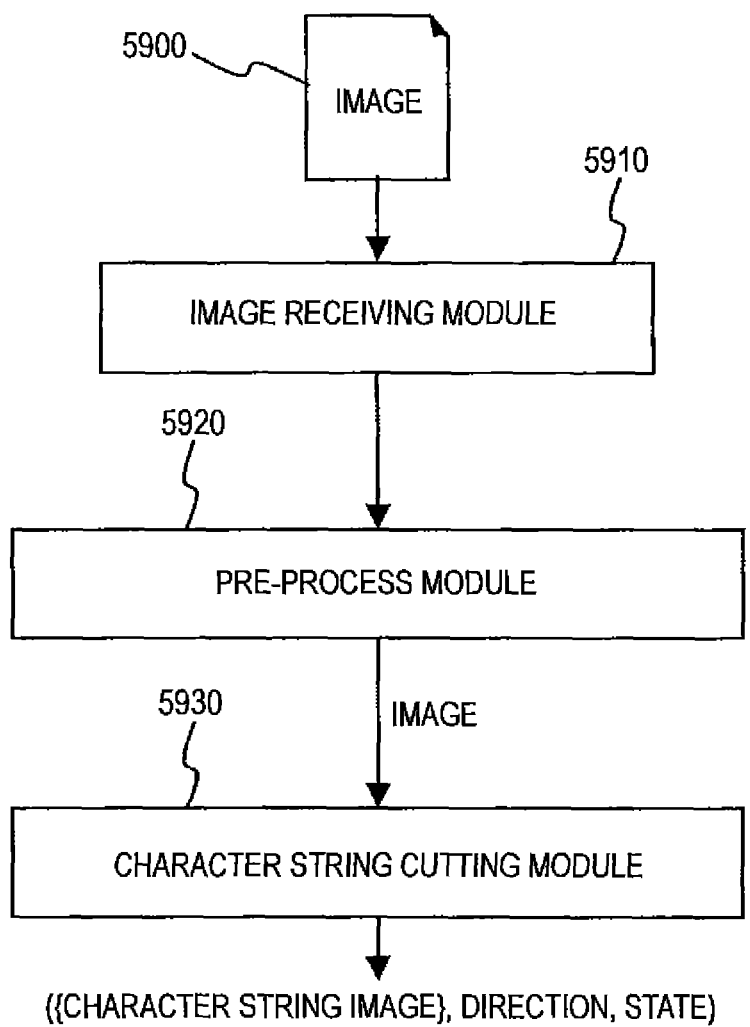
FIG. 59 is a conceptual module structure diagram illustrating an example of a structure according to an exemplary embodiment C-4.

FIG. 59 is a conceptual module structure diagram illustrating an example of a structure according to an exemplary embodiment C-4.

The exemplary embodiment C-4 includes an image receiving module 5910, a pre-process module 5920, and a character cutting module 5930.

The image receiving module 5910 is connected to the pre-process module 5920 and corresponds to the image receiving module 4210 shown in FIG. 42. An image 5900 corresponds to the image 4200 shown in FIG. 42.

The pre-process module 5920 is connected to the image receiving module 5910 and the character cutting module 5930 and performs, for example, inclination correction, noise removal, and layout analysis on the image 5900 received by the image receiving module 5910. For example, the pre-process module 5920 transmits a partial image separated by the layout analysis to the character cutting module 5930.

The character cutting module 5930 is connected to the pre-process module 5920 and is implemented by the technique described in the above-described exemplary embodiments (including the exemplary embodiments of <B>).

<Exemplary Embodiment C-5>

Figure 60:
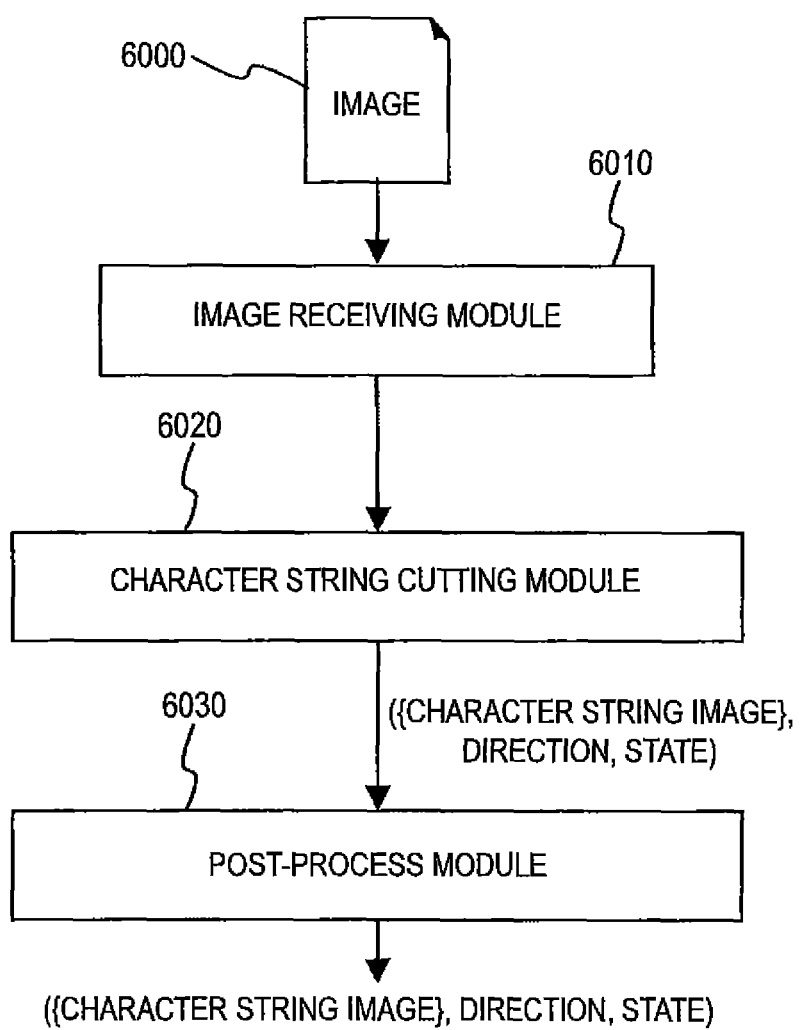
FIG. 60 is a conceptual module structure diagram illustrating an example of a structure according to an exemplary embodiment C-5.

FIG. 60 is a conceptual module structure diagram illustrating an example of a structure according to an exemplary embodiment C-5.

The exemplary embodiment C-5 includes an image receiving module 6010, a character cutting module 6020, and a post-process module 6030.

The image receiving module 6010 is connected to the character cutting module 6020 and corresponds to the image receiving module 4210 shown in FIG. 42. An image 6000 corresponds to the image 4200 shown in FIG. 42.

The character cutting module 6020 is connected to the image receiving module 6010 and the post-process module 6030 and is implemented by the technique described in the above-described exemplary embodiments (including the exemplary embodiments of <B>).

The post-process module 6030 is connected to the character cutting module 6020 and performs, for example, inclination correction, noise removal, and underline removal on each character string image separated by the character cutting module 6020.

<Experimental Result C>

The experiment results of the exemplary embodiments in <C> will be described in comparison with the case in which the exemplary embodiments are not used.

First, the case in which the exemplary embodiments are not used will be described.

FIGS. 61A and 61B are diagrams illustrating an example of the result of the process on a single paragraph although a target image is multiple paragraphs. For example, FIGS. 61A and 61B show the process result of the exemplary embodiments described in <B>. In the exemplary embodiments described in <B>, the process is performed on the assumption that a target image is a single paragraph. Therefore, in some cases, a character string is not exactly cut out from an image including plural character strings in different directions or an image including plural paragraphs.

The image shown in FIG. 61A is of a document that includes a title portion composed of character strings with different character sizes and multiple paragraphs including a horizontal paragraph and a vertical paragraph. The image shown in FIG. 61B is of character strings cut out from the image shown in FIG. 61A by the process according to the exemplary embodiments described in <B>. In the vertical paragraph, a character string region is not exactly cut out.

Figure 62:
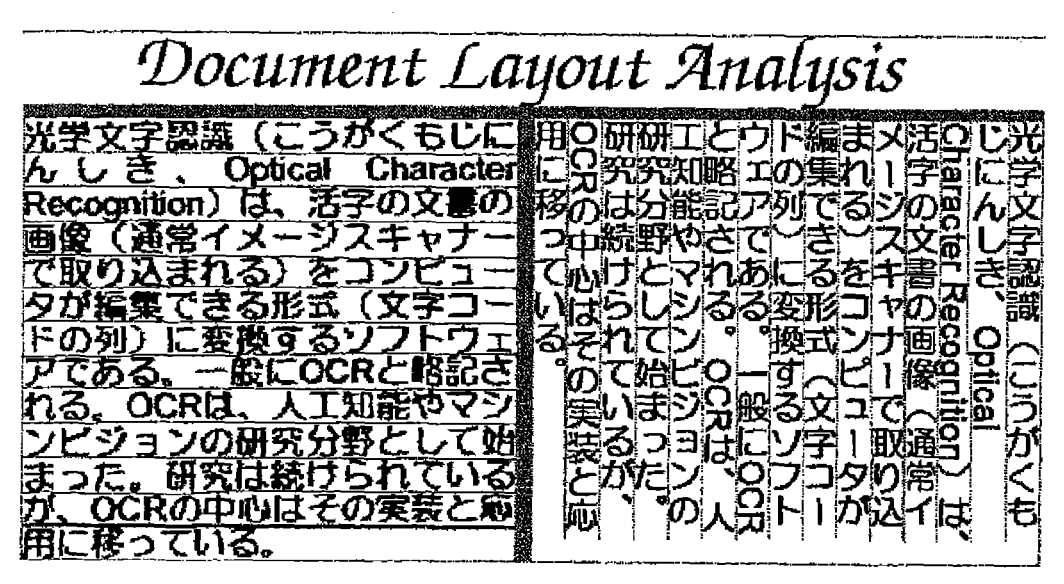

FIG. 62 is a diagram illustrating an example of the result of the process according to the exemplary embodiments described in <C>. FIG. 62 shows the result of the process on the image shown in FIG. 61A, and the image is separated into three regions, that is, a title portion including character strings with different character sizes, a horizontal paragraph, and a vertical paragraph. The title portion includes horizontally written character strings, the horizontal paragraph includes horizontally written character strings, and the vertical paragraph includes vertically written character strings.

Figure 63:
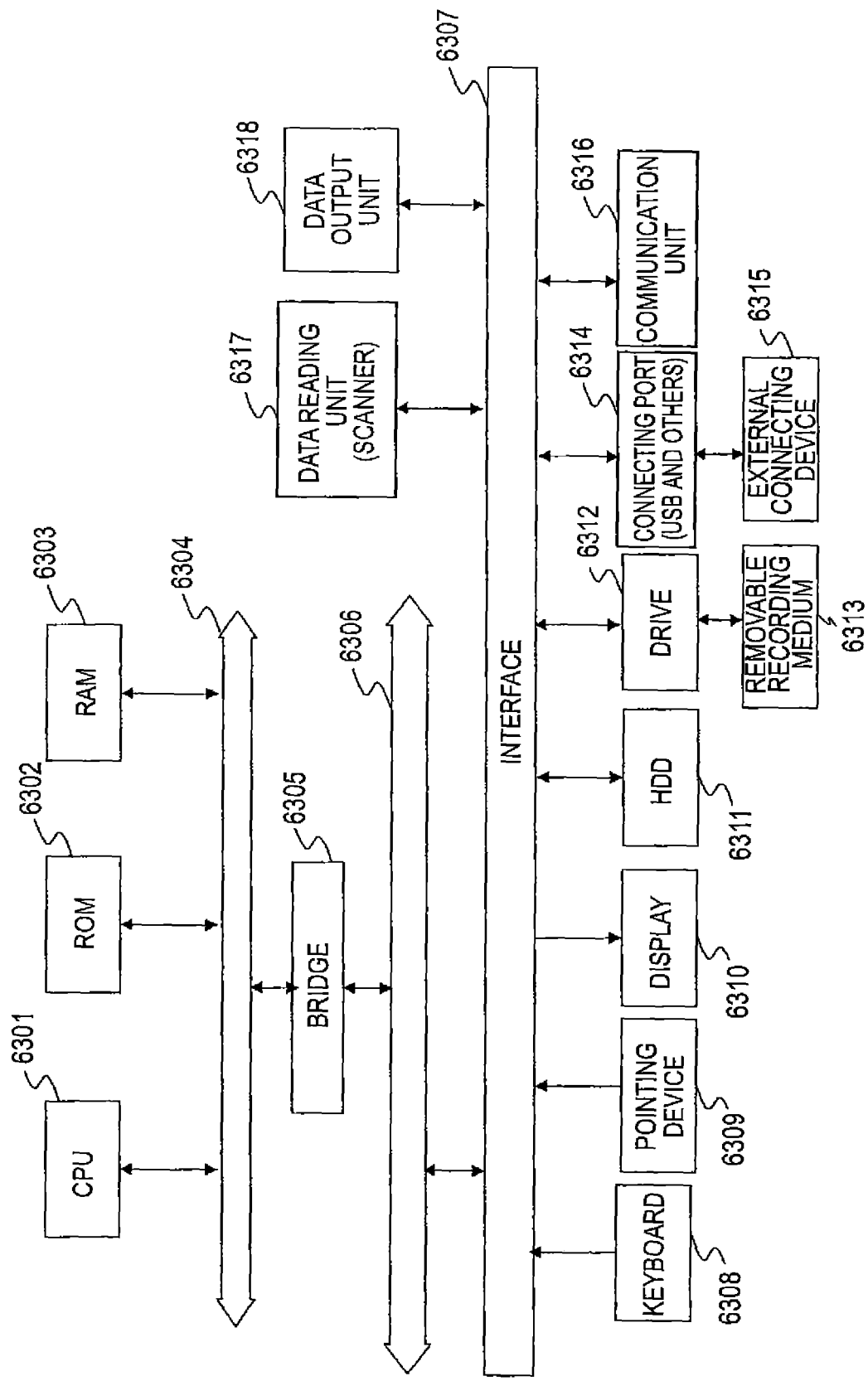
FIG. 63 is a block diagram illustrating an example of the hardware structure of a computer implementing this exemplary embodiment.

An example of the hardware structure of the image processing apparatus according to this exemplary embodiment will be described with reference to FIG. 63. The structure shown in FIG. 63 is configured by, for example, a personal computer (PC). FIG. 63 shows an example of a hardware structure including a data reading unit 6317, such as a scanner, and a data output unit 6318, such as a printer.

A CPU (Central Processing Unit) 6301 is a control unit that performs processes according to a computer program describing the execution sequence of various kinds of modules according to the above-described exemplary embodiments, that is, the forward direction path information calculating module 1110, the path selecting module 1120, the reverse direction path information calculating module 1130, the image separating module 1710, the separation path calculating module 3120, the image separating module 3130, the horizontal direction separation path calculating module 3220, the vertical direction separation path calculating module 3230, the path feature amount calculating module 3240, the separation direction determining module 3250, the image separating module 3460, the analyzer selecting module 4220, the separation path calculating module 4230, the separation path feature amount calculating module 4240, the main separation direction determining module 4250, the main separation path selecting module 4260, the image separating module 4270, the recursive processing module 4280, and the non-recursive image separating module 4290 and the like.

A ROM (Read Only Memory) 6302 stores, for example, programs or operation parameters used by the CPU 6301. A RAM (Random Access Memory) 6303 stores, for example, programs used in the execution of the CPU 6301 or parameters suitably changed in the execution. These members are connected to each other by a host bus 6304, which is, for example, a CPU bus.

The host bus 6304 is connected to an external bus 6306, such as a PCI (Peripheral Component Interconnect/Interface) bus, through a bridge 6305.

A pointing device 6309, such as a keyboard 6308 or a mouse, is an input device operated by the operator. A display 6310 is, for example, a liquid crystal display device or a CRT (Cathode Ray Tube) and displays various kinds of information as text or image information.

An HDD (Hard Disk Drive) 6311 includes a hard disk provided therein and drives the hard disk to record or reproduce the programs or information executed by the CPU 6301. The hard disk stores, for example, a target image, path information, feature amounts, and character string images. In addition, the hard disk stores various kinds of computer programs such as other various kinds of data processing programs.

A drive 6312 reads data or programs recorded on an inserted removable recording medium 6313, such as a magnetic disk, an optical disk, a magneto-optical disk, or a semiconductor memory, and supplies the data or the programs to the RAM 6303 connected through an interface 6307, the external bus 6306, the bridge 6305, and the host bus 6304. The removable recording medium 6313 may also be used as a data recording area like the hard disk.

A connecting port 6314 is a port for connecting an external connecting device 6315 and has a connecting portion such as a USB or an IEEE1394. The connecting port 6314 is connected to the CPU 6301 through, for example, the interface 6307, the external bus 6306, the bridge 6305, and the host bus 6304. A communication unit 6316 is connected to a network and performs data communication with the outside. A data reading unit 6317 is, for example, a scanner and performs a document reading process. A data output unit 6318 is, for example, a printer and performs a document data output process.

The hardware structure of the image processing apparatus shown in FIG. 63 is illustrative, and the exemplary embodiment of the invention is not limited to the structure shown in FIG. 63. Any structure capable of implementing the modules according to the exemplary embodiments may be used. For instance, some of the modules may be configured by exclusive hardware (for instance, Application Specific Integrated Circuit: ASIC). Some of the modules may be provided in an external system and connected to each other by a communication line. In addition, the plural systems shown in FIG. 63 may be connected by a communication line so as to cooperate with each other. Further, the structure shown in FIG. 63 may be incorporated into, for example, a copier, a facsimile, a scanner, a printer, and a multi-function machine (an image processing apparatus having two or more of the functions of, for example, the scanner, the printer, the copier, and the facsimile).

In the above-described exemplary embodiments, the image of one row of plural characters that are horizontally written is given as an example of the target image. However, a vertically written character image may be used. In this case, the upward direction and the downward direction become the right direction and the left direction. In addition, the regions of the images (for example, the images of a person and a face in the photograph) of objects other than the region of the character image may be separated.

In the above-described exemplary embodiments, the numerical expressions are used for explanation. However, the numerical expressions include expressions equivalent thereto. The equivalent expression may include changing the expression so as not to have an effect on the final result and solving the expression with algorithmic solution, in addition to the expression itself.

The above-described exemplary embodiments (including examples) may be combined with each other (for example, the module in a given exemplary embodiment is applied to another exemplary embodiment and the modules are interchanged), and the technique described in the background art may be used as the process content of each module.

In the above-described exemplary embodiments, in comparison with a predetermined value, "equal to or more than", "equal to or less than", "more than", and "less than (under)" may be respectively used as "more than", "less than (under)", "equal to or more than", and "equal to or less than" as long as there is no contradiction in combinations thereof.

The above-mentioned program may be stored in a recording medium and then the recording medium having the program stored therein may be provided. In addition, the program may be provided through a communication unit. In this case, for example, the above-mentioned program may be regarded as the invention of a "computer-readable recording medium having a program recorded thereon".

The "computer-readable recording medium having a program recorded thereon" refers to a recording medium that has programs recorded thereon, can be read by a computer, and is used for the installation, execution, and distribution of the programs.

In addition, examples of the recording medium include: digital versatile disks (DVDs), such as "DVD-R, DVD-RW, and DVD-RAM" based on a standard approved by the DVD forum, and "DVD+R and DVD+RW" based on a DVD+RW standard; compact disks (CDs), such as a read only memory (CD-ROM), a CD recordable (CD-R), and a CD rewritable (CD-RW); a blue-ray disk (Blu-ray Disc (registered trademark)); a magneto-optical disk (MO); a flexible disk (FD); a magnetic tape; a hard disk; a read only memory (ROM); an electrically erasable and rewritable read only memory (EEPROM); a flash memory; and a random access memory (RAM).

In addition, the program or a part of the program may be stored in the recording medium and then the recording medium having the program stored therein may be distributed. In addition, the program may be transmitted through communication, for example, a wired network, such as a local area network (LAN), a metropolitan area network (MAN), a wide area network (WAN), the Internet, an intranet, and an extranet, a wireless communication network, or a combination thereof. Alternatively, the program may be transmitted by carrier waves.

In addition, the program may be a part of another program or may be recorded on a recording medium together with a separate program. Further, the program may be separately recorded on plural recording media. The program may be recorded in any kind of format including, for example, compression or encryption as long as it can be decompressed or decoded.

The foregoing description of the exemplary embodiments of the invention has been provided for the purpose of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention is defined by the following claims and their equivalents.

What is claimed is:

1. An image processing apparatus comprising:
   a receiver that receives an image including at least a character image;
   a path calculator that calculates separation paths, which are segments for separating the character images in the image received by the receiver;
   a feature amount calculator that calculates feature amounts of the separation paths in a plurality of directions calculated by the path calculator;
   a selector that determines a separation direction of the image and a state of the character image on the basis of the feature amounts calculated by the feature amount calculator and selects a separation path among the separation paths in the plurality of directions on the basis of determination result;
   a separator that separates the image into a plurality of partial images using the separation path selected by the selector; and
   a recursive processing determining unit that determines whether or not to perform recursive processing on the basis of a state of the character image in the image separated by the separator,
   wherein the path calculator calculates the separation paths, which are the segments for separating the character image in the image separated by the separator, when the recursive processing determining unit determines to perform the recursive processing.

2. The image processing apparatus according to claim 1, further comprising:
   a second separator that separates the image without performing the recursive processing; and
   a determining unit that determines whether or not to direct the second separator or the path calculator to perform the process on the image or the partial image, on the basis of comparison between a ratio of length of the image or the partial image in a horizontal direction and length of the image or the partial image in a vertical direction and a predetermined value, or recursion depth when the recursive processing determining unit determines to perform the recursive processing.

3. The image processing apparatus according to claim 1, wherein when a state of the character image is multiple paragraphs, the selector thins out the separation paths calculated by the path calculator.

4. A non-transitory computer readable medium storing a program causing a computer to execute a process for processing an image, the process comprising:

receiving an image including at least a character image;

calculating separation paths, which are segments for separating the character images in the image received in the receiving step;

calculating feature amounts of the separation paths in a plurality of directions calculated in the separation paths calculating step;

determining a separation direction of the image and a state of the character image on the basis of the feature amounts calculated in the feature amounts calculating step and selecting a separation path among the separation paths in the plurality of directions on the basis of determination result;

separating the image into a plurality of partial images using the separation paths selected in the selecting step; and recursive processing determining whether or not to perform recursive processing on the basis of a state of the character image in the image separated in the separating step, wherein the separation paths calculating step calculates the paths, which are the segments for separating the character images in the image separated in the separating step, when the recursive processing determining step determines to perform the recursive processing.

5. A process for processing an image comprising:

receiving an image including at least a character image;

calculating separation paths, which are segments for separating the character images in the image received in the receiving step;

calculating feature amounts of the separation paths in a plurality of directions calculated in the separation paths calculating step;

determining a separation direction of the image and a state of the character image on the basis of the feature amounts calculated in the feature amounts calculating step and selecting a separation path among the separation paths in the plurality of directions on the basis of determination result;

separating the image into a plurality of partial images using the separation paths selected in the selecting step; and recursive processing determining whether or not to perform recursive processing on the basis of a state of the character image in the image separated in the separating step, wherein the separation paths calculating step calculates the paths, which are the segments for separating the character images in the image separated in the separating step, when the recursive processing determining step determines to perform the recursive processing.

* * * * *